(12) United States Patent
Kiang et al.

(10) Patent No.: US 9,237,170 B2
(45) Date of Patent: Jan. 12, 2016

(54) DATA LOSS PREVENTION (DLP) METHODS AND ARCHITECTURES BY A CLOUD SERVICE

(71) Applicant: Box, Inc., Los Altos, CA (US)

(72) Inventors: Andy Kiang, Mountain View, CA (US); Joel Bailon, Mountain View, CA (US)

(73) Assignee: Box, Inc., Los Altos, CA (US)

( * ) Notice: Subject to any disclaimer, the term of this patent is extended or adjusted under 35 U.S.C. 154(b) by 0 days.

(21) Appl. No.: 13/944,184

(22) Filed: Jul. 17, 2013

(65) Prior Publication Data

US 2014/0026181 A1    Jan. 23, 2014

Related U.S. Application Data

(60) Provisional application No. 61/673,671, filed on Jul. 19, 2012.

(51) Int. Cl.
| | |
|---|---|
| *G06F 21/00* | (2013.01) |
| *H04L 29/06* | (2006.01) |
| *G06F 21/60* | (2013.01) |
| *G06Q 10/10* | (2012.01) |
| *G06F 21/55* | (2013.01) |

(52) U.S. Cl.
CPC .............. *H04L 63/20* (2013.01); *G06F 21/554* (2013.01); *G06F 21/60* (2013.01); *G06Q 10/103* (2013.01); *G06F 2221/2123* (2013.01)

(58) Field of Classification Search
CPC ........ H04L 63/20; G06F 21/60; G06F 21/554
USPC .......................................................... 726/26
See application file for complete search history.

(56) References Cited

U.S. PATENT DOCUMENTS

| | | |
|---|---|---|
| 5,787,175 A | 7/1998 | Carter |
| 5,799,320 A | 8/1998 | Klug |
| 5,848,415 A | 12/1998 | Guck |

(Continued)

FOREIGN PATENT DOCUMENTS

| | | |
|---|---|---|
| CA | 2724521 | 11/2009 |
| CN | 101997924 A | 3/2011 |

(Continued)

OTHER PUBLICATIONS

"Debating the Definition of Cloud Computing Platform." Tech, Sep. 26, 2012.*

(Continued)

*Primary Examiner* — Syed Zaidi
(74) *Attorney, Agent, or Firm* — Perkins Coie LLP

(57) ABSTRACT

Embodiments of the present disclosure include data loss prevention (DLP) methods and architectures by a cloud-based service. The disclosed techniques of the cloud-based platform (e.g., collaboration platform in an enterprise environment) can detect (and may optionally prevent) violations to, e.g., corporate policies, which can be configurable by a corporate administrator, for example regarding the use, storage, or transmission of sensitive information. The types of sensitive information can include, for example, financial information—credit card and bank account numbers, Personally Identifiable Information (PII)—Social Security Number (SSN), health/healthcare information, Intellectual Property—earnings forecasts, sales pipeline, trade secrets, source code, etc.

26 Claims, 50 Drawing Sheets

(56) References Cited

U.S. PATENT DOCUMENTS

| | | |
|---|---|---|
| 5,864,870 A | 1/1999 | Guck |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,222,078 B2 | 5/2007 | Abelow |
| 7,275,244 B1 | 9/2007 | Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,890,964 B2 | 2/2011 | Vogler-Ivashchanka et al. |
| 7,937,663 B2 | 5/2011 | Parker et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,230,348 B2 | 7/2012 | Peters et al. |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,464,161 B2 | 6/2013 | Giles et al. |
| 8,515,902 B2 | 8/2013 | Savage |
| 8,527,549 B2 | 9/2013 | Cidon |
| 8,549,066 B1 | 10/2013 | Donahue et al. |
| 8,549,511 B2 | 10/2013 | Seki et al. |
| 8,583,619 B2 | 11/2013 | Ghods et al. |
| 8,607,306 B1 | 12/2013 | Bridge et al. |
| 8,719,445 B2 | 5/2014 | Ko |
| 8,745,267 B2 | 6/2014 | Luecke et al. |
| 8,849,955 B2 | 9/2014 | Prahlad et al. |
| 8,868,574 B2 | 10/2014 | Kiang et al. |
| 8,892,679 B1 | 11/2014 | Destagnol et al. |
| 8,914,900 B2 | 12/2014 | Smith et al. |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2004/0021686 A1 | 2/2004 | Barberis |
| 2004/0088647 A1 | 5/2004 | Miller et al. |
| 2004/0103147 A1* | 5/2004 | Flesher et al. ............... 709/204 |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1* | 1/2005 | Gabriel et al. ............... 725/28 |
| 2005/0028006 A1 | 2/2005 | Leser et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1* | 11/2005 | Magnuson ............... 705/1 |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |

(56) References Cited

U.S. PATENT DOCUMENTS

| | | | |
|---|---|---|---|
| 2006/0070083 A1* | 3/2006 | Brunswig | H04L 67/02 719/318 |
| 2006/0075071 A1 | 4/2006 | Gillette | |
| 2006/0117247 A1* | 6/2006 | Fite | G06Q 10/10 715/230 |
| 2006/0123062 A1 | 6/2006 | Bobbitt et al. | |
| 2006/0133340 A1 | 6/2006 | Rybak et al. | |
| 2006/0168550 A1 | 7/2006 | Muller et al. | |
| 2006/0174051 A1 | 8/2006 | Lordi et al. | |
| 2006/0174054 A1 | 8/2006 | Matsuki | |
| 2006/0179070 A1 | 8/2006 | George et al. | |
| 2006/0242204 A1 | 10/2006 | Karas et al. | |
| 2006/0259524 A1 | 11/2006 | Horton | |
| 2006/0265719 A1 | 11/2006 | Astl et al. | |
| 2006/0271510 A1 | 11/2006 | Harward et al. | |
| 2007/0016680 A1 | 1/2007 | Burd et al. | |
| 2007/0038934 A1 | 2/2007 | Fellman | |
| 2007/0079242 A1 | 4/2007 | Jolley et al. | |
| 2007/0100830 A1 | 5/2007 | Beedubail et al. | |
| 2007/0115845 A1 | 5/2007 | Hochwarth et al. | |
| 2007/0118598 A1 | 5/2007 | Bedi et al. | |
| 2007/0124460 A1 | 5/2007 | McMullen et al. | |
| 2007/0124737 A1 | 5/2007 | Wensley et al. | |
| 2007/0124781 A1 | 5/2007 | Casey et al. | |
| 2007/0126635 A1 | 6/2007 | Houri | |
| 2007/0130143 A1 | 6/2007 | Zhang et al. | |
| 2007/0130163 A1 | 6/2007 | Perez et al. | |
| 2007/0198609 A1 | 8/2007 | Black et al. | |
| 2007/0208878 A1 | 9/2007 | Barnes-Leon et al. | |
| 2007/0214180 A1 | 9/2007 | Crawford | |
| 2007/0220016 A1 | 9/2007 | Estrada et al. | |
| 2007/0220590 A1 | 9/2007 | Rasmussen et al. | |
| 2007/0240057 A1 | 10/2007 | Satterfield et al. | |
| 2007/0250762 A1 | 10/2007 | Mansfield | |
| 2007/0256065 A1 | 11/2007 | Heishi et al. | |
| 2007/0266304 A1 | 11/2007 | Fletcher et al. | |
| 2007/0282848 A1 | 12/2007 | Kiilerich et al. | |
| 2007/0283443 A1 | 12/2007 | McPherson et al. | |
| 2007/0288290 A1 | 12/2007 | Motoyama et al. | |
| 2008/0005135 A1 | 1/2008 | Muthukrishnan et al. | |
| 2008/0005195 A1 | 1/2008 | Li | |
| 2008/0016146 A1 | 1/2008 | Gan et al. | |
| 2008/0021959 A1 | 1/2008 | Naghi et al. | |
| 2008/0028323 A1 | 1/2008 | Rosen et al. | |
| 2008/0040173 A1 | 2/2008 | Aleong et al. | |
| 2008/0040503 A1 | 2/2008 | Kleks et al. | |
| 2008/0046828 A1 | 2/2008 | Bibliowicz et al. | |
| 2008/0059656 A1 | 3/2008 | Saliba et al. | |
| 2008/0063210 A1 | 3/2008 | Goodman et al. | |
| 2008/0065881 A1 | 3/2008 | Dawson et al. | |
| 2008/0077631 A1 | 3/2008 | Petri | |
| 2008/0091763 A1 | 4/2008 | Devonshire et al. | |
| 2008/0091790 A1 | 4/2008 | Beck | |
| 2008/0104277 A1 | 5/2008 | Tian | |
| 2008/0114720 A1 | 5/2008 | Smith et al. | |
| 2008/0133674 A1 | 6/2008 | Knauerhase et al. | |
| 2008/0140732 A1 | 6/2008 | Wilson et al. | |
| 2008/0147790 A1 | 6/2008 | Malaney et al. | |
| 2008/0151817 A1 | 6/2008 | Fitchett et al. | |
| 2008/0154873 A1* | 6/2008 | Redlich et al. | 707/5 |
| 2008/0182628 A1 | 7/2008 | Lee et al. | |
| 2008/0183467 A1 | 7/2008 | Yuan et al. | |
| 2008/0184130 A1 | 7/2008 | Tien et al. | |
| 2008/0194239 A1 | 8/2008 | Hagan | |
| 2008/0215883 A1 | 9/2008 | Fok et al. | |
| 2008/0222654 A1 | 9/2008 | Xu et al. | |
| 2008/0243855 A1 | 10/2008 | Prahlad et al. | |
| 2008/0250333 A1 | 10/2008 | Reeves et al. | |
| 2008/0250348 A1 | 10/2008 | Alimpich et al. | |
| 2008/0263099 A1 | 10/2008 | Brady-Kalnay et al. | |
| 2008/0271095 A1 | 10/2008 | Shafton | |
| 2008/0276158 A1 | 11/2008 | Lim et al. | |
| 2008/0294899 A1 | 11/2008 | Gazzetta et al. | |
| 2009/0015864 A1 | 1/2009 | Hasegawa | |
| 2009/0019093 A1 | 1/2009 | Brodersen et al. | |
| 2009/0019426 A1 | 1/2009 | Baeumer et al. | |
| 2009/0030710 A1 | 1/2009 | Levine | |
| 2009/0044128 A1 | 2/2009 | Baumgarten et al. | |
| 2009/0049131 A1 | 2/2009 | Lyle et al. | |
| 2009/0119322 A1 | 5/2009 | Mills et al. | |
| 2009/0125469 A1 | 5/2009 | McDonald et al. | |
| 2009/0132651 A1 | 5/2009 | Roger et al. | |
| 2009/0138808 A1 | 5/2009 | Moromisato et al. | |
| 2009/0150417 A1 | 6/2009 | Ghods et al. | |
| 2009/0150627 A1 | 6/2009 | Benhase et al. | |
| 2009/0158142 A1 | 6/2009 | Arthursson et al. | |
| 2009/0164438 A1 | 6/2009 | Delacruz | |
| 2009/0171983 A1 | 7/2009 | Samji et al. | |
| 2009/0193107 A1 | 7/2009 | Srinivasan et al. | |
| 2009/0193345 A1 | 7/2009 | Wensley et al. | |
| 2009/0198772 A1 | 8/2009 | Kim et al. | |
| 2009/0210459 A1 | 8/2009 | Nair et al. | |
| 2009/0214115 A1 | 8/2009 | Kimura et al. | |
| 2009/0235167 A1 | 9/2009 | Boyer et al. | |
| 2009/0235181 A1 | 9/2009 | Saliba et al. | |
| 2009/0235189 A1 | 9/2009 | Aybes et al. | |
| 2009/0249224 A1 | 10/2009 | Davis et al. | |
| 2009/0254589 A1 | 10/2009 | Nair et al. | |
| 2009/0260060 A1 | 10/2009 | Smith et al. | |
| 2009/0265430 A1* | 10/2009 | Bechtel | G06F 17/30994 709/205 |
| 2009/0271708 A1 | 10/2009 | Peters et al. | |
| 2009/0282212 A1 | 11/2009 | Peterson | |
| 2009/0282483 A1* | 11/2009 | Bennett | 726/23 |
| 2009/0300356 A1 | 12/2009 | Crandell | |
| 2009/0300527 A1 | 12/2009 | Malcolm et al. | |
| 2009/0327358 A1 | 12/2009 | Lukiyanov et al. | |
| 2009/0327961 A1 | 12/2009 | De Vorchik et al. | |
| 2010/0011292 A1 | 1/2010 | Marinkovich et al. | |
| 2010/0011447 A1 | 1/2010 | Jothimani | |
| 2010/0017262 A1 | 1/2010 | Iyer et al. | |
| 2010/0036929 A1 | 2/2010 | Scherpa et al. | |
| 2010/0042720 A1 | 2/2010 | Stienhans et al. | |
| 2010/0057560 A1 | 3/2010 | Skudlark et al. | |
| 2010/0057785 A1 | 3/2010 | Khosravy et al. | |
| 2010/0076946 A1 | 3/2010 | Barker et al. | |
| 2010/0082634 A1 | 4/2010 | Leban | |
| 2010/0083136 A1 | 4/2010 | Komine et al. | |
| 2010/0088150 A1 | 4/2010 | Mazhar et al. | |
| 2010/0092126 A1 | 4/2010 | Kaliszek et al. | |
| 2010/0093310 A1 | 4/2010 | Gbadegesin et al. | |
| 2010/0107225 A1 | 4/2010 | Spencer et al. | |
| 2010/0131868 A1 | 5/2010 | Chawla et al. | |
| 2010/0151431 A1 | 6/2010 | Miller | |
| 2010/0153835 A1 | 6/2010 | Xiong et al. | |
| 2010/0162365 A1 | 6/2010 | Del Real | |
| 2010/0162374 A1 | 6/2010 | Nair | |
| 2010/0179940 A1 | 7/2010 | Gilder et al. | |
| 2010/0185463 A1 | 7/2010 | Noland et al. | |
| 2010/0185932 A1 | 7/2010 | Coffman et al. | |
| 2010/0191689 A1 | 7/2010 | Cortes et al. | |
| 2010/0198783 A1 | 8/2010 | Wang et al. | |
| 2010/0198871 A1 | 8/2010 | Stiegler et al. | |
| 2010/0198944 A1 | 8/2010 | Ho et al. | |
| 2010/0205537 A1 | 8/2010 | Knighton et al. | |
| 2010/0218237 A1 | 8/2010 | Ferris et al. | |
| 2010/0223378 A1 | 9/2010 | Wei | |
| 2010/0229085 A1 | 9/2010 | Nelson et al. | |
| 2010/0235526 A1 | 9/2010 | Carter et al. | |
| 2010/0235539 A1 | 9/2010 | Carter et al. | |
| 2010/0241611 A1 | 9/2010 | Zuber | |
| 2010/0241972 A1 | 9/2010 | Spataro et al. | |
| 2010/0250120 A1 | 9/2010 | Waupotitsch et al. | |
| 2010/0251340 A1 | 9/2010 | Martin et al. | |
| 2010/0257457 A1 | 10/2010 | De Goes | |
| 2010/0262582 A1 | 10/2010 | Garcia-Ascanio et al. | |
| 2010/0267588 A1 | 10/2010 | Nelson et al. | |
| 2010/0274765 A1 | 10/2010 | Murphy et al. | |
| 2010/0274772 A1 | 10/2010 | Samuels | |
| 2010/0281118 A1 | 11/2010 | Donahue et al. | |
| 2010/0290623 A1 | 11/2010 | Banks et al. | |
| 2010/0306379 A1 | 12/2010 | Ferris | |
| 2010/0318893 A1 | 12/2010 | Matthews et al. | |
| 2010/0322252 A1 | 12/2010 | Suganthi et al. | |

(56) References Cited

U.S. PATENT DOCUMENTS

| | | |
|---|---|---|
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0137991 A1 | 6/2011 | Russell |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0226767 A1 | 9/2012 | Luna et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0257249 A1 | 10/2012 | Natarajan |
| 2012/0263166 A1 | 10/2012 | Cho et al. |
| 2012/0266203 A1 | 10/2012 | Elhadad et al. |
| 2012/0284638 A1 | 11/2012 | Cutler et al. |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212486 A1 | 8/2013 | Joshi et al. |
| 2013/0218978 A1 | 8/2013 | Weinstein et al. |
| 2013/0239049 A1 | 9/2013 | Perrodin et al. |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282830 A1 | 10/2013 | Besen et al. |
| 2013/0305039 A1 | 11/2013 | Gauda |
| 2013/0326344 A1 | 12/2013 | Masselle et al. |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0068589 A1 | 3/2014 | Barak |

(56) References Cited

U.S. PATENT DOCUMENTS

| | | | |
|---|---|---|---|
| 2014/0150023 A1 | 5/2014 | Gudorf et al. | |
| 2014/0156373 A1 | 6/2014 | Roberts et al. | |
| 2014/0172595 A1 | 6/2014 | Beddow et al. | |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-0219128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 | 11/2013 |

OTHER PUBLICATIONS

"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"How-to Geek, How to Sync Specific Folders With Dropbox," downloaded from the internet http://www.howtogeek.com, Apr. 23, 2013, 5 pages.
"Microsoft Office SharePoint 2007 User Guide," Feb. 16, 2010, pp. 1-48.
Exam Report for EP13158415.3, Applicant: Box, Inc. Mailed Jun. 4, 2013, 8 pages.
Exam Report for GB1300188.8, Applicant: Box, Inc. Mailed May 31, 2013, 8 pages.
Exam Report for GB1306011.6, Applicant: Box, Inc. Mailed Apr. 18, 2013, 8 pages.
International Search Report and Written Opinion for PCT/US2011/057938, Applicant: Box, Inc., Mailed Mar. 29, 2013, 10 pages.
International Search Report and Written Opinion for PCT/US2012/063041, Applicant: Box, Inc., Mailed Mar. 29, 2013, 12 pages.
International Search Report and Written Opinion for PCT/US2013/020267, Applicant: Box, Inc., Mailed May 7, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/029520, Applicant: Box, Inc., Mailed Jun. 26, 2013, 10 pages.
International Search Report and Written Opinion for PCT/US2013/034662, Applicant: Box, Inc., Mailed May 31, 2013, 10 pages.
International Search Report and Written Opinion for PCT/US2013/035404, Applicant: Box, Inc., Mailed Jun. 26, 2013, 13 pages.
Lars, "35 Very Useful Online Tools for Improving your project Management and Team Collaboration," Apr. 31, 2010, tripwiremagazine.com, pp. 1-32.
Parr, "Google Docs Improves Commenting, Adds E-mail Notifications," Apr. 16, 2011, mashable.com, pp. 1-6.
International Search Report and Written Opinion for PCT/US2013/039782, Applicant: Box, Inc., Mailed Aug. 28, 2013, 15 pages.
Exam Report for EP13185269.1, Applicant: Box, Inc. Mailed Jan. 28, 7 pages.
Exam Report for GB1311417.8, Applicant: Box, Inc. Mailed Dec. 20, 2013, 5 pages.
Exam Report for GB1312874.9, Applicant: Box, Inc. Mailed Dec. 20, 2013, 11 pages.
Exam Report for GB1320902.8, Applicant: Box, Inc. Mailed Dec. 20, 2013, 4 pages.
International Search Report and Written Opinion for PCT/US2013/034765, Applicant: Box, Inc., Mailed Jan. 20, 2014, 15 pages.
Patent Court Document of Approved Judgment for GB0602349.3 and GB0623571.7; Mar. 3, 2009, 17 pages.
Exam Report for GB1314771.5, Applicant: Box, Inc. Mailed Feb. 17, 2014, 7 pages.
Exam Report for GB1308842.2, Applicant: Box, Inc. Mailed Mar. 10, 2014, 4 pages.
Burns, "Developing Secure Mobile Applications for Android," Oct. 2008, Version 1.0, 1-28 pages.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," published by O'Reilly Media, May 27, 2008, 24 pages.
Exam Report for EP13168784.0, Applicant: Box, Inc. Mailed Nov. 21, 2013, 7 pages.
Exam Report for GB1309209.3, Applicant: Box, Inc. Mailed Oct. 30, 2013, 11 pages.
Exam Report for GB1310666.1, Applicant: Box, Inc. Mailed Aug. 30, 2013, 10 pages.
Exam Report for GB1312095.1, Applicant: Box, Inc. Mailed Dec. 12, 2013, 7 pages.
Exam Report for GB1313559.5, Applicant: Box, Inc., Mailed Aug. 22, 2013, 19 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2008/012973 dated Apr. 30, 2009, pp. 1-11.

(56) References Cited

OTHER PUBLICATIONS

International Search Report and Written Opinion for PCT/US2011/039126 mailed on Oct. 6, 2011, pp. 1-13.
International Search Report and Written Opinion for PCT/US2011/041308 Mailed Jul. 2, 2012, pp. 1-16.
International Search Report and Written Opinion for PCT/US2011/047530, Applicant: Box, Inc., Mailed Mar. 22, 2013, pp. 1-10.
International Search Report and Written Opinion for PCT/US2011/056472 mailed on Jun. 22, 2012, pp. 1-12.
International Search Report and Written Opinion for PCT/US2011/060875 Mailed Oct. 30, 2012, pp. 1-10.
International Search Report and Written Opinion for PCT/US2012/056955, Applicant: Box, Inc., Mailed Mar. 27, 2013, pp. 1-11.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
Internet Forums, http://web.archive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Palmer, "Load Balancing FTP Servers," BlogNav, Oct. 2008, 2 pages.
Partial International Search Report for PCT/US2011/041308 dated Feb. 27, 2012, pp. 1-2.
Supplementary European Search Report European Application No. EP 08 85 8563 dated Jun. 20, 2011 pp. 1-5.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12pages.
Search Report for EP 13189144.2 Applicant: Box, Inc. Mailed Sep. 1, 2014, 9 pages.
Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
Search Report for EP 11729851.3, Applicant: Box, Inc. Mailed Feb. 7, 2014, 9 pages.
Comes, "MediaXchange User's Manual," Version 1.15.15, Feb. 1, 2009, pp. 1-90.
"Average Conversion Time for a D60 RAW file?" http://www.dpreview.com, Jul. 22, 2002, 4 pages.
Exam Report for GB1312264.3, Applicant: Box, Inc. Mailed Mar. 24, 2014, 7 pages.
Search Report for EP14153783.7, Applicant: Box, Inc. Mailed Apr. 7, 2014, 6 pages.
John et al., "Always Sync Support Forums—View topic—Allway sync funny behavior," Allway Sync Support Forum at http://sync-center.com, Mar. 28, 2011, XP055109680, 2 pages.
Search Report for EP14151588.2, Applicant: Box, Inc. Mailed Apr. 15, 2014, 12 pages.
Search Report for EP13187217.8, Applicant: Box, Inc. Mailed Apr. 15, 2014, 12 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Walker, "PDF.js project meeting notes," retrieved from the internet, http://groups.google.com, May 15, 2014, 1 page.
Sommerer, "Presentable Document Format: Improved On-demand PDF to HTML Conversion," retrieved from the internet, http://research.microsoft.com, Nov. 2004, 8 pages.
"Tulsa TechFest 2012—Agenda," retrieved from the website, http://web.archive.org, Oct. 2, 2012, 2 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Cohen, "Debating the Definition of Cloud Computing Platforms," retrieved from the internet, http://forbes.com, Feb. 3, 2014, 7 pages.
Partial Search Report for EP131832800, Applicant: Box, Inc. Mailed May 8, 2014, 5 pages.
Search Report for EP141509422, Applicant: Box, Inc. Mailed May 8, 2014, 7 pages.
Tulloch et al., "Windows Vista Resource Kit," Apr. 8, 2007, Microsoft Press, XP055113067, 6 pages.
"Revolving sync conflicts; frequently asked questions," Microsoft Tech Support, Jul. 16, 2012, retrieved from the Internet: http://web.archive.org/web, 2 pages.
Pyle et al., "How to enable Event logging for Offline Files (Client Side Caching) in Windows Vista," Feb. 18, 2009, retrieved from the internet: http://blogs.technet.com, 3 pages.
Duffy, "The Best File-Syncing Services," pcmag.com, retrieved from the internet: http://www.pcmag.com, Sep. 28, 2012, 7 pages.
"Troubleshoot sync problems," Microsoft Tech Support: May 2, 2012, retrieved from the internet, http://web.Archive.org/web, 3 pages.
Exam Report for GB1318792.7, Applicant: Box, Inc. Mailed May 22, 2014, 2 pages.
Exam Report for EP13177108.1, Applicant: Box, Inc. Mailed May 26, 2014, 6 pages.
Exam Report for GB1410569.6 Applicant: Box, Inc. Mailed Jul. 11, 2014, 9 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
Exam Report for GB1309209.3 Applicant: Box, Inc. Mailed Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. Mailed Feb. 17, 2015, 6 pages.
Exam Report for GB1312264.3 Applicant: Box, Inc. Mailed Jan. 30, 2015, 5 pages.

(56) References Cited

OTHER PUBLICATIONS

Exam Report for GB1312874.9 Applicant: Box, Inc. Mailed Feb. 10, 2015, 7 pages.

Exam Report for GB1316685.5 Applicant: Box, Inc. Mailed Feb. 17, 2015, 5 pages.

Exam Report for EP 13185269.1, Applicant: Box, Inc. Mailed Feb. 13, 2015, 8 pages.

* cited by examiner

DATA LOSS PREVENTION (DLP) METHODS AND ARCHITECTURES BY A CLOUD SERVICE

CROSS-REFERENCE TO RELATED APPLICATIONS AND EFFECTIVE FILING DATE ENTITLEMENT

This application is entitled to the benefit of and/or the right of priority to U.S. Provisional Application 61/673,671, entitled "DATA LOSS PREVENTION METHODS AND ARCHITECTURES IN A CLOUD SERVICE," filed on Jul. 19, 2012, and is hereby incorporated by reference in its entirety. This application is therefore entitled to an effective filing date of Jul. 19, 2012. This application is related to U.S. application Ser. No. 13/944,241, entitled "DATA LOSS PREVENTION (DLP) METHODS BY A CLOUD SERVICE INCLUDING THIRD PARTY INTEGRATION ARCHITECTURES," filed on Jul. 17, 2013, and is hereby incorporated by reference in its entirety.

BACKGROUND

Content security and sensitivity are increasingly important as the need to detect and prevent violations to policies regarding the use, storage, or transmission of sensitive/private information has become a major area of concern. One reason is that enterprises, organizations, and individuals now heavily rely on cyber space, utilized as a working environment, to manage and share working files and documents. Existing solutions, including installations on a laptop/desktop and/or behind a firewall, are no longer sufficient when it comes to mobile-based or cloud-based applications.

BRIEF DESCRIPTION OF THE DRAWINGS

FIG. 17 is an example screenshot of an Automation interface, particularly an interface summarizing a first and a second step in a new automation instantiation.

FIG. 26 is an example screenshot of a Policy interface, particularly an interface for editing an upload policy instantiation.

FIG. 40 is an example screenshot of a user quarantined file review list administrative interface.

Figure 1:
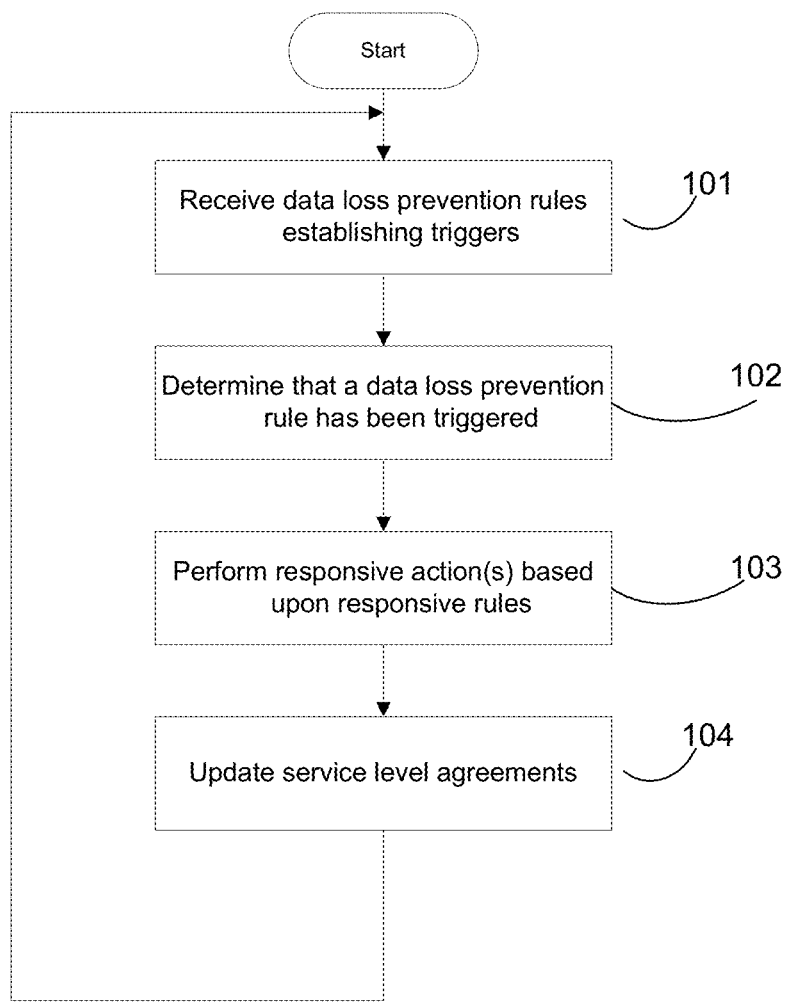
FIG. 1 illustrates an example use case of the data loss prevention system of certain embodiments.

Those skilled in the art will appreciate that the logic and process steps illustrated in the various flow diagrams discussed below, may be altered in a variety of ways. For example, the order of the logic may be rearranged, substeps may be performed in parallel, illustrated logic may be omitted, other logic may be included, etc. One will recognize that certain steps may be consolidated into a single step and that actions represented by a single step may be alternatively represented as a collection of substeps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed and/or encrypted; etc.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Various embodiments contemplate data loss prevention (DLP) systems and techniques which detect (and may optionally prevent) violations to, e.g., corporate policies regarding the use, storage, and transmission of sensitive information. The types of sensitive information can include, for example, financial information—credit card and bank account numbers, Personally Identifiable Information (PII)—Social Security Number (SSN), health/healthcare information, Intellectual Property—earnings forecasts, sales pipeline, trade secrets, source code, etc.

Overview of the General DLP System

In certain embodiments, in order to support data loss prevention in the cloud system for users (e.g., customers) across multiple platforms and multiple and/or all applications, a data loss system may identify the key user/customer requirements (e.g., application, client, or customer based).

In some embodiments, the data loss prevention system may detect (and optionally prevent) violations to corporate policies regarding, e.g., the use, storage, and transmission of sensitive information. In some embodiments, the types of sensitive information may include, for example, financial information such as credit card and bank account numbers, Personally Identifiable Information (PII), Social Security Numbers, health/healthcare information, Intellectual Property, earnings forecasts, sales pipelines, trade secrets, source code, etc. Some prior art solutions include installations (e.g., of software) on a laptop/desktop and/or behind a firewall. These solutions, however, generally fail to address cloud or mobile devices in a suitable manner.

The disclosed data loss prevention (DLP) methods and systems of certain embodiments may include options for native integration within a cloud service, and/or additional integrations with third-party providers for full featured functionality.

In a third party integration option for data loss prevention contemplated in some embodiments, the system can provide application programming interfaces (APIs) for error handling customized messages that can appear in a native cloud-based platform user interface. The system may be optimized to prevent latency and to explore temporary/quarantine state in some embodiments. A specialized user interface and user experience may be designed for use when a document is not yet approved by the data loss prevention system. In some embodiments, a temporary/quarantine state can be leveraged for documents found to be virus-infected or potentially virus-infected.

In some native solution in the cloud service described in certain embodiments, the system may scan for certain types of data that have a consistent formats, e.g., Social Security Numbers, Credit Card Numbers, bank account numbers and ABA bank routing numbers, etc. This can be performed in a manner that is transparent to administrators or end users in some embodiments. Policy management can be performed natively by the cloud service or deferred to a third party, or performed by a combination of the cloud service and third party, depending upon the embodiment.

FIG. 1 illustrates an example use case of the data loss prevention system. At step 101, the data loss prevention method may enable a user (e.g., customer) to set rules that can be triggered by the detection of various data loss prevention criteria. For example, the loss prevention criteria may include: common information types such as credit card numbers, SSNs, Tax IDs, etc.; keywords identified by the user/customer, such as "confidential", or product specific names.

Detection mechanisms for implementing the prevention criteria may include, by way of example the following operations. In "Exact Data Matching," the system compares the file contents with structured data including references to a record in a database. In "Indexed Document Matching," the system may identify unstructured data. In some embodiments, the system may also white list content, e.g. the system may hash sections of a fingerprinted document. In "Described Content Matching," the system may identify credit card information, magnetic stripe data for Payment Card Industry, a Canadian social security number, UK National Insurance numbers, etc.

At step 102, the data loss prevention method may determine that one or more of the rules has been triggered by a file upload attempt. Once triggered, the data loss prevention system may allow the user (e.g., a customer) to perform various actions via various responsive rules, or the system may perform the responsive rules automatically at step 103. The rules may be implemented directly by the user or automatically by the system or by a combination of both the system and user. The rules may include: notification to a list of email addresses that the file was attempted to be uploaded; a "Lock Down" preventing anyone except an administrator from modifying, deleting, or sharing the upload file; the suppression of notifications to certain users, or users in a group regarding the upload; etc.

At step 104, in some embodiments, the data loss prevention system may implement, enforce, or update Service Level Agreements for rules. For example, in some embodiments, the rules may be active once set for all modifications, updates, deletions of files. In some embodiments, the rules may be active within a certain service level agreements for all files within an enterprise, or within a workspace shared among certain users and their collaborators.

In some embodiments, the data loss prevention architecture also includes a policy builder. In some embodiments, the policy builder may utilize Boolean logic and can combine different detection technologies. The policy builder may manage white list exceptions, utilize pre-built policy templates (e.g., including an HIPAA policy template). The policy builder may also apply the policies to specific internal/external groups, for example, via integration with corporate directory, and/or including consent to be monitored (EU regulations).

In some embodiments, the architecture may further include a policy violation response handling engine. This engine may be triggered by different conditions. For example, the engine may be triggered by the severity associated with an incident, the number of matching terms between a rule and uploaded file, the upload endpoint's current location (on/off corporate network), etc. In some embodiments, various types of responses to detected policy violations may include, for example, email notification, setting incident status, blocking file and pop-up warning to user, copying or moving a file, etc. The responses may be automatically performed or manually instructed, e.g. by the user/customer or administrator. The disclosed system of certain embodiments may include integration capability with an existing data loss prevention solution or notification system.

Embodiments of the present disclosure include systems and methods for data loss prevention in a cloud-based cloud-based platform/service (e.g., cloud-based collaboration platform).

Figure 2:
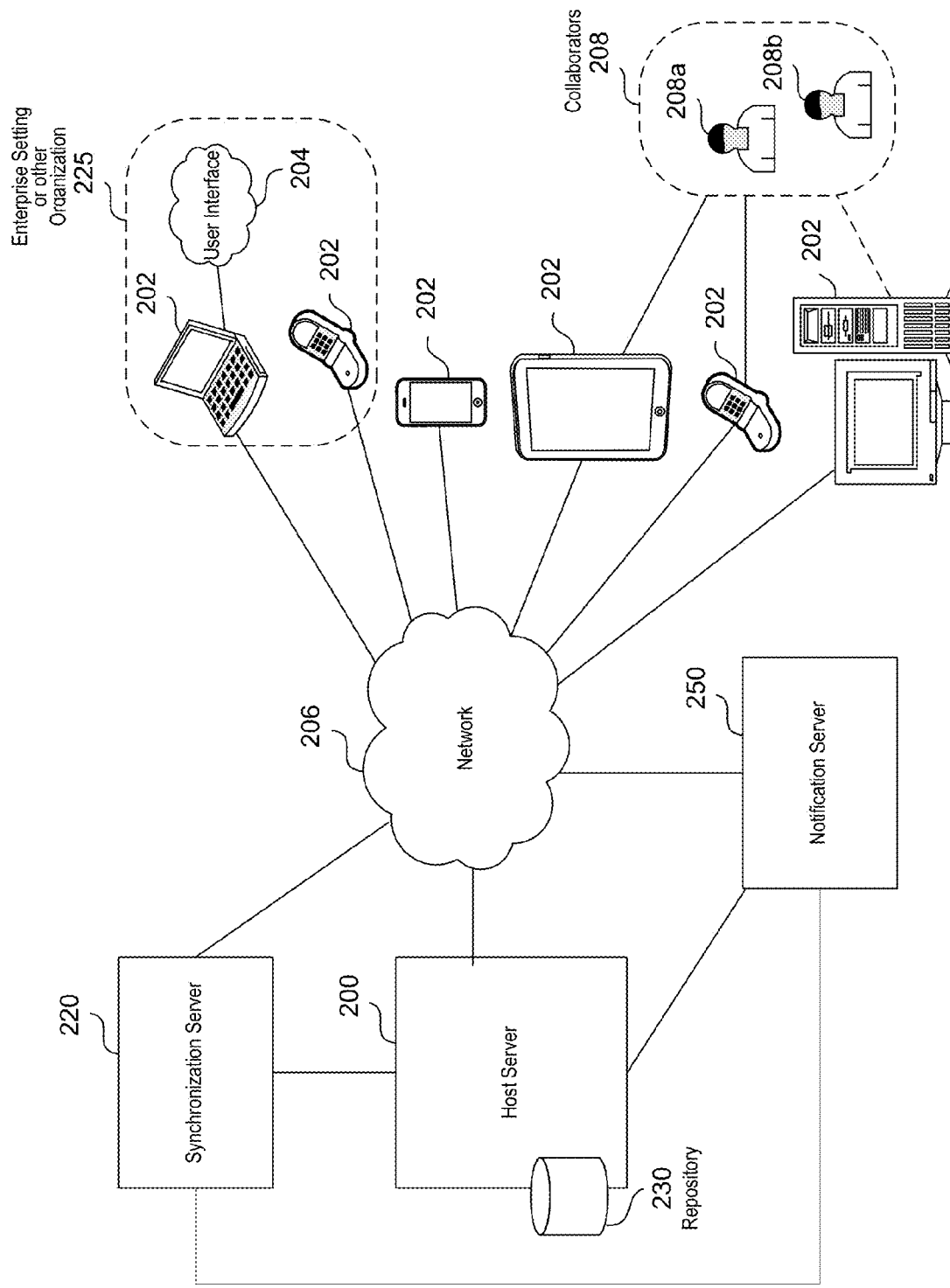
FIG. 2 illustrates an example diagram of a system having a host server of a cloud service, collaboration and/or cloud storage accounts in a cloud-based environment.

FIG. 2 illustrates an example diagram of a system where a host server 200 and notification server 250 provide notifications of activities that occur in the online collaboration environment in real time or near real time to users 208. Further, sync server 220 supports synchronization of folders stored locally on a user's computer with folders stored by the host server 200 in repository 230.

The client devices 202 can be any system and/or device, and/or any combination of devices/systems that is able to establish a connection, including wired, wireless, cellular connections with another device, a server and/or other systems such as host server 200 and/or notification server 250 and/or sync server 220. Client devices 102 can include a synchronization client program to synchronize a local copy of a folder with a copy of a folder stored on the web-based collaboration environment server.

Client devices 202 may typically include a display and/or other output functionalities to present information and data exchanged between or among the devices 202 and/or the host server 200 and/or notification server 250 and/or the synchronization server 220.

For example, the client devices 202 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. In one embodiment, the client devices 202, host server 200, notification server 250, and synchronization server 220 are coupled via a network 206. In some embodiments, the devices 202 and host server 200 may be directly connected to one another.

The input mechanism on client devices 202 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 202 through one or more of the above input mechanism, or others, can be used in the disclosed technology by various users or collaborators (e.g., collaborators 208) for accessing, through network 206, a web-based collaboration environment or online collaboration platform (e.g., hosted by the host server 200).

The collaboration platform or environment hosts workspaces with work items that one or more users can access (e.g., view, edit, update, revise, comment, add to discussions, download, preview, tag, or otherwise manipulate, etc.). A work item can generally include any type of digital or electronic content that can be viewed or accessed via an electronic device (e.g., device 202). The digital content can include .PDF files, .doc, slides (e.g., PowerPoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example. The workspace can also include an online discussion area for collaborators to enter comments linked to a particular workspace or folder.

In general, a workspace can be associated with a set of users or collaborators (e.g., collaborators 208) which have access to the content included therein. The levels of access (e.g., based on permissions or rules) of each user or collaborator to access the content in a given workspace may be the same or may vary among the users. Each user may have their own set of access rights to every piece of content in the workspace, or each user may have different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate on efforts on work items such that each user can see, remotely, edits, revisions, comments, or annotations being made to specific work items through their own user devices. For example, a user can upload a document to a work space for other users to access (e.g., for viewing, editing, commenting, discussing, signing-off, or otherwise manipulating). The user can login to the online platform and upload the document (or any other type of work item) to an existing work space or to a new work space. The document can be shared with existing users or collaborators in a work space.

Figure 3:
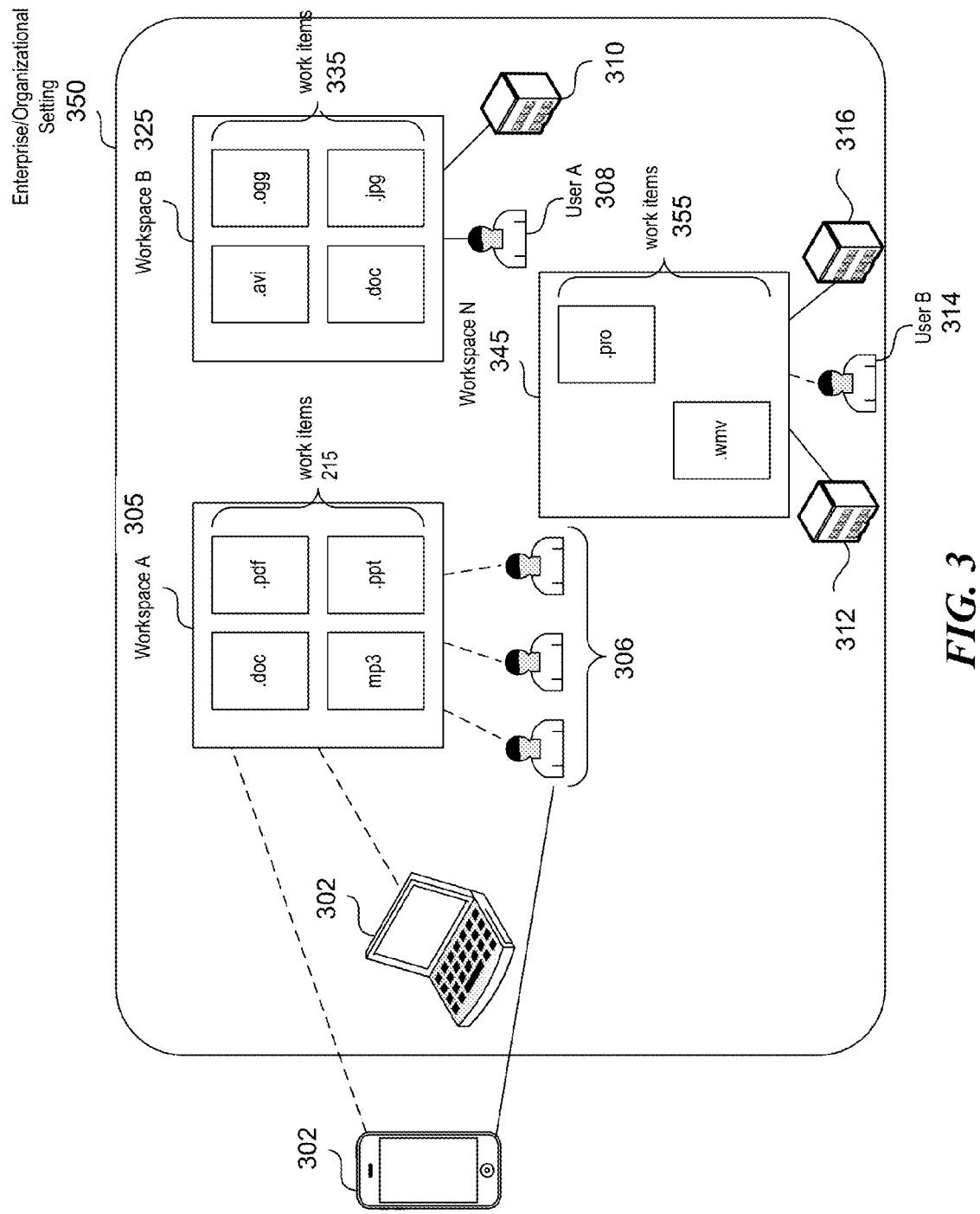
FIG. 3 depicts an example diagram of a web-based or online collaboration platform deployed in an enterprise or other organizational setting for organizing work items and workspaces in some embodiments.

A diagrammatic illustration of the online collaboration environment and the relationships between workspaces and users/collaborators are illustrated with further reference to the example of FIG. 3. A diagrammatic illustration of a workspace having multiple work items with which collaborators can access through multiple devices is illustrated with further reference to the example of FIG. 4.

In one embodiment, actions performed on work items or other activities that occur in a work space can be detected in real time or in near real time. In addition, users, collaborators, or select users can be notified in real time or near real-time of these actions or activities. Various mechanisms can be used to notify users or collaborators, including through the web interface to access the collaboration platform, via email, and/or SMS, for example.

In one embodiment, work items in a workspace or folder within the collaboration environment can be synchronized to workspaces or folders on a collaborator's computer.

Functions and techniques disclosed for real time or near real time notification of activities that occur in the online platform on a work item or in a work space can be performed by a push-enabled server (e.g., the notification server 250 coupled to the host server 200 of the collaboration platform. Additionally, functions and techniques disclosed for synchronizing workspaces or folders within the collaboration environment with workspaces or folders on a collaborator's desktop can be performed by a synchronization server 220. Functions and techniques performed by the host server 200, the notification server 250, the synchronization server 220 and the related components therein are described, respectively, in detail herein.

In one embodiment, client devices 202 communicate with the host server 200 over network 206. In general, network 206, over which the client devices 202 and the host server 200 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 206 can be any collection of distinct networks operating wholly or partially in conjunction to provide connectivity to the client devices 202 and the host server 200 and may appear as one or more networks to the serviced systems and devices. In one embodiment, communications to and from the client devices 202 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 3 depicts an example diagram of a web-based or online collaboration platform deployed in an enterprise or other organizational setting 350 for organizing workspaces 305, 325, 345 which include work items 315, 335, 355 and providing a discussion workspace area (not shown) for the respective workspaces 305, 325, 345.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associated work items. For example, work space A 305 and a corresponding discussion workspace may be associated with work items 315, work space B 325 and a corresponding discussion workspace can be associated with work items 335, and work space N 345 and a corresponding discussion workspace can be associated with work items 355. The work items 315, 335, and 355 may be unique to each work space but need not be. For example, a particular word document can be associated with only one work space (e.g., work space A 305) or it may be associated with multiple work spaces (e.g., Work space A 305 and work space B 325, etc.).

In general, each work space has a set of users or collaborators associated with it. For example, work space A 305 is associated with multiple users or collaborators 306. In some instances, work spaces deployed in an enterprise may be department specific. For example, work space B may be associated with department 310 and some users shown as example user A 308, and workspace N 345 can be associated with departments 312 and 316 and users shown as example user B 314.

Each user associated with a work space can generally access the work items associated with the work space. The level of access will depend on permissions associated with the specific work space, and/or with a specific work item. Permissions can be set for the work space or set individually on a per work item basis. For example, the creator of a work space (e.g., one of user A 308 who creates work space B) can set one permission setting applicable to all work items 335 for other associated users and/or users associated with the affiliate department 310, for example. Creator user A 308 may also set different permission settings for each work item, which may be the same for different users, or varying for different users.

In one embodiment, a first type of permission level, e.g. an editor, can allow a user to have full read and write access to a workspace such that the user can view and download contents of the workspace as well as upload new content to the workspace. A second type of permission level, e.g. a viewer, can allow a user to have full read access to a workspace such that the user can view and download contents of the workspace but not upload or edit contents of the workspace. A third type of permission level, e.g. an uploader, can allow a user to have limited write access to contents of a workspace such that the user can see items in the workspace but not download or view the items, while being permitted to upload new content to the workspace.

In one embodiment, the ability of a user associated with a workspace to enable synchronization of the workspace with local folders on the user's computer can be tied to the permission level of the user. Alternatively, separate synchronization permission can be assigned by a creator or administrator of a workspace to individuals associated with the workspace. In some instances, synchronization permission can be associated with the workspace or the items in the workspace or based upon any other criteria.

In each work space A, B . . . N, when an action is performed on a work item by a given user or any other activity is detected in the work space, other users in the same work space may be notified in real time or in near real time. Activities which trigger real time notifications can include, by way of example but not limitation, adding, deleting, or modifying collaborators in the work space, adding, deleting a work item in the work space, creating a discussion topic in the work space.

Specifically, items or content downloaded or edited in accordance with the techniques described in the present disclosure can be cause notifications to be generated. Such notifications can be sent to relevant users to notify them of actions surrounding a download, an edit, a change, a modification, a new file, a conflicting version, an upload of an edited or modified file.

The activity can be performed in relation to a discussion topic in the work space, for example, adding a response to a discussion topic, deleting a response, or editing a response in the work space. In addition, the activity is performed on a work item in the work space by the user, including, by way of example but not limitation, download or upload of a work item, deletion of editing of the work item, selecting, adding, deleting, and modifying a tag in the work item, preview of the work item or comment of the work item, setting or changing permissions of the work item, sharing a work item, emailing a link to the work item, and/or embedding a link to the work item on another website.

In one embodiment, in a user interface to the web-based collaboration platform where notifications are presented, users can, via the same interface, create action items (e.g., tasks) and delegate the action items to other users including collaborators pertaining to a work item 315, for example. The collaborators 306 may be in the same workspace A 305 or the user may include a newly invited collaborator. Similarly, in the same user interface where discussion topics can be created in a work space (e.g., work space A, B or N, etc.), actionable events on work items can be created and/or delegated/assigned to other users such as collaborators of a given work space 306 or other users. Through the same user interface, task status and updates from multiple users or collaborators can be indicated and reflected. In some instances, the users can perform the tasks (e.g., review or approve or reject, etc.) via the same user interface.

Figure 4:
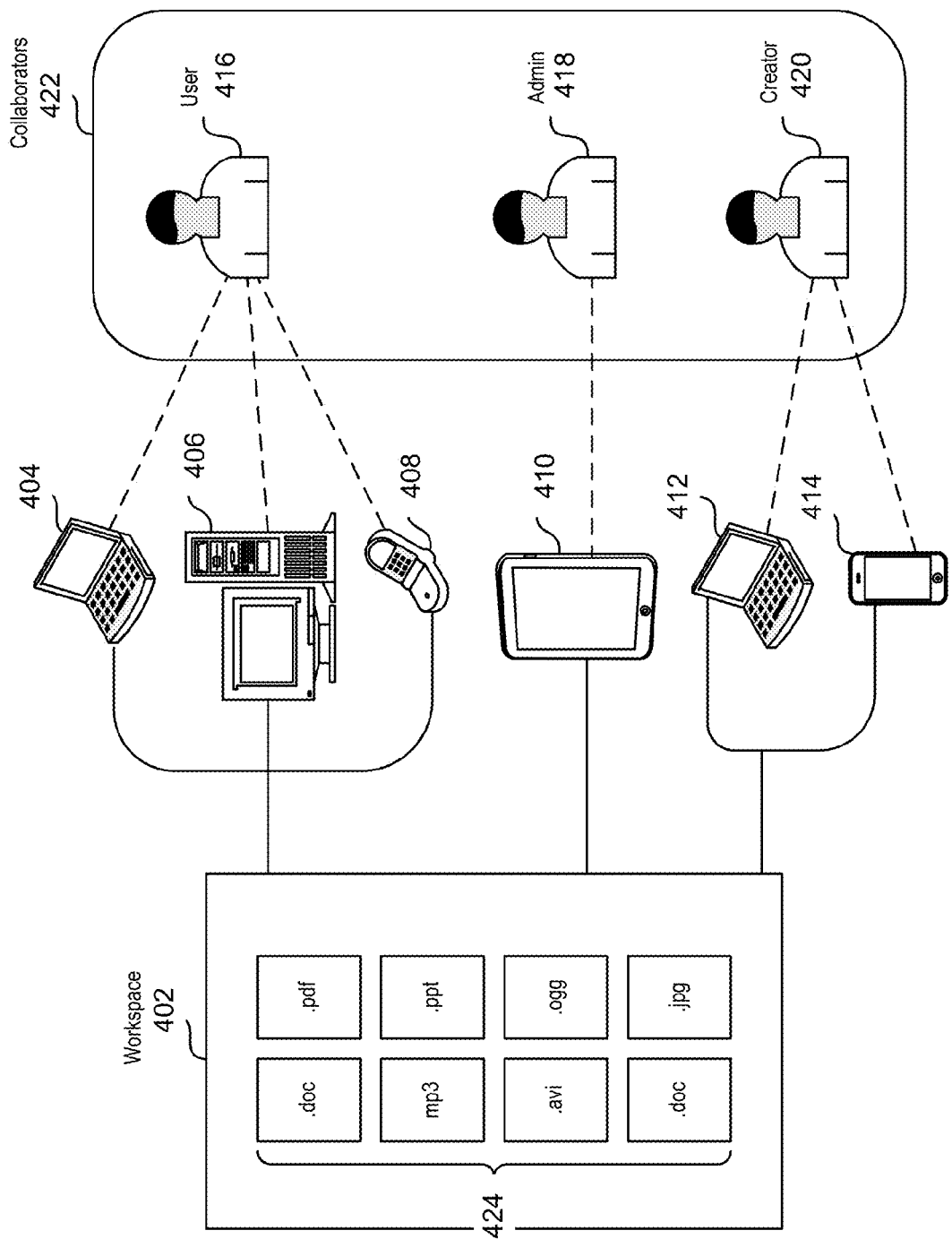
FIG. 4 depicts an example diagram of a workspace in a cloud-based, online or web-based collaboration environment accessible by multiple collaborators through various devices authorized to access the work space.

FIG. 4 depicts an example diagram of a workspace 402 in an online or web-based collaboration environment accessible by multiple collaborators 422 through various devices authorized to access the work space.

Each of users 416, 418, and 420 may individually use multiple different devices to access and/or manipulate work items 424 in the work space 402 with which they are associated with. For example users 416, 418, 420 may be collaborators on a project to which work items 424 are relevant. Since the work items 424 are hosted by the collaboration environment (e.g., a cloud-based environment), each user may access the work items 424 anytime, and from any physical location using any device (e.g., including devices they own or any shared/public/loaner device).

Work items to be edited or viewed may be accessed from the workspace 402 in accordance with the platform and/or application independent mechanisms. Users may also be notified of access, edit, modification, and/or upload related-actions performed on work items 424 by other users or any other types of activities detected in the work space 402. For example, if user 416 modifies a document, one or both of the other collaborators 418 and 420 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification may be depicted preferentially (e.g., ordering in the user interface) based on user preferences and/or relevance to the user (e.g., implicit or explicit).

For example, a notification of a download, access, read, write, edit, or upload related activities may be presented in a feed stream among other notifications through a user interface on the user device according to relevancy to the user determined based on current or recent activity of the user in the web-based collaboration environment.

In one embodiment, a notification feed stream includes updates when an invited user accepts an invitation and/or successfully creates a new account through receipt of an invitation from an existing user. The invited user, upon creation of the new account, receives the account having enhanced features. The new user can automatically be connected to the existing user who sent the invitation. The system can also automatically prompt both users to query they wish to be collaborators in a common work space.

Work items hosted by a collaboration environment (e.g., a cloud-based collaboration environment) can be accessed by users (e.g., users 416, 418, and 420) via multiple different devices (e.g., devices 404-414) for viewing, editing, processing or performing other manipulations on work items. The devices can include applications for accessing a server hosting a cloud-based platform or service or other backend web services (hereinafter "cloud-based collaboration platform application") and applications for viewing, editing, processing, or performing other manipulations on work items. The communication between such applications are generally facilitated by a communication mechanism of the OS. For example, in Android OS, the communication mechanism is based on "Intents". As previously described, the underlying communication mechanism are generally insecure, and any data passed between applications are visible to all other application on a device.

Figure 5:
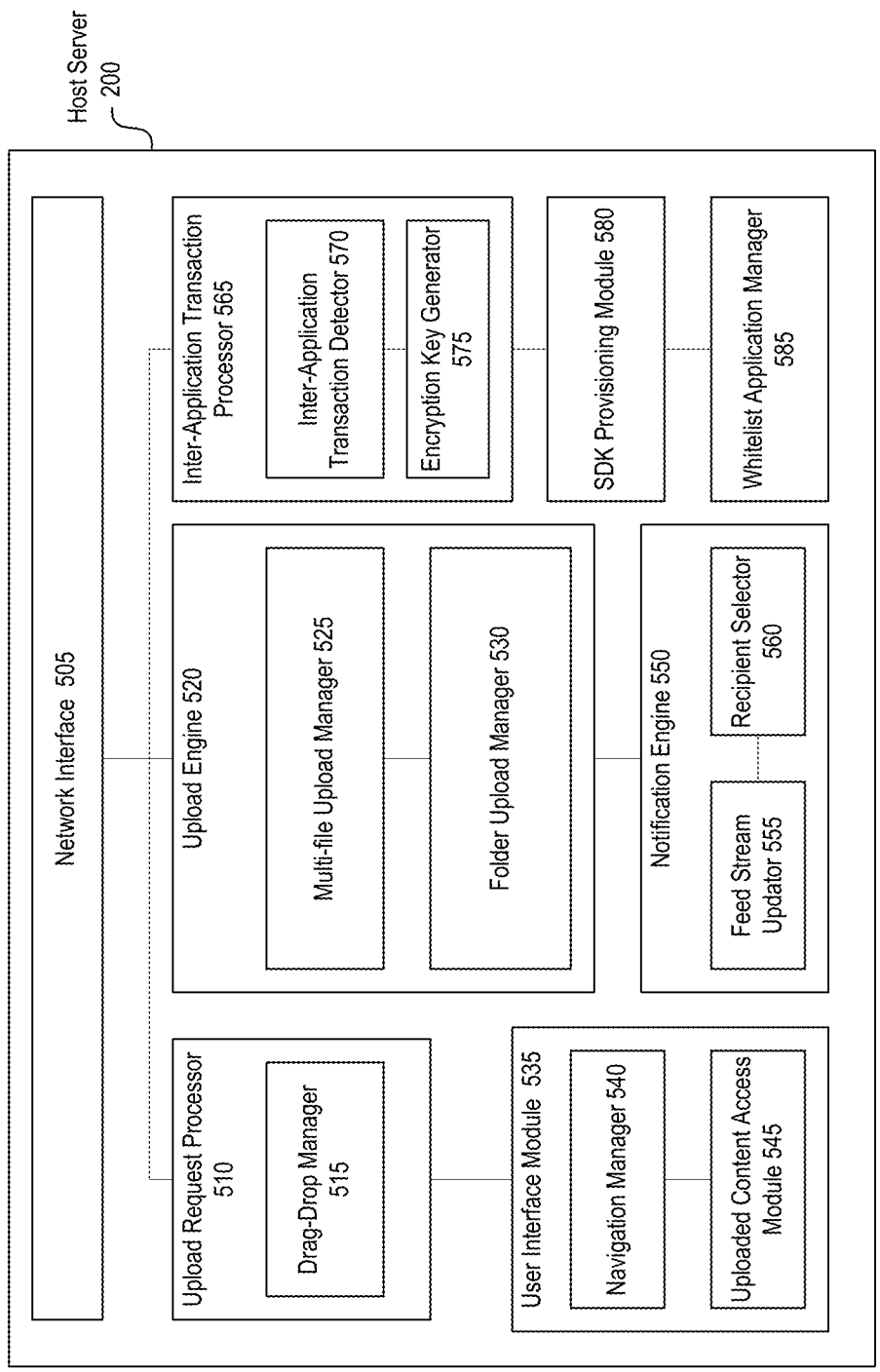
FIG. 5 depicts an example block diagram illustrating an example of components in a host server for cloud-based services and storage accounts accessible via a sending application in a mobile device.

FIG. 5 depicts a block diagram illustrating an example of components in a host server 200 for cloud-based services and storage accounts accessible via a sending application on a mobile device.

The host server 200 of the web-based or online collaboration environment can generally be a cloud-based service. The host server 200 can include, for example, a network interface 505, an upload request processor 510 having a drag-drop manager 515, an upload engine 520 having a multi-file upload manager 525 and/or a folder upload manager 530 and a user interface module 535 having a navigation manager 540 and an upload content access module 545. The host server 200 can also include, for example, an inter-application transaction processor 565 having an inter-application transaction detector 570 and an encryption key generator 575. One embodiment of the host server 200 can also include an SDK provisioning module 580 and a white list manager 585. Another embodiment of the host server 200 further includes a notification engine 550 having, for example, a feed stream updator 555 and/or a recipient selector 560. Additional or less components/modules/engines can be included in the host server 100 and each illustrated component.

The network interface 505 can be a networking module that enables the host server 200 to mediate data in a network with an entity that is external to the host server 200, through any known and/or convenient communications protocol supported by the host and the external entity. The network interface 505 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

One embodiment of the host server 200 includes the upload request processor 510 which can receive, detect, process, identify, parse, translate, and/or determine an activity request. An upload request can be submitted by a user through a user interface of the collaboration platform to upload one or multiple items.

The user can identify the files, content, or work items to be uploaded to the host server 200 one-by-one and queue up multiple items (e.g., including but not limited to files, folders, documents, images, audio, etc.) to be uploaded in a single request. The user can also select all of the items to be uploaded in a single action (e.g., via highlighting or otherwise selecting of icons corresponding to each of the items). In one embodiment, the upload request is generated via a drag-and-drop action of the multiple work items to be uploaded to the host server into a portion of a user interface. Drag-and-drop activated uploaded requests can be detected, handled, received, processed, and/or otherwise managed by the drag-drop manager 515.

In one embodiment, the upload request is generated via a drag-and-drop action of a single folder which includes the multiple work items to be uploaded to the host server 200. For example, the upload request can be generated when a folder having the multiple items on a client device that is to be uploaded is identified through the user interface. In some instances, the folder can include additional folders in a folder hierarchy of multiple items.

In some instances, the user can generate an upload request by activating the upload feature in a tab on a user interface and initiate uploading by selecting (e.g., clicking on or otherwise activating) a button/tab. Once selected, another user interface or a pop-up window may appear allowing the user to navigate through files or folders to select the items to be uploaded.

Once upload requests have been detected and processed, the upload engine 520 can upload the requested item or multiple requested items. The upload engine 520 can, in one embodiment, upload a single item or multiple items (e.g., sequentially or simultaneously) to the host server 200. A multiple item upload may be initiated via a single-step or multi-step user request. A multi-file upload request can be handled, processed, and executed, for example, through the multi-file upload manager 525.

In one embodiment, the multi-file upload manager 525 receives an identification of each of the multiple files to be uploaded (e.g., from the upload request processor 510) and sequentially prepares each individual file for uploading and uploads each file independently. For example, the upload manager 525 can compress one of the multiple files individually, upload it to the host server 200 and decompress the file when uploaded and proceed to perform the same steps with the next file. Preprocessing a file can include, for example, analyzing the file size and type to determine if it is acceptable/valid and/or to identify how best to compress the file. Postprocessing can include, for example, performing one or more of, decompressing the file, validating the file size and name, checking permissions, potentially scanning for malicious software, and/or moving to permanent storage. The step of moving to storage can further include, one or more of, adding the file metadata to the database, creating thumbnails, creating previews, indexing for search, encrypting the file, and/or storing in multiple locations for redundancy. Note that the above processes can occur in any order or synchronously in any combination with one another. The process continues until all items in the request have been uploaded to the host server 200. The upload may automatically progress from one file when completed to the next one in sequence when the user initiates a multi-file upload request.

In one embodiment, the upload engine 520 uploads multiple items in a folder hierarchy based on a single request to upload a folder which has a hierarchy of folders inside, for example, via the folder upload manager 530. In one embodiment, the folder upload manager compresses the multiple items in the folder hierarchy in a single process into a single item and uploads the single item in a single upload process (rather than one by one) to the host server 200. After the merged file of multiple items has been uploaded, the folder upload manager 530 can decompress and subsequently parse the single upload of the single item into the original individual files that were stored as multiple items in the folders in the hierarchy. By merging multiple files into one and performing a single compression, and decompression step, the uploading process can be expedited since the overhead in time to compress and decompress multiple files is mostly eliminated. Some additional benefits of bulk uploading allow the following overhead to be partially or wholly eliminated: repeatedly creating TCP connections for each upload, repeatedly checking the same permissions and storage quotas when processing the files on the server.

One embodiment of the host server 200 includes a notification engine 550. The notification engine 550, can for example, update a feed stream to include an updated feed indicate that an item or multiple items have been uploaded, for example, via the feed stream updator 555. The users that are notified can be selected, for example, by the recipient selector 560, and can include collaborators or the user, or other users meeting a criterion. In some instances, the feed stream is updated in real time or near real time relative to when the upload of the item completed. For real-time updating, the notification engine 550 can utilize another server, or another engine in the same server which provides push functionality.

The notification engine 550 can generally notify users, which can be collaborators of the user who performed the activity in the work space via one or more of many mechanisms, including but not limited to, email, SMS, voice-message, text-based message, RSS, feed, etc.

In one embodiment, the notification is depicted through a web-browser used by the other user to access the web-based collaboration environment, for access in real time or near real time to when the activity was performed by the user. When notifying a user in real time through a web-browser, the notification engine 550 can utilize a push-enabled service to ensure real time notification. In one embodiment, the notification is sent by a component or another server which implements push technology (e.g., the notification server 250 shown in the example of FIG. 2). The push-enabled service can be implemented via long poll or HTTP streaming, for example, by the notification server 250 or another component, device which may be internal to or external to the host server 200. In addition, the host server 200 could utilize other push servers including third party push servers to implement push technology including but not limited to mobile platform push systems and services (e.g., via smart phones or tablets or other portable devices such as iPhone, Android phones, Blackberry, iPad, Galaxy or other tablets, etc.).

One embodiment of the host server 200 includes the user interface module 535, which preserves or enhances user experience before, during, or after an upload request. For example, the user interface module 535 can allow the user to engage in other activities in the collaboration platform while an upload is in progress so as to prevent the user from having to wait for the completion to work in the platform.

In one embodiment, during the upload of a single file (before completion), the user can generally navigate away from the user interface through which the upload request was submitted, for example, via the navigation manager 540 in the user interface module 535. In other words, while a file or item upload is in progress, the user can navigate to other pages to perform other actions or initiate additional actions on the current page without interrupting (stopping or pausing) the in-progress upload.

Similarly, when a multi-file or multi-item upload request is in progress, the user can also navigate away from the user interface which the upload request was submitted prior to completion of the uploading of each of the multiple items to the host server 100. Navigation between pages during an upload of multiple files can also be managed by the navigation manager 540. For example, the upload of the multiple items can continue to proceed and is not interrupted if the user accesses a link on the user interface causing another user interface to launch in a browser. To enable bulk uploading, a new browser window is opened so it operates independently of user navigation. In addition, the web application for uploading and access of the collaboration environment is "pageless," meaning it can be updated asynchronously without a browser page refresh. This allows navigation and to start new uploads in other folders, which can be added to the upload queue.

In addition, during a multi-file upload, an item of the multiple items that has been uploaded to the host server 200 available for access through the user interface, even when some of the multiple items have not yet been uploaded to the host server, via the upload content access module 545, for example. Thus, during an active upload, individual files which have completed uploading can be accessed or interacted with by the user in the collaborative environment without having to wait for the full upload to complete.

In some instances, the item which has been uploaded to the host server is manipulatable by the user through the user interface, without a need for browser refresh. This enhances the user experience by allowing the user to work on the file or otherwise interact with it once it has been uploaded without waiting for other files to finish uploading. For example, the user can view, edit, preview, or comment on the item that has been uploaded, prior to completion of uploading all of the multiple items in an upload request. In one embodiment, buffer space in memory for storage of the individual work items are created in response to the upload request such that when individual items have been uploaded, they can be moved into the created buffer space, and subsequently permanent storage. When the file is in permanent storage, the user can then access and work on the individual item, while others are still being uploaded. In one embodiment, metadata for the file can be created before it is fully uploaded or processed, allowing faster user interaction. However, to actually interact with the file content (full content search, download or preview) the file generally needs to be processed as usual and be stored in permanent storage.

One embodiment of the host server 200 can include an software development kit (SDK) provisioning module 580 and a whitelist application manager 585. The SDK provisioning module 780 can provision SDKs, API keys/tokens, and the like to applications that have been approved for integration with the sending application. The SDK can include certain methods, iconography, and the like that allow inter-application communication and make the inter-application communication capability apparent to users of both applications. For example, the SDK can recognize encoded messages broadcast by the sending application (e.g., the cloud-based collaboration platform application) and include response to method calls to facilitate various data access and transfer scenarios discussed above.

Applications that have integrated with the sending application by implementing the SDK, can be designated as a whitelisted application by the whitelist application manager 585. The whitelisted applications can receive automatic notifications of updates to SDKs, can make API calls to the host server, receive and respond to custom Intents, and the like.

In one embodiment of the host server 200, the inter-application transaction processor 565 can include an inter-application transaction detector 570 and an encryption key generator 575. The inter-application transaction detector 570 can detect an inter-application transaction request from the sending application and/or the receiving application. The transaction request may or may not involve file transfer. For example, if the transaction request is for the launch of the receiving application, no file transfer is involved. The inter-application transaction processor 565 may not take any further steps where no file transfer between applications is involved. However, if the transaction request is to open a file in the receiving application, the inter-application transaction detector 570 may detect it as such, and trigger the encryption key generator to generate an encryption key for encrypting/decrypting the file in transit. In one implementation, the inter-application transaction detector 570 can detect the transaction request based on the encryption key request from the sending application. In one implementation, the inter-application transaction detector 570 can also determine whether a transaction request requires a new encryption key and if so, can trigger the encryption key generator 575 to generate and send a new encryption key. For example, in one implementation, each transaction request involving a file transfer may require a new encryption key. In another implementation, a new encryption key may be required for the first transaction, and the next few transactions may not require a new key. In other implementations, a new encryption may be required for each new session with the requesting application, after expiration of a predefined time period, for each receiving application involved in a transaction, and the like.

In one embodiment, the encryption key generator 575 can generate and send to the requesting application an encryption key for encryption one or more files. In one implementation, the encryption key may have an associated time stamp which can be used to determine the expiration date/time. The encryption key, in one implementation, can be an auth token, a hash of an auth token with or without a time stamp, and the like.

Data Loss Prevention Topologies

Various of the disclosed embodiments contemplate data loss prevention techniques applied in a cloud-based cloud-based platform/service (e.g., cloud-based collaboration platform). Some embodiments support data loss prevention for cloud-based storage customers by identifying key customer requirements. In some embodiments, a customer, e.g. a system administrator, may be able to set rules that are triggered by the detection of, e.g.: a. known information types such as credit card numbers, SSNs, Tax Ids, etc.; b. Keywords identified by the customer: "confidential", or product specific names.

Once triggered, consequent actions may be performed via the rule in some embodiments. For example, the system may email a list of email addresses with notification regarding the file (e.g. network administrators of project managers). Actions may include a "Lock Down", e.g. preventing anyone except an administrator from modifying, deleting, or sharing the file. Actions may also include the preventing, delaying, or omitting of an action, e.g., the suppression of notifications for users, or uses in a group corresponding to the file; etc.

In some embodiments, the rules may be active once set for all modifications, updates, deletions of files. In some embodiments, the rule may be active within a certain service level agreement (SLA) between the client's organization and the cloud-based platform/service (e.g., cloud-based collaboration platform) organization for all files within an enterprise.

Figure 6:
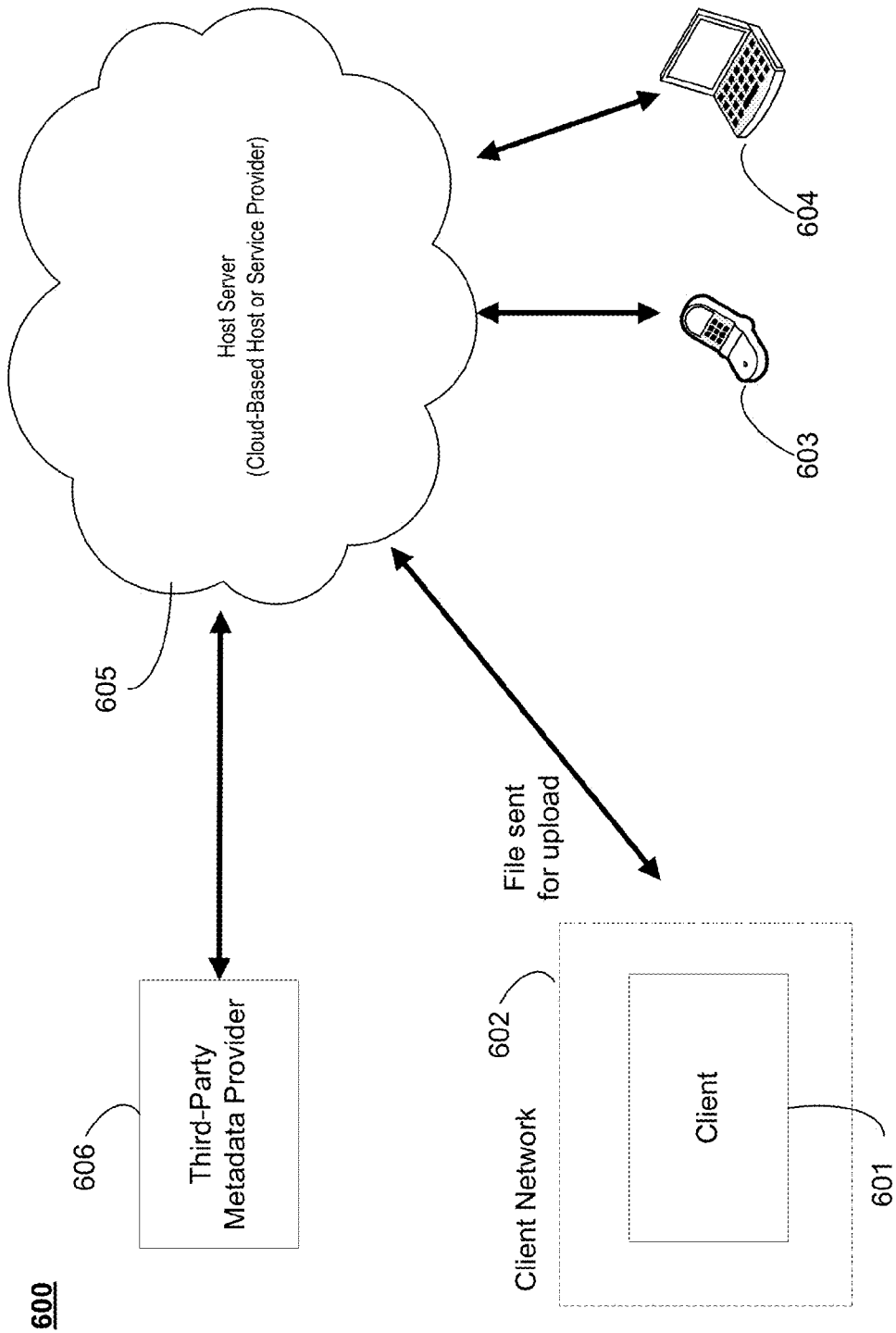
FIG. 6 is an example block diagram depicting a topology for data loss prevention involving third-party metadata.

FIG. 6 is a block diagram depicting a topology for data loss prevention involving third-party metadata 606. The cloud-based platform/service (e.g., cloud-based collaboration platform) host server (e.g., cloud-based host or service provider) 605 (e.g., a collaboration workspace as hosted by host server 200, FIG. 2) may receive a file from a client 601 (e.g., a customer, an enterprise), a request to modify a file, retrieve a file, etc. The client 601 may be located within a network 602 and may be located behind a firewall. The host server (e.g., cloud-based host or service providercloud-based platform/service (e.g., cloud-based collaboration platform) 605 may be a server system accessible over a local network system by the client 601 or it may be accessible over the Internet or other large-scale network. The client 601 may communicate with the host server (e.g., cloud-based or host service provider-cloud-based platform/service (e.g., cloud-based collaboration platform) 605 via any suitable device, e.g. a mobile phone 603, laptop 604, etc.

In the topology 600, the host server (e.g., cloud-based or host service providercloud-based platform/service (e.g., cloud-based collaboration platform) 605 may communicate with a third-party provider of metadata 606 when performing various of the data loss prevention techniques disclosed herein. Provider 606 may be one of several providers communicating with the host server (e.g., cloud-based or host service providercloud-based platform/service (e.g., cloud-based collaboration platform) 605 and may specialize in providing information for particular classes of data loss prevention. For example, one provider may specialize in banking information, and may provide the host server (e.g., cloud-based host or service providercloud-based platform/service (e.g., cloud-based collaboration platform) 605 with updates regarding sensitive data fields. If a banking organization changed its security verification to recognize a graphic image, rather than an alphanumeric pattern, the provider 606 may determine that the information is relevant to data loss prevention and notify the host server (e.g., cloud-based host or service providercloud-based platform/service (e.g., cloud-based collaboration platform) 605 of the change. For another example, the provider 606 may be an entity that is specialized in sensitive information identification (e.g., a specialized search engine and/or a specialized database), and the host server (e.g., cloud-based host or service provider cloud-based platform/service (e.g., cloud-based collaboration platform) 605 may communicate with the provider 606 upon receipt of a file, and can receive knowledge or verification information from the provider 606 of whether an uploaded file contains sensitive information or otherwise triggers a policy/rule. In case that the host server (e.g., cloud-based host or service providercloud-based platform/service (e.g., cloud-based collaboration platform) 605 determines (e.g., by itself, such as explained in FIG. 7 below) or is informed (e.g., by the provider 606) that an file contains sensitive information, actions (e.g., quarantine) can be taken with respect to such file (as explained in more detail below).

A protocol may be established between provider 606 and host server (e.g., cloud-based host service provider 605. In some embodiments, the provider 606 is owned by the same organization as the owner of the host server (e.g., cloud-based host service provider) cloud-based platform/service (e.g., cloud-based collaboration platform) 605 and merely serves the dedicated functions described herein. In some embodiments, the provider 606 is associated with client 601, and may be, e.g., managed by an administrator of the organization with which client 601 is affiliated. In some embodiments, the provider 606 is an organization associated with the sensitive metadata fields, e.g., the banking institution making the change in their verification parameters.

Figure 7:
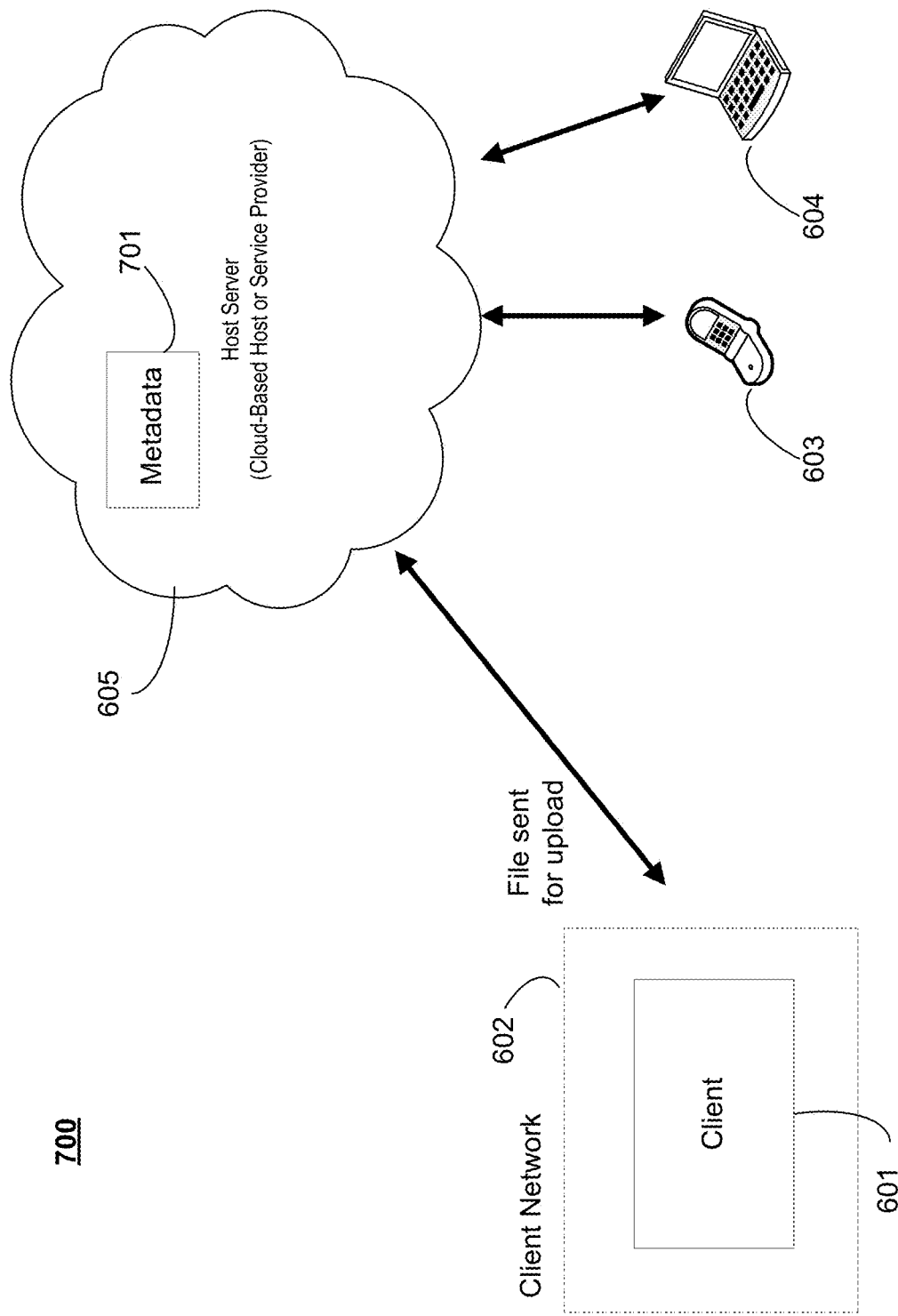
FIG. 7 is an example block diagram depicting a topology for data loss prevention involving local metadata.

FIG. 7 is a block diagram depicting a topology 700 for data loss prevention involving local metadata. In this topology 700, the metadata 701 for data loss prevention instead arises locally within the host server (e.g., cloud-based host or service providercloud-based platform/service (e.g., cloud-based collaboration platform) 605. Here the metadata may be specified manually by a client administrator during, e.g., the policy generation processes described in greater detail herein. Metadata 701 may include, for example, the names and identifying characteristics of products not yet released to the public, which are known to client 601. An administrator may provide the metadata 701 to the host server (e.g., cloud-based host or service provider) cloud-based platform/service (e.g., cloud-based collaboration platform) 605 to ensure that confidential material is not prematurely disclosed to the public via the collaboration and file uploading processes.

Examples of Data Loss Prevention Processes

Figure 8:
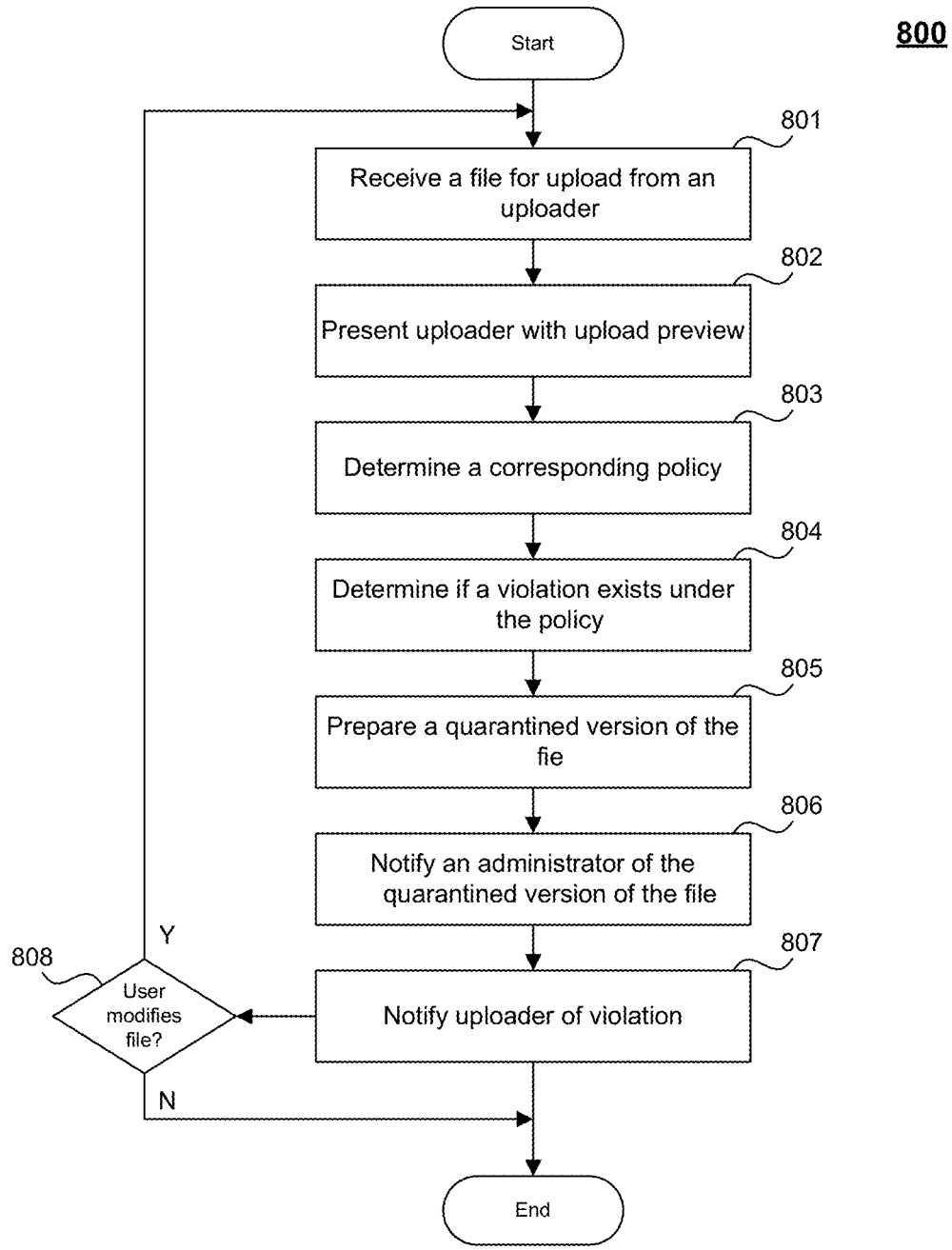
FIG. 8 is an example flow diagram depicting steps in an upload and quarantine review process.

FIG. 8 is a flow diagram depicting certain steps in an upload and quarantine review process.

At step 801, the cloud-based platform/service (e.g., cloud-based collaboration platform) may receive a file for upload from an uploader, such as a client or end user. In some embodiments, at step 802, the system may present the uploader with a preview of their uploaded file.

At step 803, the cloud-based platform/service (e.g., cloud-based collaboration platform) may determine a corresponding policy. Policies may be determined based on the folder owner's enterprise. For example, where the file is associated with a folder in a collaborative workspace, the policies associated with that workspace may be applied to the file.

At step 804, the cloud-based platform/service (e.g., cloud-based collaboration platform) may determine if a violation exists under the policy as described in greater detail herein.

At step 805, the cloud-based platform/service (e.g., cloud-based collaboration platform) may prepare a quarantined version of the file. In some embodiments, this may mean moving a copy of the uploaded version of the file to a designated associated with the folder in which it originated.

At step 806, the cloud-based platform/service (e.g., cloud-based collaboration platform) may notify an administrator of the quarantined file. The notification may be explicitly stated as a policy action. In some embodiments, the notification may be performed independently of the specified actions.

At step 807, the cloud-based platform/service (e.g., cloud-based collaboration platform) may notify the uploader of the violation.

At step 808, the cloud-based platform/service (e.g., cloud-based collaboration platform) may provide the uploader an opportunity to modify the file to remove the violation.

In some embodiments, the system may prevent a user from moving/transferring ownership of folders containing quarantined items to another enterprise.

In some embodiments, when a file is uploaded to the cloud-based platform/service (e.g., cloud-based collaboration platform), there is a time period between upload and finding a DLP policy violation in which the file can be previewed/shared/downloaded Some embodiments allow enterprises (e.g. customer organizations and their administrators) to decide what they want to do during the time window. In some embodiments, the administrator may specify to completely block access to files until they have been cleared of any DLP violation. However, if the file size is large (and consequently requires more time to transfer) or the rules system goes down, this could be a significant amount of time during which uploaded files may be inaccessible.

Accordingly, the administrator may instead put all files in a "not scanned for DLP" state upon upload which will prevent download/sharing but not block preview access to other users. The administrator may also specify to do nothing during that time window.

In some embodiments, when an administrator deletes a file version from quarantine, the file version may remain in storage for some time but not be visible to the end-user or the administrator. The system may provide the administrator with the policy that was violated at scan time and additional information regarding the system state.

Figure 9:
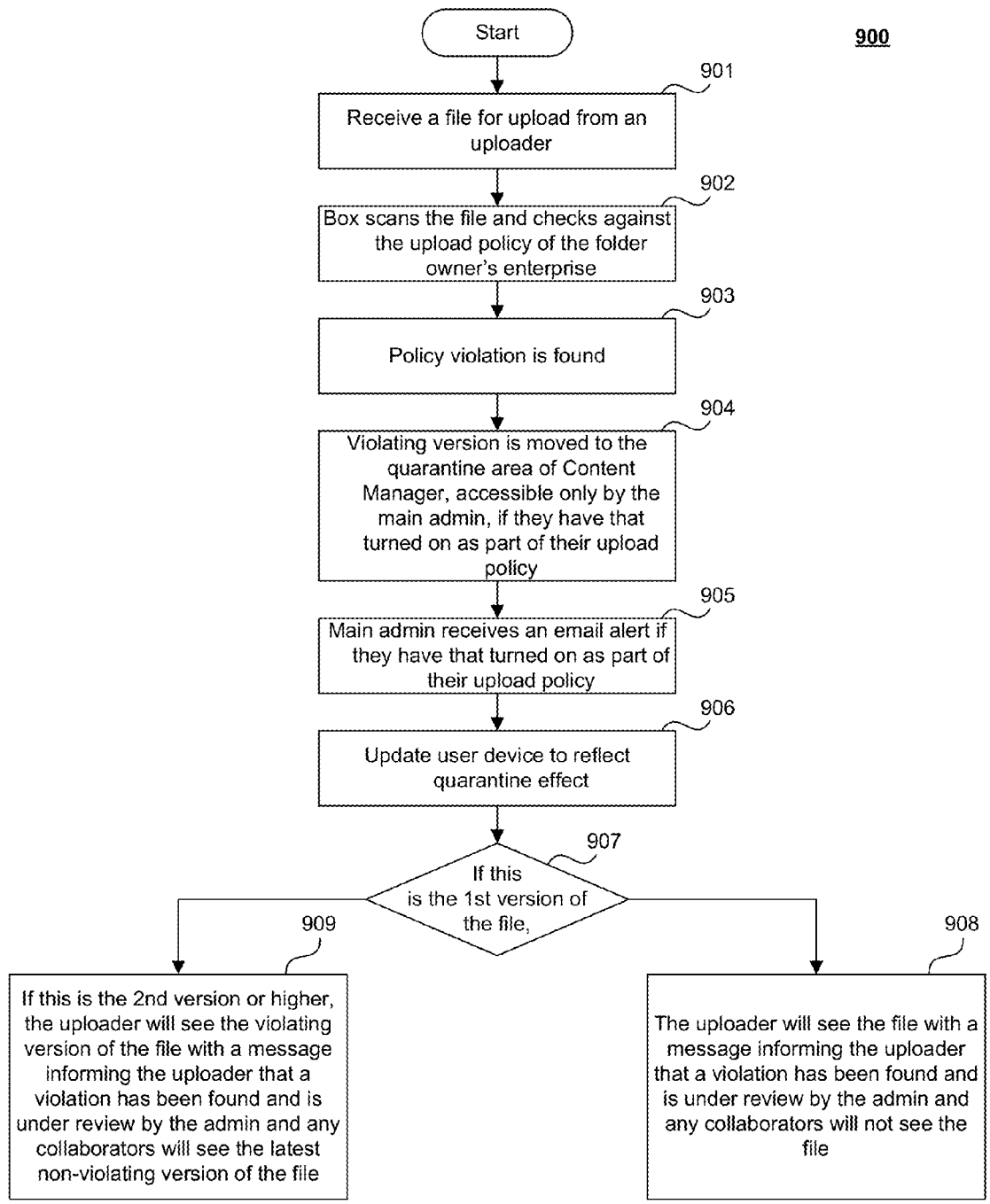
FIG. 9 is an example flow diagram depicting steps in an upload and quarantine review process involving version-based uploader notifications.

FIG. 9 is a flow diagram depicting certain steps in an upload and quarantine review process 900 involving version-based uploader notifications.

At step 901, file is uploaded into the cloud-based platform/service (e.g., cloud-based collaboration platform). The upload may sometimes occur as part of an automated synchronization process between files on a client system and the cloud based cloud-based platform/service (e.g., cloud-based collaboration platform).

At step 902, cloud-based platform/service (e.g., cloud-based collaboration platform) scans the file and checks against the upload policy of the folder owner's enterprise.

At step 903, the cloud-based cloud-based platform/service (e.g., cloud-based collaboration platform) detects a policy violation.

At step 904, the violating version of the file may be moved to the quarantine area of a Content Manager, which may be accessible only by an administrator in some embodiments. Access may be determined based on the policy in some embodiments.

At step 905, the administrator may receive an email alert, e.g., is such an alert is an action specified in the policy.

At step 906, the system may update the client device to reflect the violation procedures.

At step 907, the system may determine whether the uploaded file is the first version of the file to be uploaded. The user may have modified the file to create a second version which also contained a violation and continued to trigger the policy.

If this is the 1st version of the file, at step 908, the uploader may see the file with a message informing the uploader that a violation has been found and is under review by the admin and any collaborators will not see the file. If this is the 1st version of the file, the uploader may see the file on their desktop with a message informing the uploader that a violation has been found and is under review by the administrator. In some embodiments, any collaborators associated with the file will not see the file on their desktop.

If this is the 2nd version or higher, at step 909, the uploader may see the violating version of the file with a message informing the uploader that a violation has been found and is under review by the administrator. In some embodiments, any collaborators may see the latest non-violating version of the file. In some embodiments, the uploader will see the violating version on their desktop with a message informing the uploader that a violation has been found and any collaborators will see the latest non-violating version.

Competing Uploads

Figure 10:
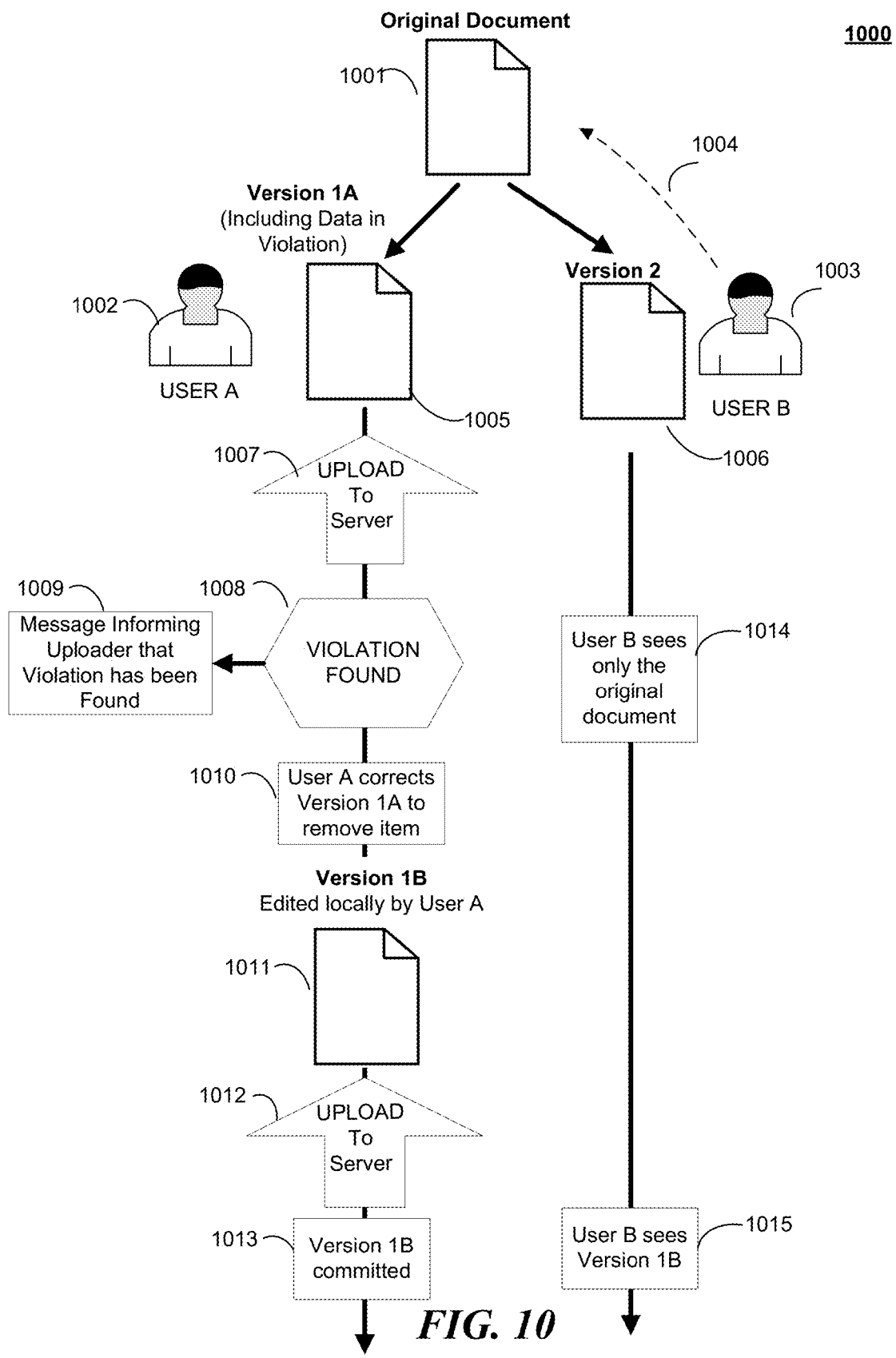
FIG. 10 depicts a series of example events when reconciling quarantined drafts with collaborator revisions, where the collaborator has not performed a corresponding action.

FIG. 10 depicts a series of certain events as may occur when reconciling quarantined drafts with collaborator revisions, where the collaborator has not performed a corresponding action.

The cloud-based platform/service (e.g., cloud-based host or service provider, collaboration platform) may originally contain an original document 1001 (or other object, e.g. a file directory, etc.) viewable to each collaborator in a group. Both User A 1002 and User B 1003 may be members of the same group, and may be in possession of local copies of original document 1001 on their respective client devices.

User A 1002 may modify the file and introduce a violation (e.g., inserting a social security number (SSN)) creating Version 1A 1005. As part of an automated synchronization event, or directly by an action of User A 1002, Version 1A 1005 may be uploaded to the cloud-based host or service provider, platform/service (e.g., cloud-based collaboration platform) 1005. Following application of the policy, the cloud-based host or service provider, platform/service (e.g., cloud-based collaboration platform) may detect a violation at 1008 and provide a message 1009 to User A 1002 as discussed above. At this time, User B 1003 sees only the original document 1014 on the cloud-based host or service provider. User B 1003 may begin editing a local copy of the document, Version 2 1006, but has not yet uploaded it.

While User B 1003 is preparing their document, User A 1002 corrects their local copy 1010 to remove the violating content, thereby creating Version 1B 1011. After uploading 1012 Version 1B 1011, the cloud-based host or service provider recognizes that there is no violation and commits the version 1013. Following this event, User B will see Version 1B 1015 on the cloud-based host or service provider and any edits will be made relative to that version.

Figure 11:
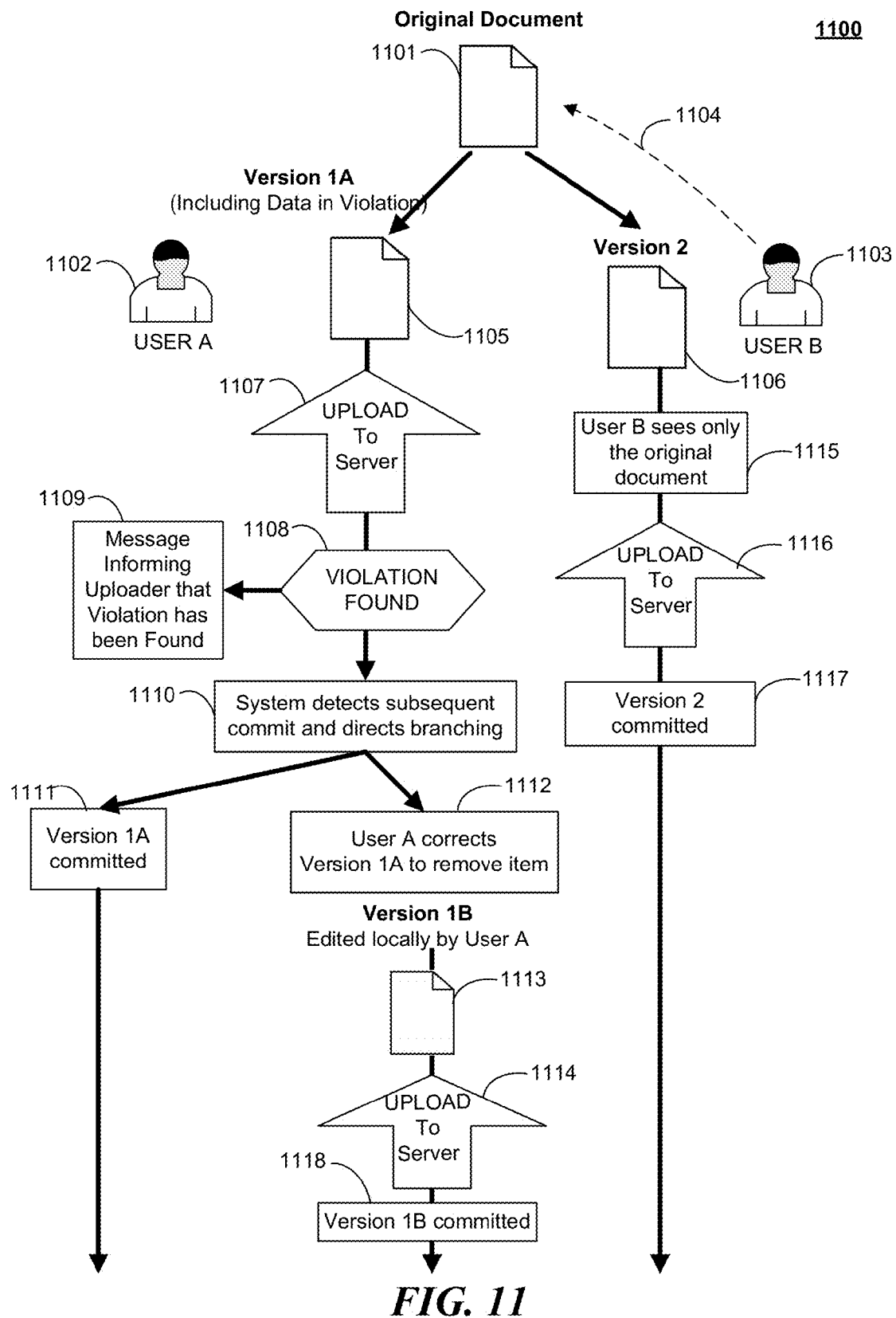
FIG. 11 depicts a series of example events as may occur when reconciling quarantined drafts with collaborator revisions, where the collaborator has performed a corresponding action.

FIG. 11 depicts a series of certain events as may occur when reconciling quarantined drafts with collaborator revisions, where the collaborator has performed a corresponding action. As in FIG. 10, two users 1102 and 1103 are editing an original document 1101. As before User A 1102 introduces a violation which is detected and quarantined by the cloud-based host or service provider. However, although User B 1103 initially sees the original document, User B 1103 uploads 1116 their edited draft Version 2 1106 which is committed 1117 prior to the resolution of User A's 1102 violation.

Consequently, the cloud-based host or service provider detects 1110 the commit by User B and branches a separate quarantined storage of Version 1A 1111. In a separate branch, User A 1102 corrects Version 1A to remove the violating content 1112, thereby generating Version 1B 1113. User A 1102 may then upload Version 1B to the server at 1114 which will be separately committed 1118. Among other benefits, this technique may prevent accidental data loss from executing DLP policies.

In some embodiments, an administrator may review the quarantined file and perform one of several actions. The administrator may delete the file permanently from the cloud-based platform/service (e.g., cloud-based collaboration platform). The administrator may restore the file—sends the violating version back to its original upload location to replace the dummy version. The administrator may mark the file as a false positive—sends the violating version back to its original location and alerts the DLP system in the host server (e.g., the host server of the cloud-based platform/service) that the quarantine was a false positive. File owner (and in some embodiments, the owner's collaborators) may receive an email when the file version is restored/deleted/marked as false positive.

Further, to enhance a reader's understanding, details of one or more of the functionalities and/or design options of the DLP system in the host server (e.g., the host server of the cloud-based platform/service) are discussed in the following; however, these details may not be necessary for a person having ordinary skill in the art to practice the embodiments disclosed herein.

1. Sync/Mobile embodiments—When a user adds or updates a file to a folder in synchronization that gets quarantined, the experience on the owners desktop as well as for the collaborators on that file may differ depending on the DLP system's implementation:

In some embodiments, once a violation has been found, the violating version is replaced with a dummy file for both the uploader and collaborators. In some embodiments, once a violation has been found, the violating version can be replaced with a dummy file (because the collaboration platform is designed not to serve an older version) for collaborators, but the uploader still has access to the quarantined version on their desktop and receives a notification (either through email or through an icon/messaging delivered via a client application (e.g., a "sync")). However, it is noted that other collaborators could revert to an older version before a user corrects the violation and the user may lose the work when that's synced back down and overwritten. Also, it is noted that the user is working off of a different version than other collaborators.

2. Multiple enterprise rules—when a file is uploaded to a folder, depending on the implementation, the DLP system of the cloud-based platform can apply the DLP policies of the enterprise or customer/client (e.g., client 601 in the example of FIG. 6) whose managed user is uploading the content, or apply the DLP policies of the enterprise whose managed user owns the folder the content is being uploaded into.

In some embodiments, the DLP system can apply the DLP policies of the enterprise whose managed user is uploading the content. However, it is noted that this technique may create inconsistency with other treatment of content ownership in other places within the workspace. Also, if a policy violation is found and the file is quarantined, the administrator would have access to content that is owned by another enterprise.

In some embodiments, the DLP system can apply the DLP policies of the enterprise who owns the folder the content is being uploaded into. However, it is noted that the DLP system might not 100% allow enterprises to prevent their users from putting unwanted information into the collaborative workspace.

3. Moving quarantined files across enterprises—when a user move a file from one enterprise to another and there is a quarantined version in the file. For example, if there is a file with multiple versions, and in which V1 is good, V2 is quarantined, and V3 is good, and then the file is moved from Enterprise A to Enterprise B. In some embodiments, the quarantined version (e.g., V2) is destroyed when copy/move to another enterprise.

4. Time window—when a file is uploaded into the collaborative workspace, there is a time period between upload and finding a DLP policy violation in which the file can be previewed/shared/downloaded.

In some embodiments of the DLP system, the system can allow enterprises/customers (e.g., clients 601) to decide what they want to do during the time window with the following options: (a) Completely block access to files until they have been cleared of any DLP violation; however, it is noted that if the file size is large or the DLP system goes down, this may take a significant amount of time during which uploaded files will be inaccessible; (b) Put all files in a "not scanned for DLP" state upon upload which will prevent download/sharing but not block preview access; and (c) Do nothing during that time window.

5. Deleting versions—when an admin deletes a version from quarantine, is it deleted or destroyed?

In some embodiments of the DLP system of the host server, the version should be completely destroyed (e.g., purged from the trash and not accessible to the workspace in any way).

Rules System Overview

Various embodiments contemplate a rules system for enforcing data loss prevention policies. For example, a policy may be a collection of rules. In some embodiments, a rules engine may be used to perform event-based automation and to allow system administrators and end-users the ability to configure rules that identify events under which Box executes certain actions. Rules may provide security for the system by preventing the undesirable disclosure of sensitive information via the collaboration process. Administrators may need the ability to identify events that raise potential security concerns and create rules that direct to cloud-based platform/service (e.g., cloud-based collaboration platform) to execute certain actions based upon those events being triggered.

Rules may be integrated with business processes in some embodiments. For example, rules may increase engagement between administrators and end users within an organization. Administrators may need the ability to put their content into a business context and configure rules for different types of jobs or processes.

Automation may make end-users more efficient, but many business documents are regularly encircled by review and approval processes. The addition of task creation based on upload events, as provided in some embodiments, may expand use cases and drive dependencies. That is, a project manager may monitor or adjust actions so that even where no violation is detected, actions are taken that facilitate advancement of the project associated with the uploaded file (e.g., review meeting scheduled, milestone achieved, etc.).

Rules System

In some embodiments, administrators and end-users can create if-then statements identifying, e.g.: events in an events API and actions that the in the host server (e.g., the host server of the cloud-based platform/service) may execute when the event is triggered.

In some embodiments, the rules engine may execute, e.g., one or more of the following actions in response to being triggered by file content: a. Email alert; b. File Deletion; c. Quarantine; d. Create and assign a task; e. Review; f. Approve; g. Decline; h. Update a field; i. Move to a folder; j. Rename; k. Convert a file; l. Block an action; m. Send to; n. Copy a file (to a folder); o. Share a link (with permissions x to email address); p. Run a search; q. OCR a file; r. Make a custom link.

Administrators may be able to satisfy the security use case of DLP and alerts for abnormal activity by creating policies to govern certain activity within the cloud-based file cloud-based platform/service (e.g., cloud-based collaboration platform). An appropriate co-admin role may be present to set policies in some embodiments The policy tab may contain a plurality of features. For example, administrators can add, edit, delete the following policies. For example, an administrator may modify an Upload policy. If a file is uploaded into the cloud-based platform/service (e.g., cloud-based collaboration platform) and includes, for example, SSN, banking information, health-related information, a specified term, or other sensitive information, etc. then the rule associated with the policy may send that version of the file to the administrator-managed quarantine folder.

With regard to Download policies, corresponding rules may specify that if a [specified #] files are downloaded in [specified time period], send an email alert to [specified people].

With regard to policies Sharing, the corresponding rules may indicate that if a file/folder is shared with [specified domains], then send an email alert to [specified people] following the detection.

Automation

In some embodiments, automation may satisfy the business process use case by allowing administrators to set up automated processes when events occur within the cloud-based platform/service (e.g., cloud-based collaboration platform). The appropriate co-admin role may need to be present to set up an automation.

In some embodiments, administrators can set up automation steps using the following events and actions. An automation step may include one or more rules, specifying condition-action pairings. Events may include, e.g.: Upload; Move; Copy; Assign a task; Task marked as complete. Actions may include, e.g.: Move; Copy; Assign a task.

In some embodiments, interfaces may be provided for administrators to: create a new automation; edit existing automations; delete existing automations; create a step in an automation by selecting from a file or task. In some embodiments an administrator can create a step in an automation by selecting from the following events (variable names in brackets): is uploaded to [specified folder]; is completed. In some embodiments an administrator can create a step in an automation by selecting from the following actions: Assign a task to [specified users]; Move to [specified folder].

In some embodiments an administrator can create a multi-step approval process by tying together the following steps: If a file is uploaded to [specified folder], then assign a task to [specified users]; if a task(s) on a file in [specified folder] is/are completed, then move the file to [specified folder]. In some embodiments, an administrator may view a summary of the new step they have just created after selecting an item from the drop down lists in a step. The steps may together specify a series of conditions for triggering one or more rules.

Figure 12:
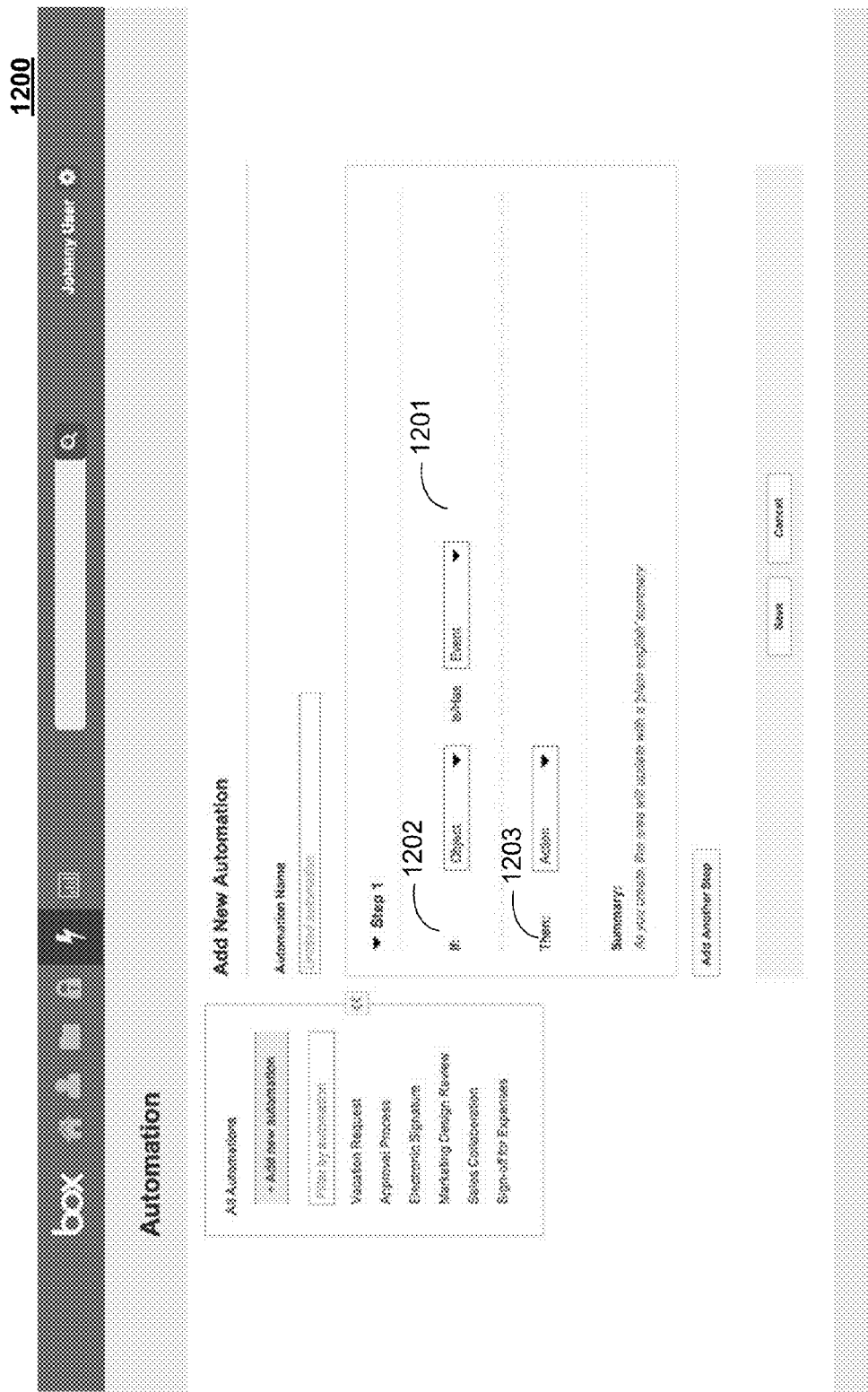
FIG. 12 is an example screenshot of an Automation interface, particularly an interface for a adding a first step in a new automation instantiation.

FIG. 12 is an example screenshot 1200 of an Automation interface, particularly an interface for a adding a first step in a new automation instantiation. An automation may comprise a plurality of steps. Here, a first step 1201 is presented to the user comprising an "IF" 1202 and a "THEN" 1203 block. IF block 1202 may include an "object" selection and an "event" selection. There may be many different types of steps and FIG. 12 merely depicts an example "Is/Has" conditional relation.

The THEN block 1203 in this example provides for a single action to be input. In some embodiments, the THEN block 1203 may specify a plurality of actions, or additional conditions/steps to perform before taking an action.

Figure 13:
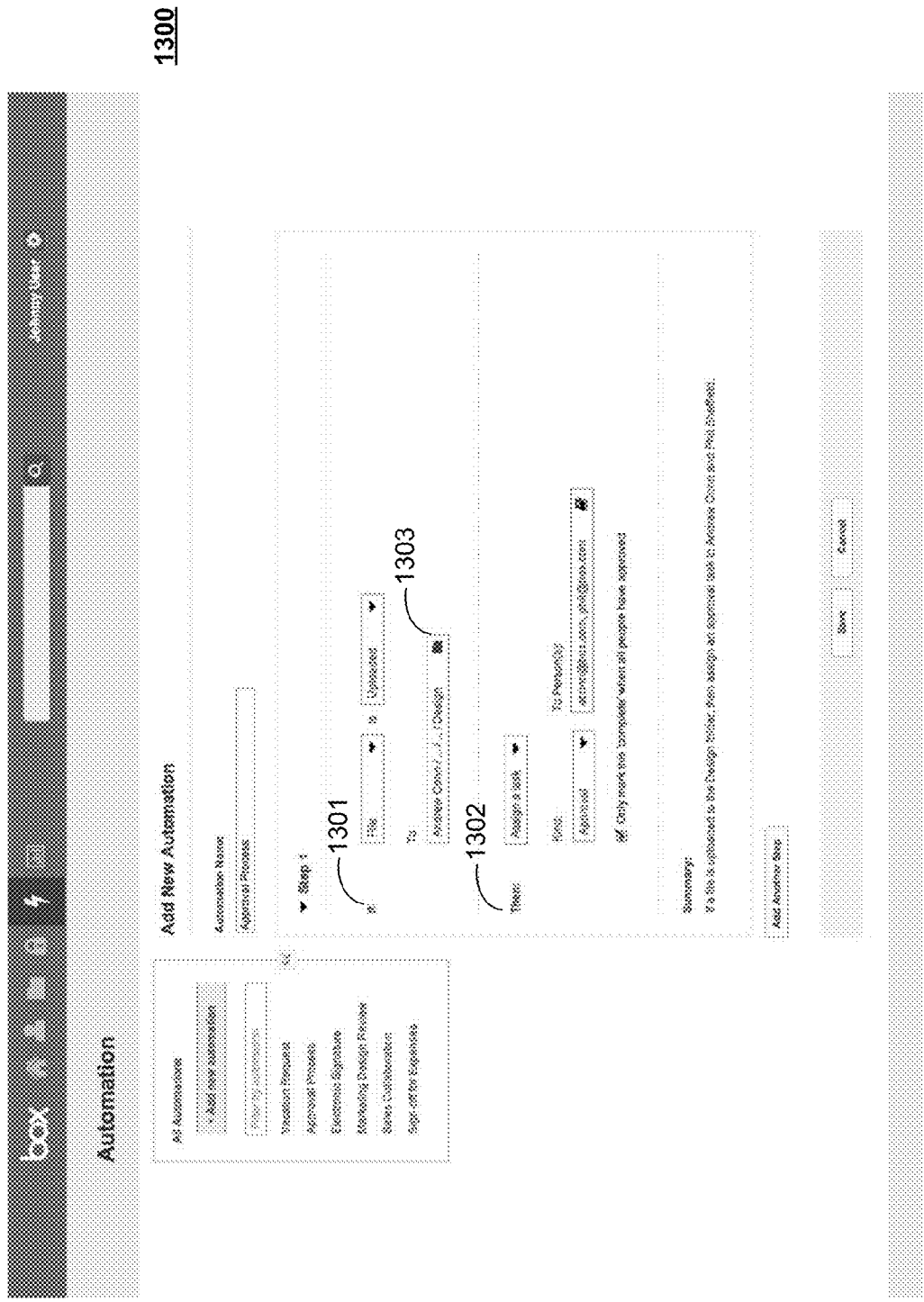
FIG. 13 is an example screenshot of an Automation interface, particularly an example step addition in a new automation instantiation.

FIG. 13 is an example screenshot an example screenshot 1300 of an Automation interface, particularly an example step addition in a new automation instantiation. In the IF block 1301 the administrator may specify that the condition is for a file to be uploaded to a particular folder. In some embodiments additional conditions apply, such as the identity or privileges of the user performing the upload.

In the THEN block 1302 the consequent action is identified as a task, of the kind "Approval", to be delivered to a plurality of specified persons. Many of the additional fields specifying the particulars of an action of condition may appear following an initial selection of the type of action or condition. For example, the field "Kind" may appear in the interface only after "Assign a task" has been selected.

Figure 14:
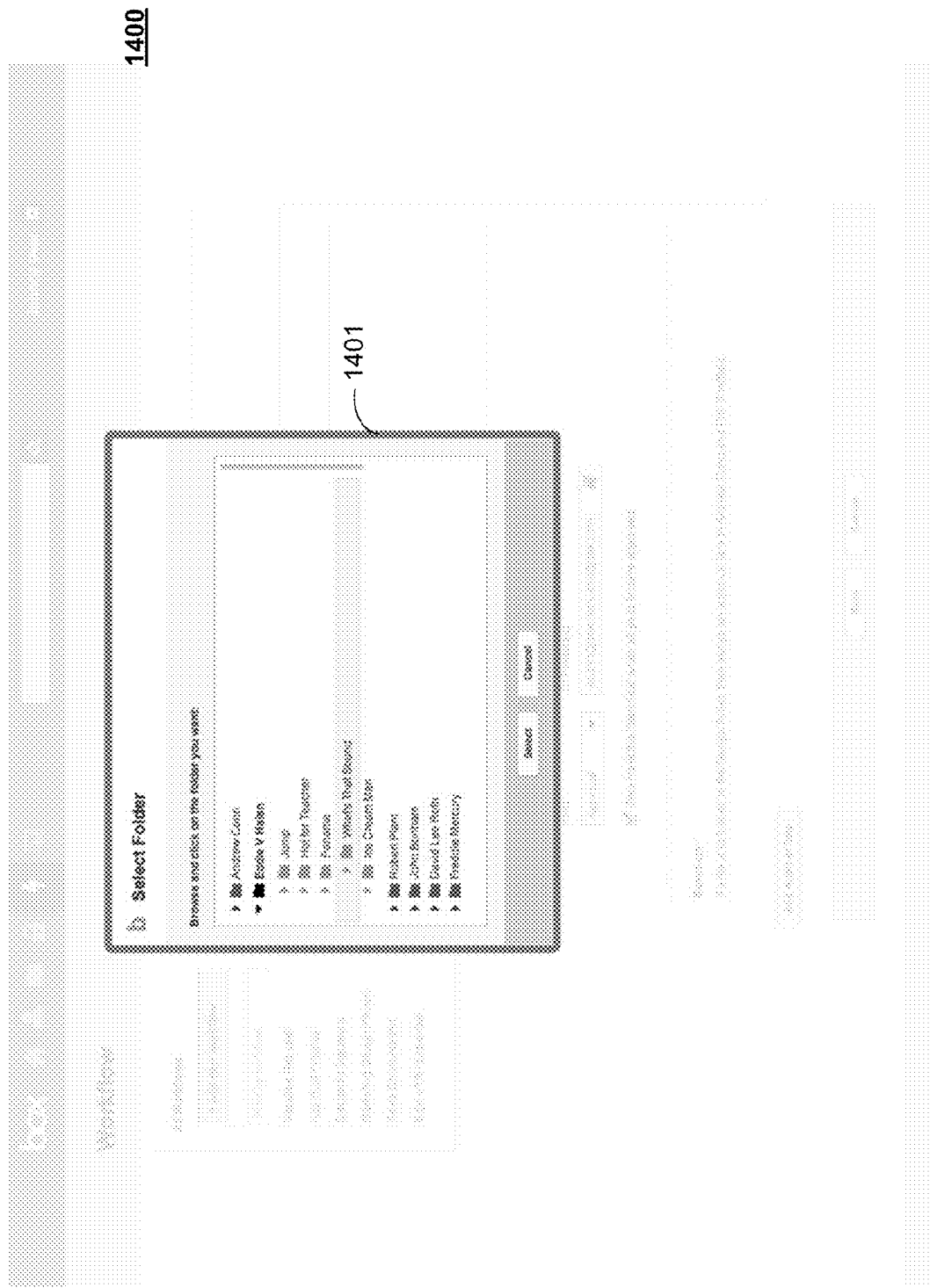
FIG. 14 is an example screenshot of an Automation interface, particularly an interface for selecting a folder as part of a step addition to a new automation instantiation.

FIG. 14 is an example screenshot an example screenshot 1400 of an Automation interface, particularly an interface for selecting a folder as part of a step addition to a new automation instantiation. Folder selection interface 1401 may be presented to the administrator following selection of a folder in the interface. For example, the administrator may have selected the folder 1303 using the folder selection interface 1401.

Figure 15:
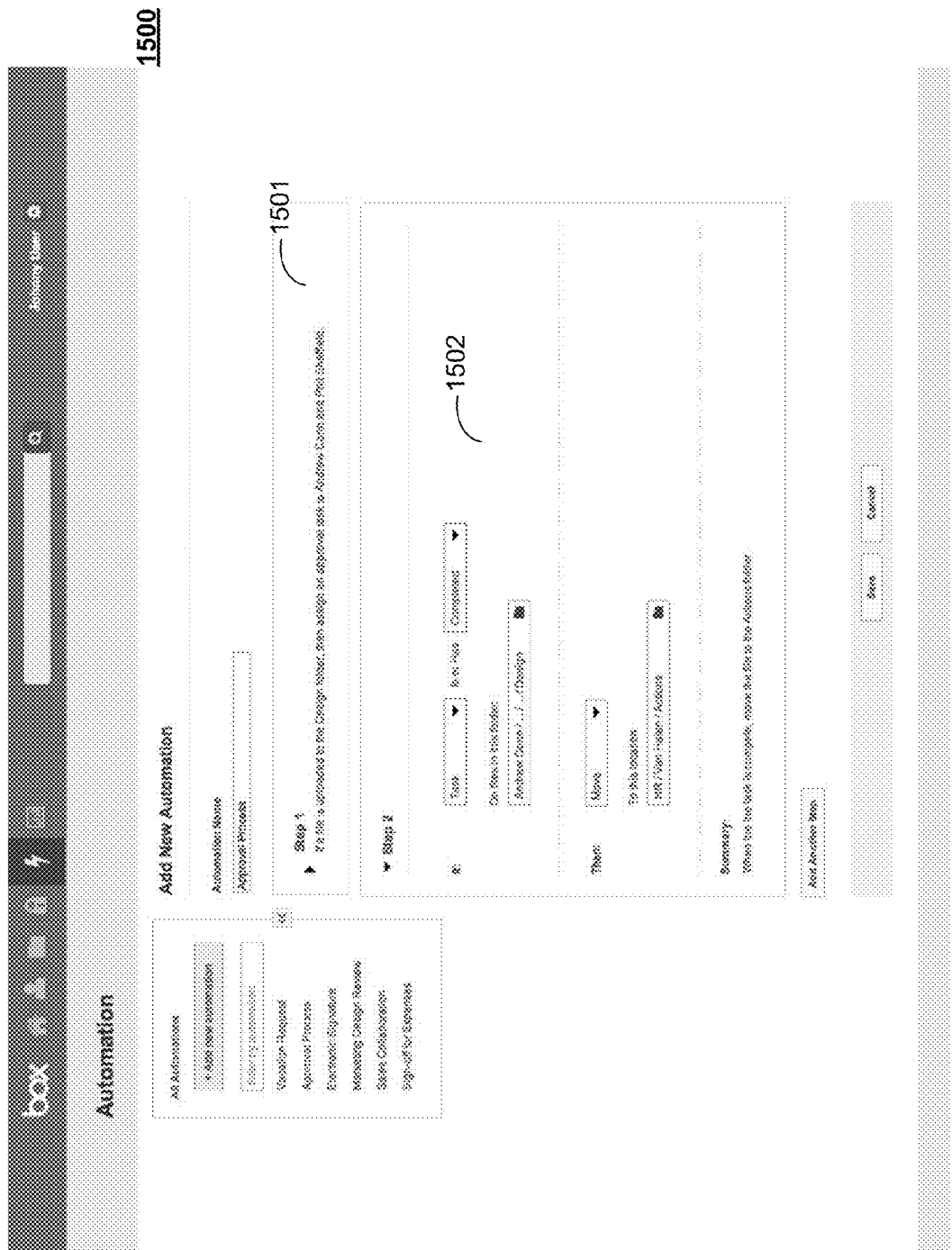
FIG. 15 is an example screenshot of an Automation interface, particularly an interface for adding a second step in a new automation instantiation.

FIG. 15 is an example screenshot an example screenshot 1500 of an Automation interface, particularly an interface for adding a second step in a new automation instantiation. A historical indication 1501 of the first step's specification is depicted above the second step's input fields 1502. In some embodiments, such as the one depicted, the first step is collapsed to a summary description before the second step's inputs are presented. In this example, the second step moves a folder to a particular location when a task on files in a particular folder is completed.

Figure 16A:
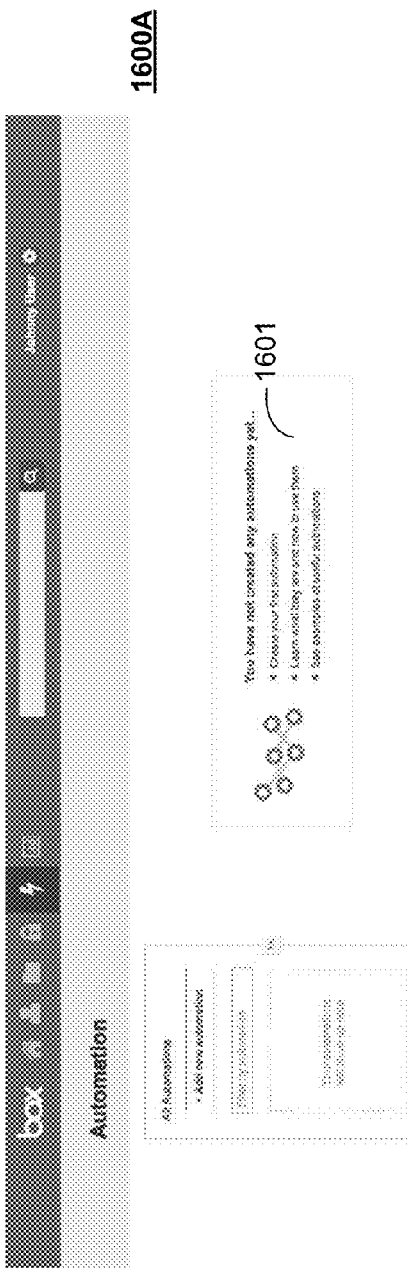
FIG. 16A is an example screenshot of an Automation interface, particularly an interface explaining that no automation instantiations have yet been created.
Figure 16B:
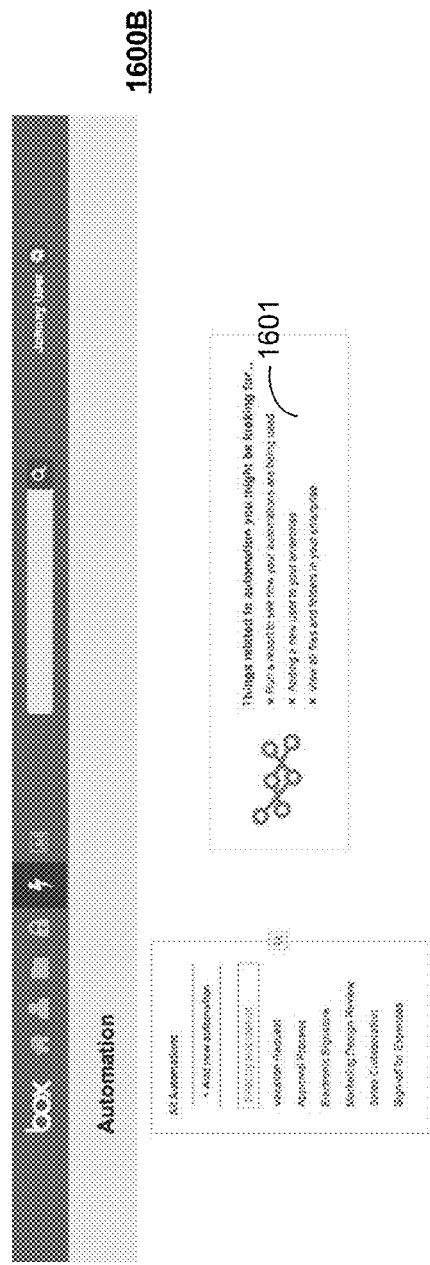
FIG. 16B is an example screenshot of an Automation interface, particularly an interface offering suggestions for creation of a new automation instantiations.

FIG. 16A is an example screenshot an example screenshot of an Automation interface, particularly an interface explaining that no automation instantiations have yet been created. FIG. 16B is an example screenshot of an Automation interface, particularly an interface offering suggestions for creation of a new automation instantiations. In this example, the administrator is invited to perform one of several possible activities.

Figure 17:
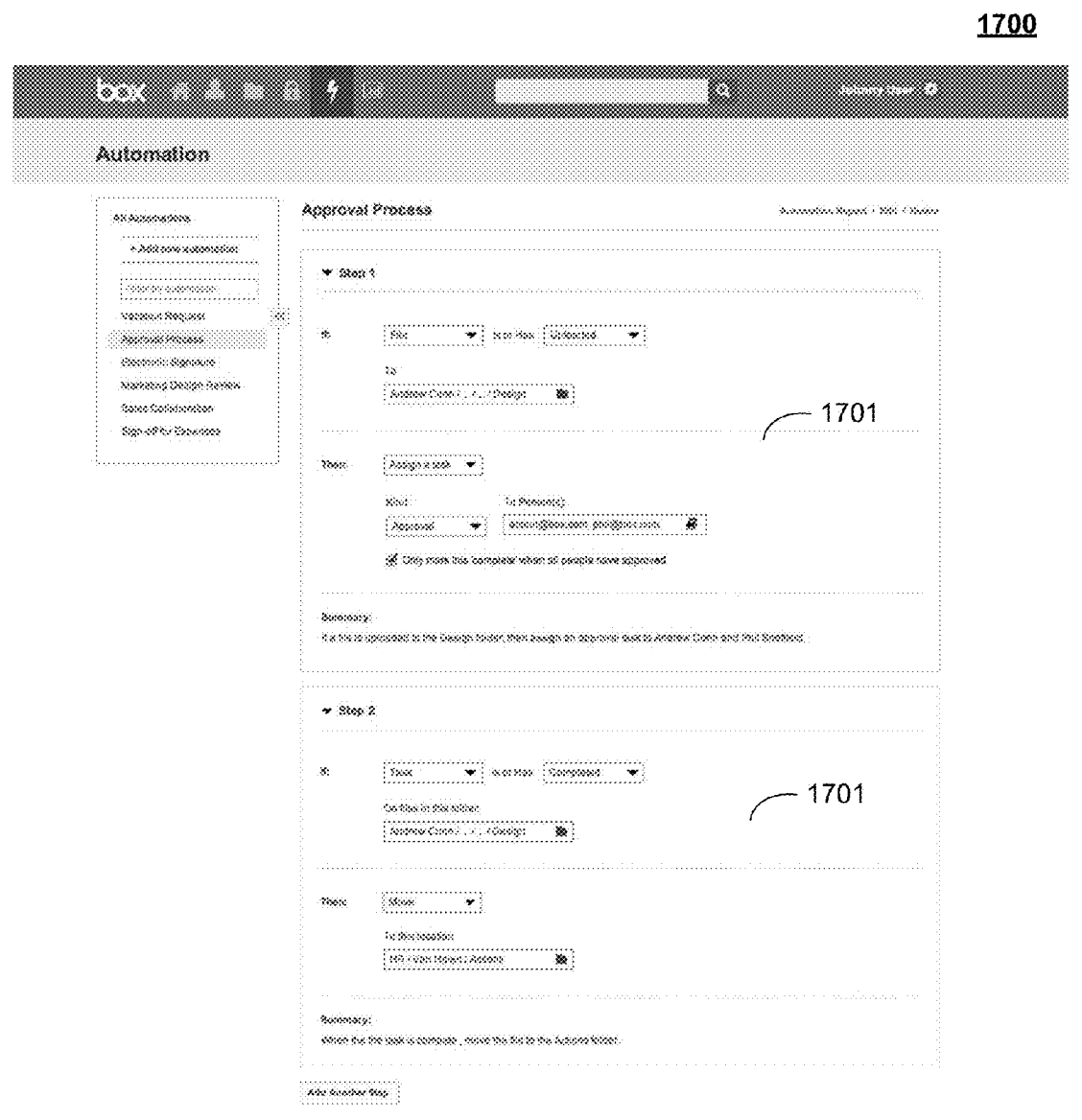

FIG. 17 is an example screenshot an example screenshot 1700 of an Automation interface, particularly an interface summarizing a first and a second step in a new automation instantiation. In this example, the step interfaces 1701-1702 are presented simultaneously without either being collapsed. In this manner the administrator may assess the sequential relation of the steps.

Figure 18:
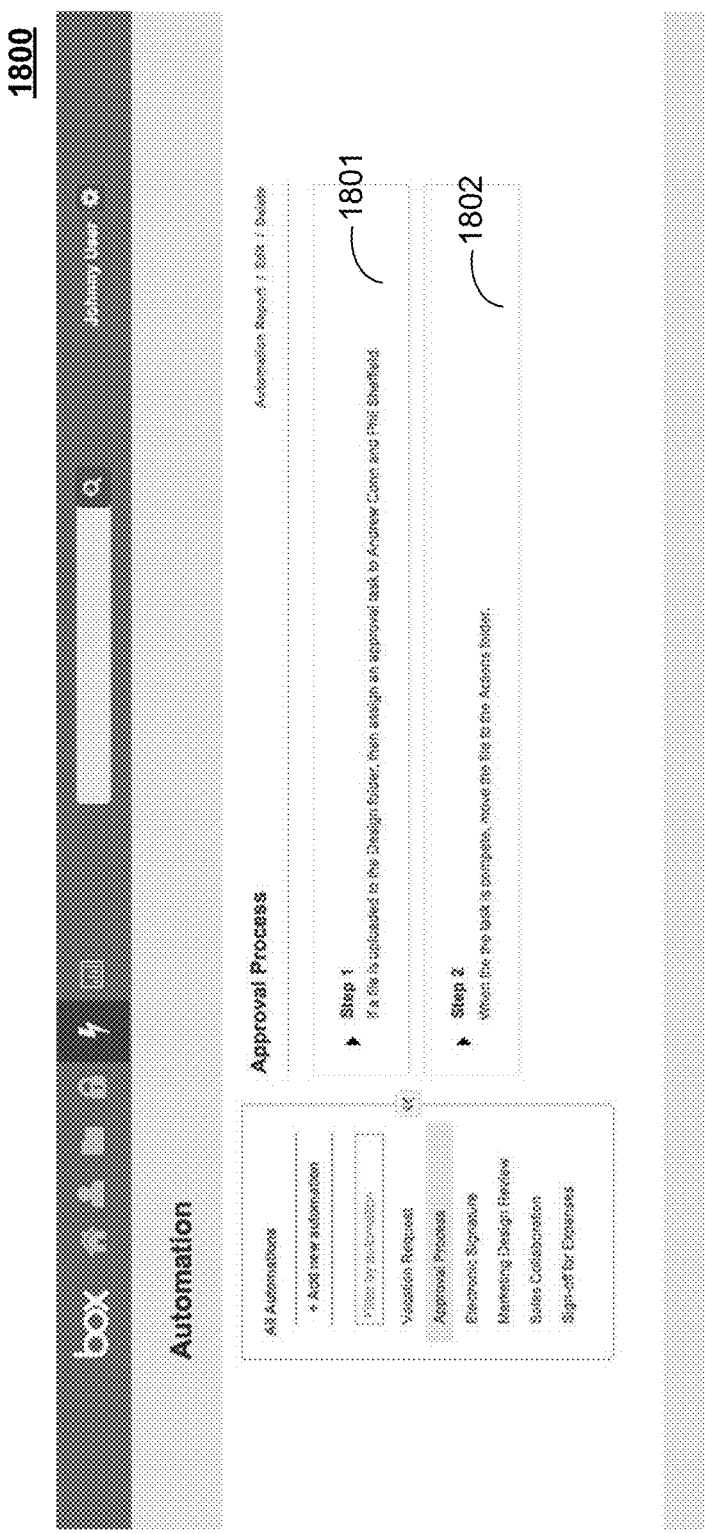
FIG. 18 is an example screenshot of an Automation interface, particularly an interface depicting an approval process for a new automation instantiation.

FIG. 18 is an example screenshot an example screenshot 1800 of an Automation interface, particularly an interface depicting an approval process for a new automation instantiation. In this example each of the step interfaces 1801-1802 have been collapsed and summaries of their contents depicted.

Figure 19:
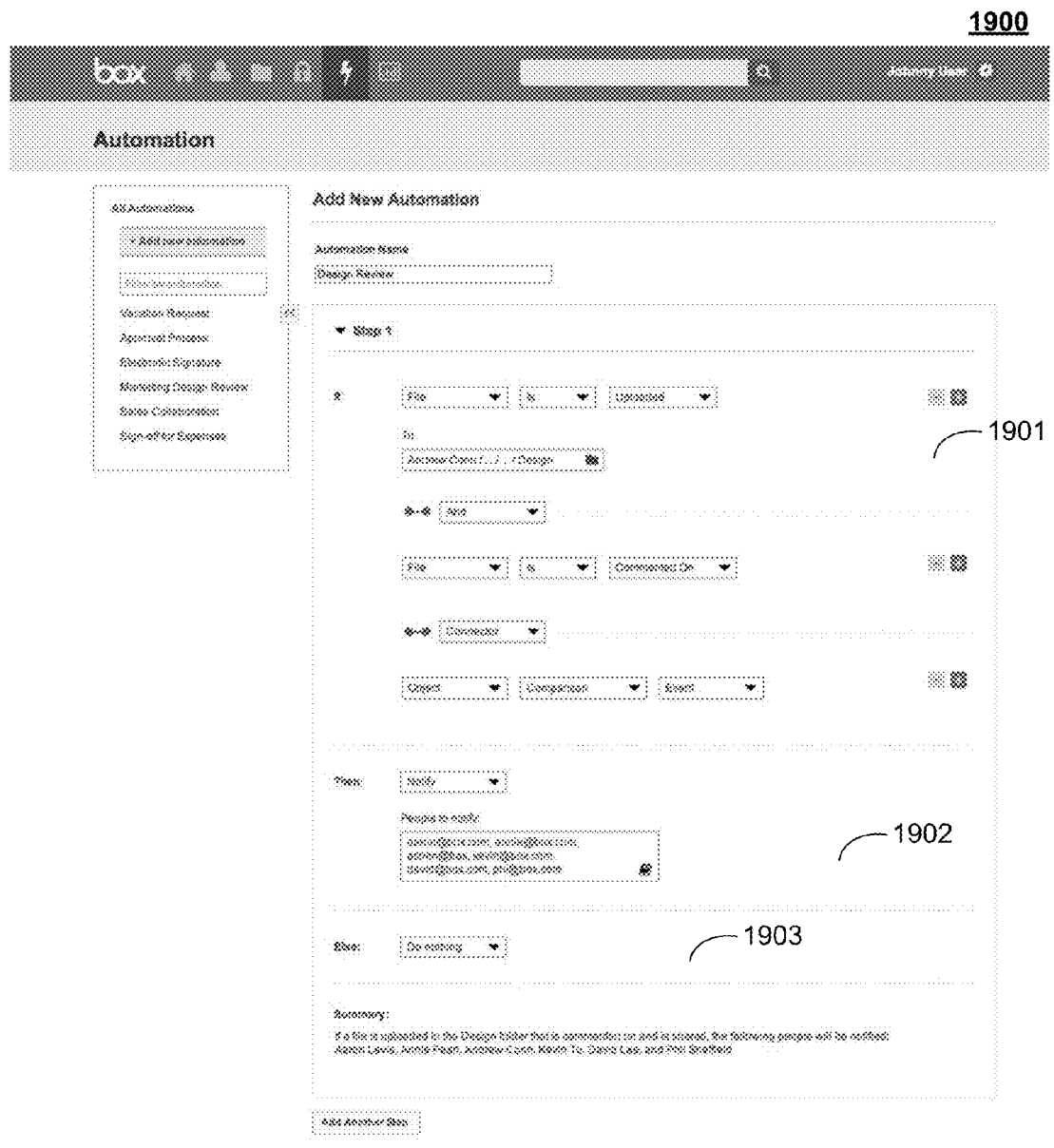
FIG. 19 is an example screenshot of an Automation interface, particularly an interface for adding a design review step in a new automation instantiation.

FIG. 19 is an example screenshot an example screenshot of an Automation interface 1900, particularly an interface for adding a design review step in a new automation instantiation.

The interfaces 1900 may include an "IF" portion 1901 specifying various conditional input parameters, and consequent "THEN" portion 1902 an "ELSE" alternative portion 1903.

Policies

In some embodiments, a Policies Tab presented to an administrator may allow administrators to add a new policy selecting, e.g., from the following options: Upload policy; Download policy; Sharing policy; Admins can edit an existing policy; Admins can delete an existing policy; etc.

Items that have been quarantined if a policy is deleted are handled.

In some embodiments, if an administrator is adding a new upload policy, the administrator may choose from the following options (in some embodiments the administrator can select multiple in some embodiments) for the system to detect upon upload of a file: a. Social Security Number; b. Credit Card Number; c. Keyword (e.g., confidential, or privileged); d. HIPAA; e. IBAN; f. bank account numbers (e.g., and/or any additional terms or metadata indicating sensitive information, content from 3rd party providers); etc.

If an administrator is adding a new upload policy, in some embodiments the administrator may choose from the following options (in some embodiments they can select multiple) if a document contains one of the items selected in #2: Move the file to quarantine; Notify an email or multiple emails; Only track for reporting purposes.

In some embodiments, once an administrator clicks the "Start Policy" button, any version of a file that is uploaded into the cloud-based cloud-based platform/service (e.g., cloud-based collaboration platform) may be automatically scanned for any violations to an existing upload policy and if a violation is found, that version of that file may be moved to a quarantine folder accessible only to the administrator.

In some embodiments, an administrator can create a download policy (or particular rule in a policy) to alert the administrator when a user has downloaded an abnormal amount of content in a certain time period. If an administrator is adding a new download policy, in some embodiments, they can choose the number of files downloaded in a specified time period that will trigger an alert to the administrator.

Actions may include: sending a notification email to one or more email addresses (e.g., separated by commas); track for reporting purposes; if the set number of files is downloaded within the set period of time period, an email alert may be triggered.

Once an administrator clicks the "Start Policy" button, the system may begin tracking download activity for the enterprise's users to detect if a download threshold has been hit and if so may generate an email alert to the emails listed. An administrator may create a sharing policy to alert the administrator when content is shared to specific domains If an administrator is adding a sharing policy, in some embodiments the administrator may specify the following: one or more domains, separated by commas, for the system to watch for sending a notification email to one or more email addresses, separated by commas. In some embodiments, once an administrator clicks "Start Policy," if a user sends a shared link or adds a collaborator to a file/folder from one of the listed domains, an email alert may be sent to the emails listed. In some embodiments, the sharing policy may specify email alert templates. The interface may permit the administrator to tailor the contents of the interface.

Figure 20:
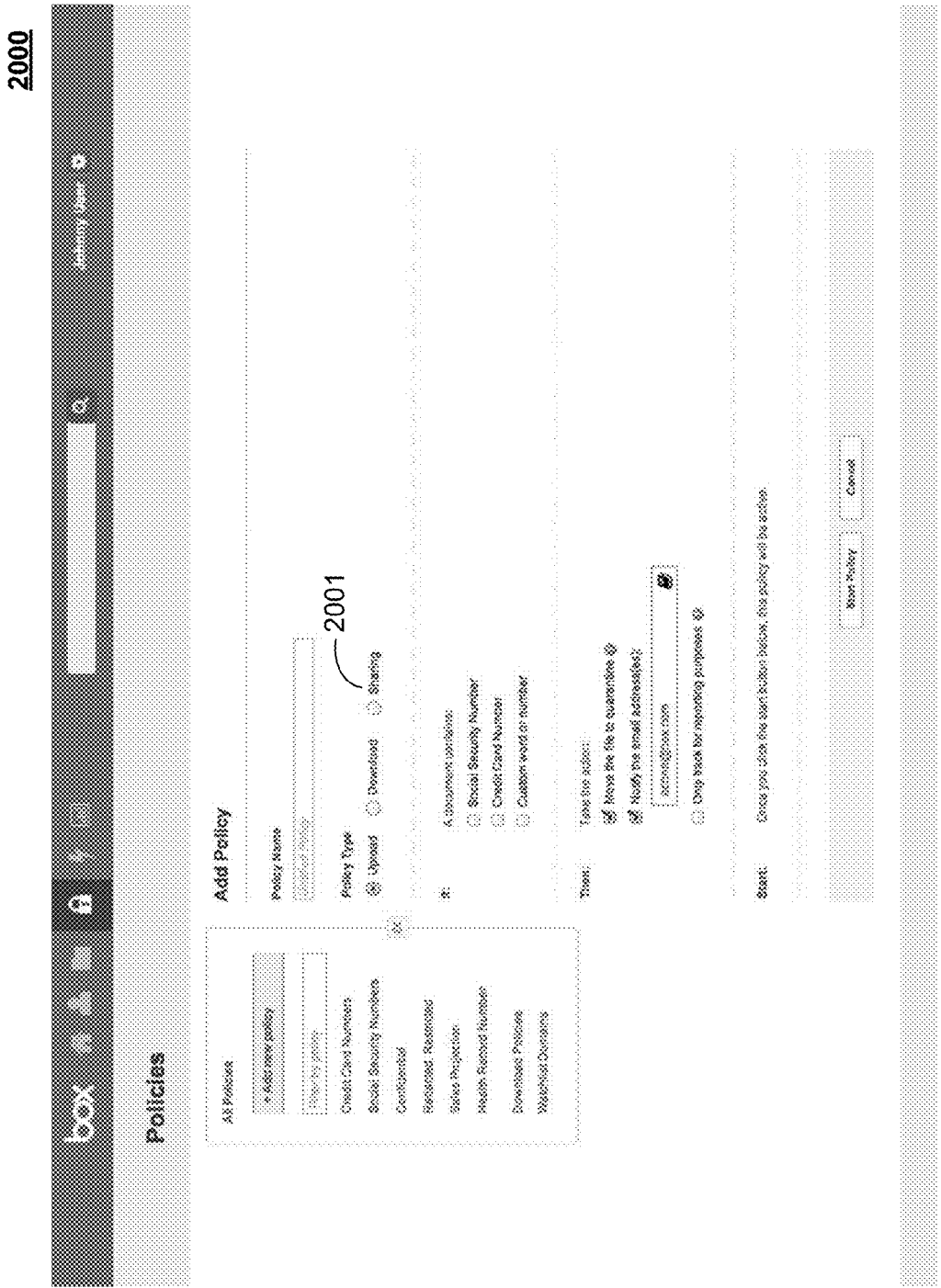
FIG. 20 is an example screenshot of a Policy interface, particularly an interface for specifying a new upload policy instantiation.

FIG. 20 is an example screenshot an example screenshot of a Policy interface 2000, particularly an interface for specifying a new upload policy instantiation. The interface 2000 may include a policy type selection field 2001. If-then-conditional blocks may also be present as illustrated.

Figure 21:
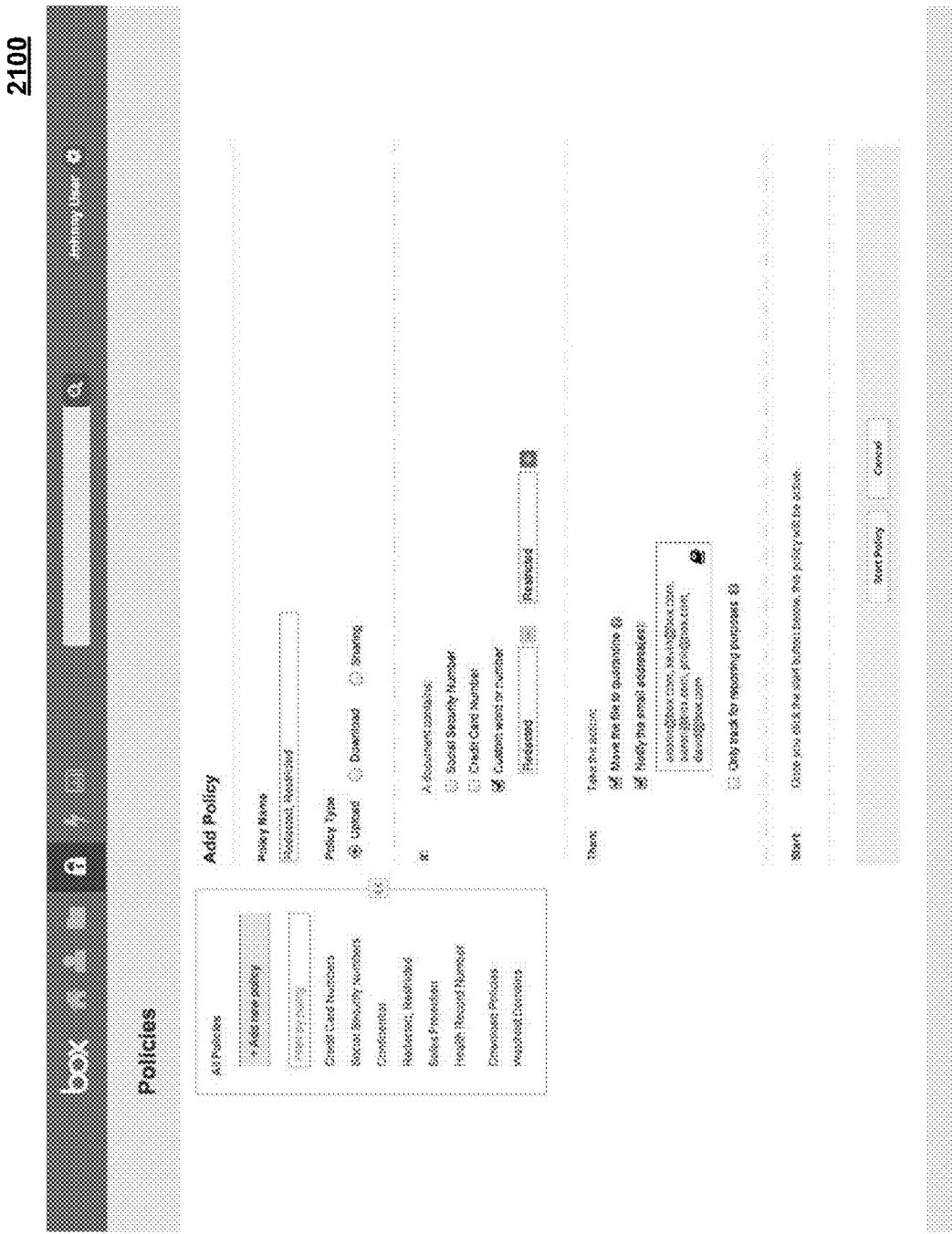
FIG. 21 is an example screenshot of a Policy interface, particularly an interface for specifying a new upload policy instantiation.

FIG. 21 is an example screenshot of a Policy interface 2100, particularly an interface for specifying a new upload policy instantiation. Unlike the interface of FIG. 20, the interface 2100 depicts an email list containing many emails.

Figure 22:
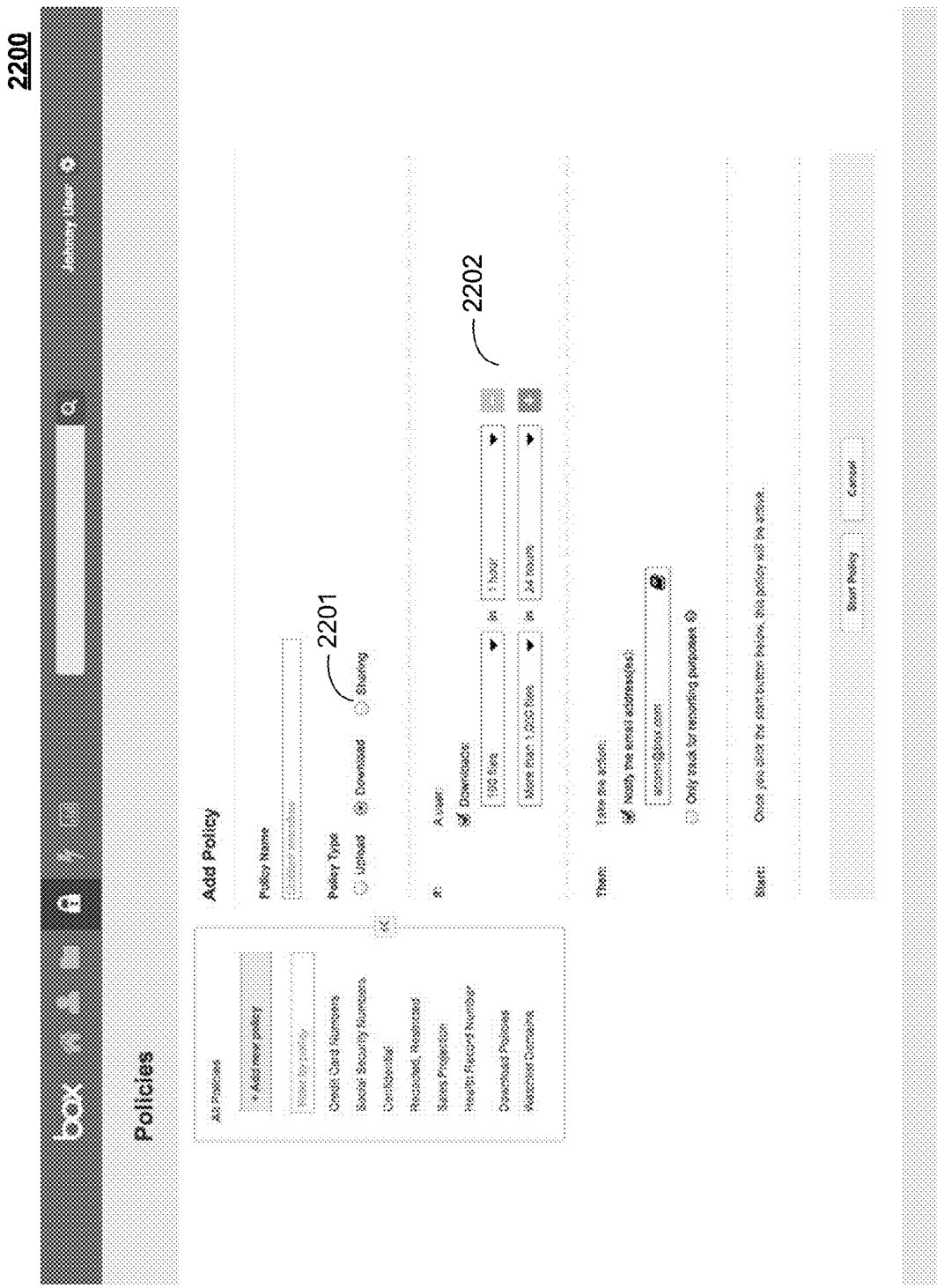
FIG. 22 is an example screenshot of a Policy interface, particularly an interface for specifying a new download policy instantiation.

FIG. 22 is an example screenshot of a Policy interface 2200, particularly an interface for specifying a new download policy instantiation. The interface 2200 may include a policy type selection field 2201 and an If-Then-Conditional block 2202 for parameter inputs.

Figure 23:
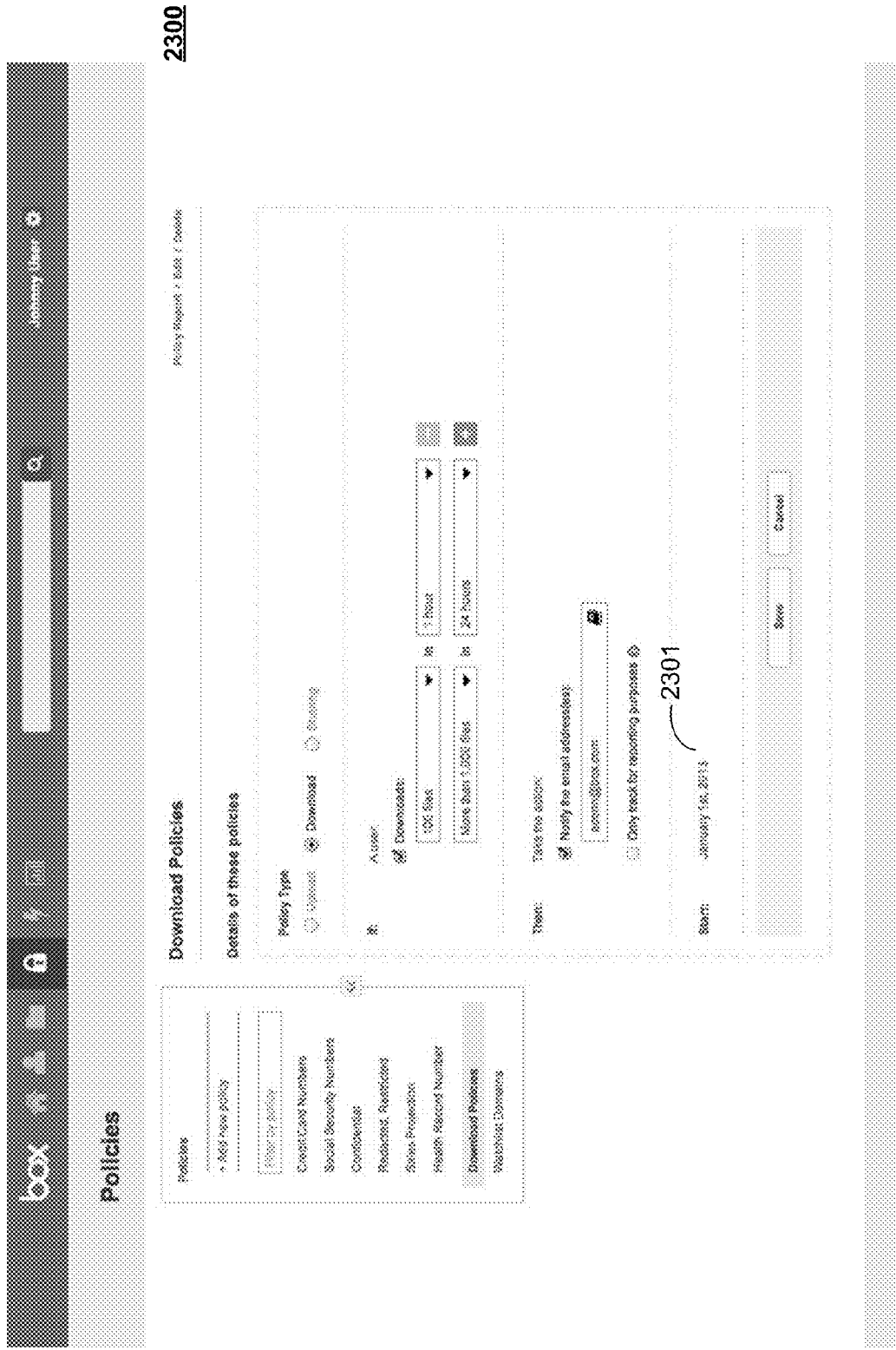
FIG. 23 is an example screenshot of a Policy interface, particularly an interface for specifying a new download policy instantiation with a future start date.

FIG. 23 is an example screenshot of a Policy interface 2300, particularly an interface for specifying a new download policy instantiation with a future start date 2301.

Figure 24:
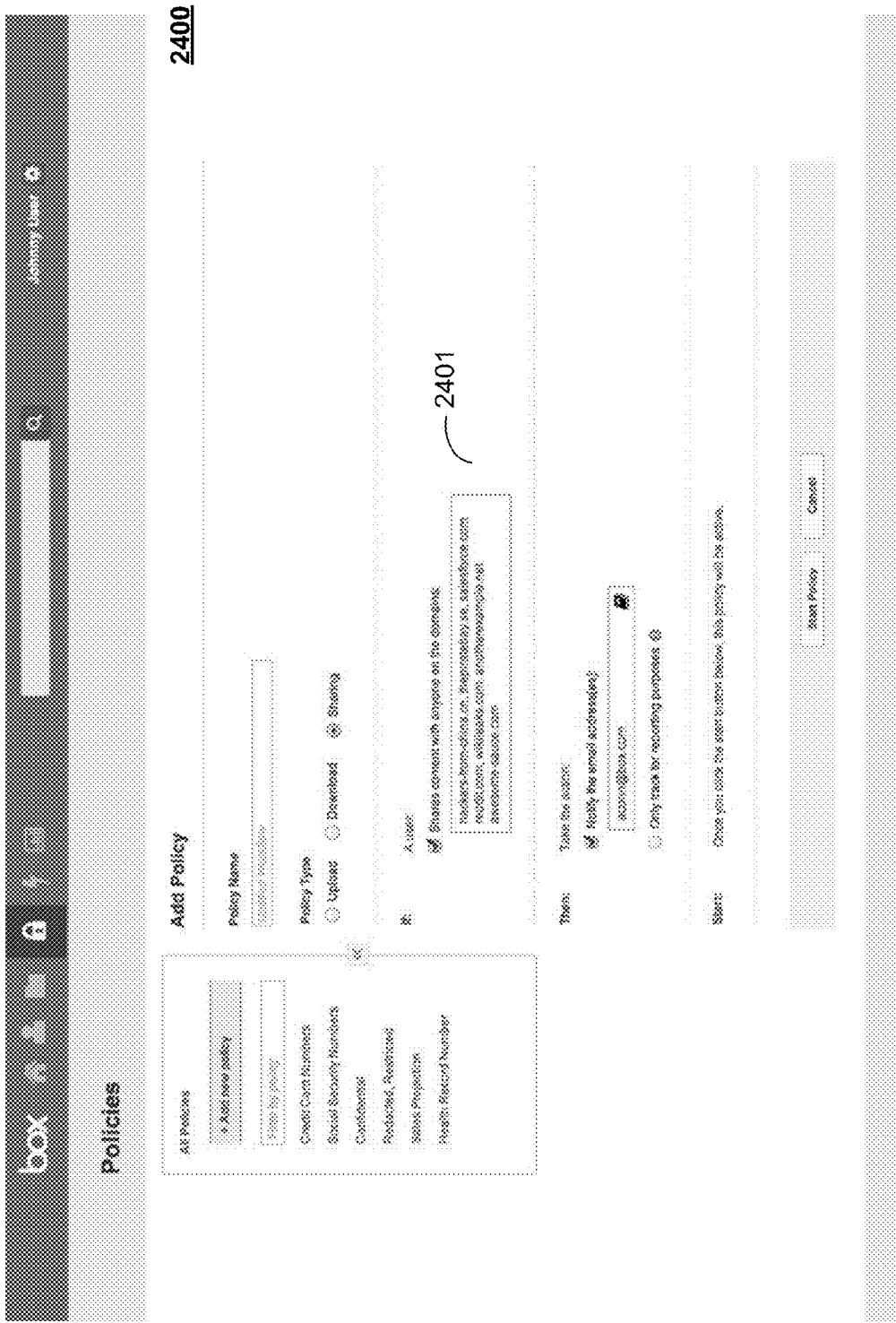
FIG. 24 is an example screenshot of a Policy interface, particularly an interface for specifying a new sharing policy instantiation.

FIG. 24 is an example screenshot of a Policy interface 2400, particularly an interface for specifying a new sharing policy instantiation. The interface 2400 may include an If-Then-Conditional block 2401.

Figure 25:
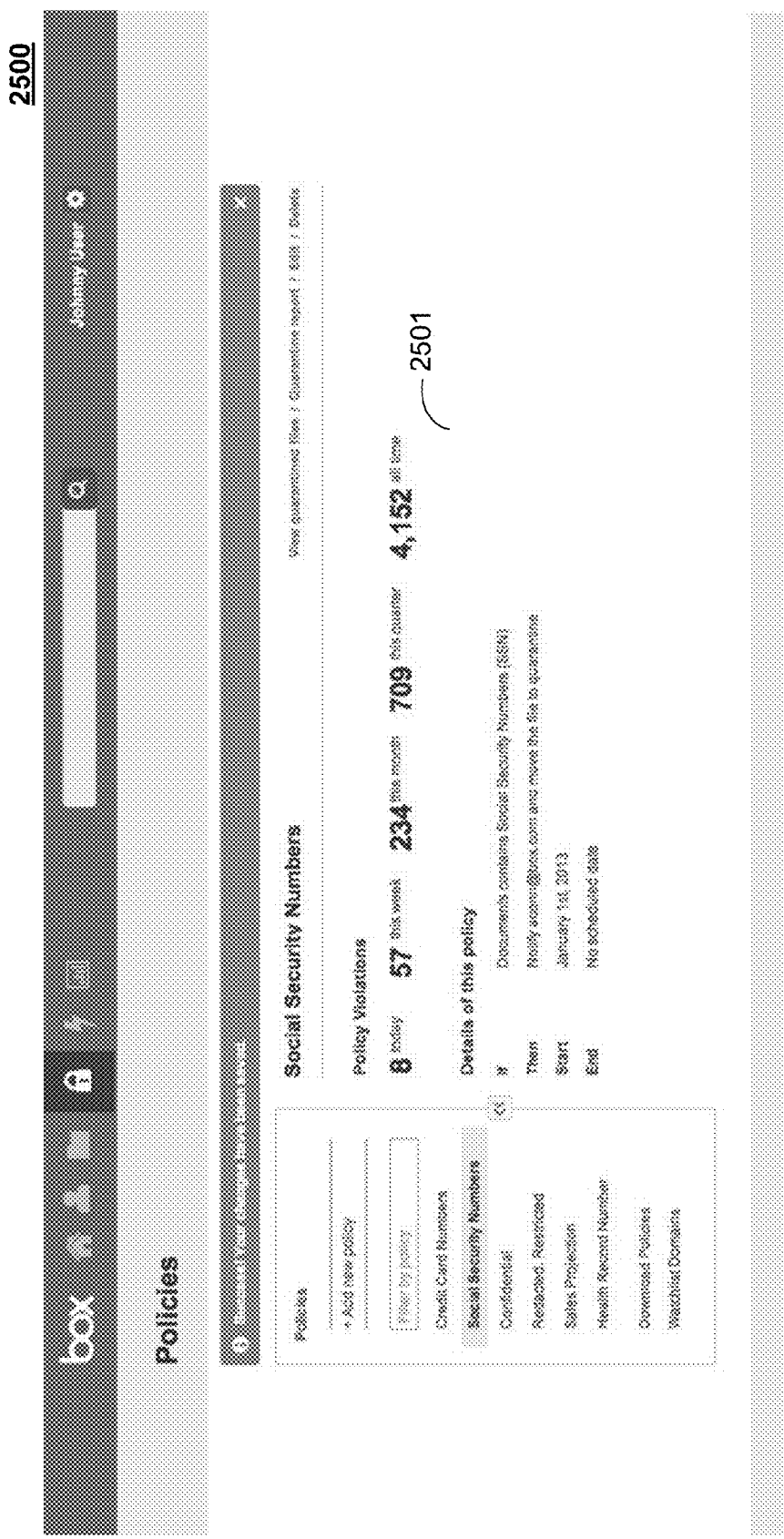
FIG. 25 is an example screenshot of a Policy interface, particularly an interface for summarizing violations under a policy instantiation.

FIG. 25 is an example screenshot of a Policy interface 2501, particularly an interface for summarizing violations under a policy instantiation.

Figure 26:
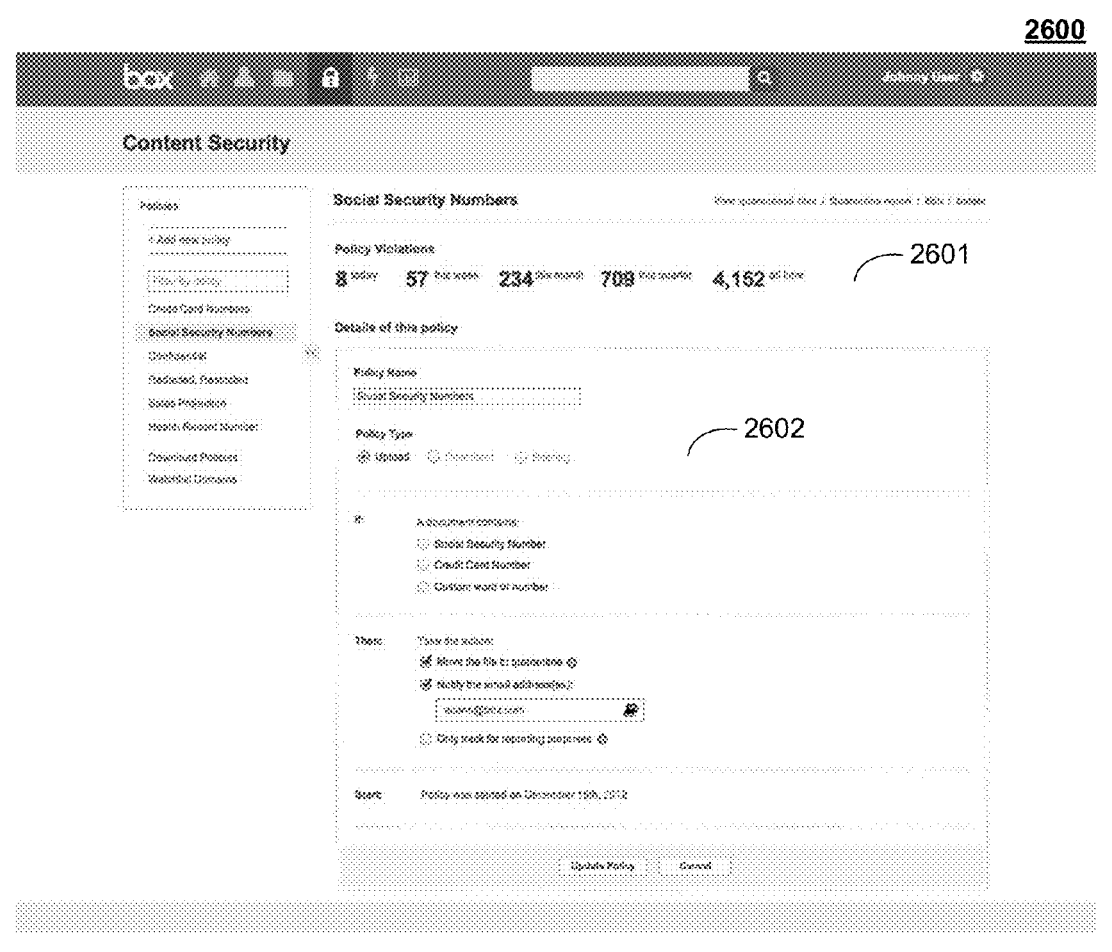

FIG. 26 is an example screenshot of a Policy interface 2600, particularly an interface for editing an upload policy instantiation. The interface 2600 may include a summary 2601 of historical violations and an editable version of the existing If-Then. Conditional parameters 2602 associated with the policy.

Figure 27:
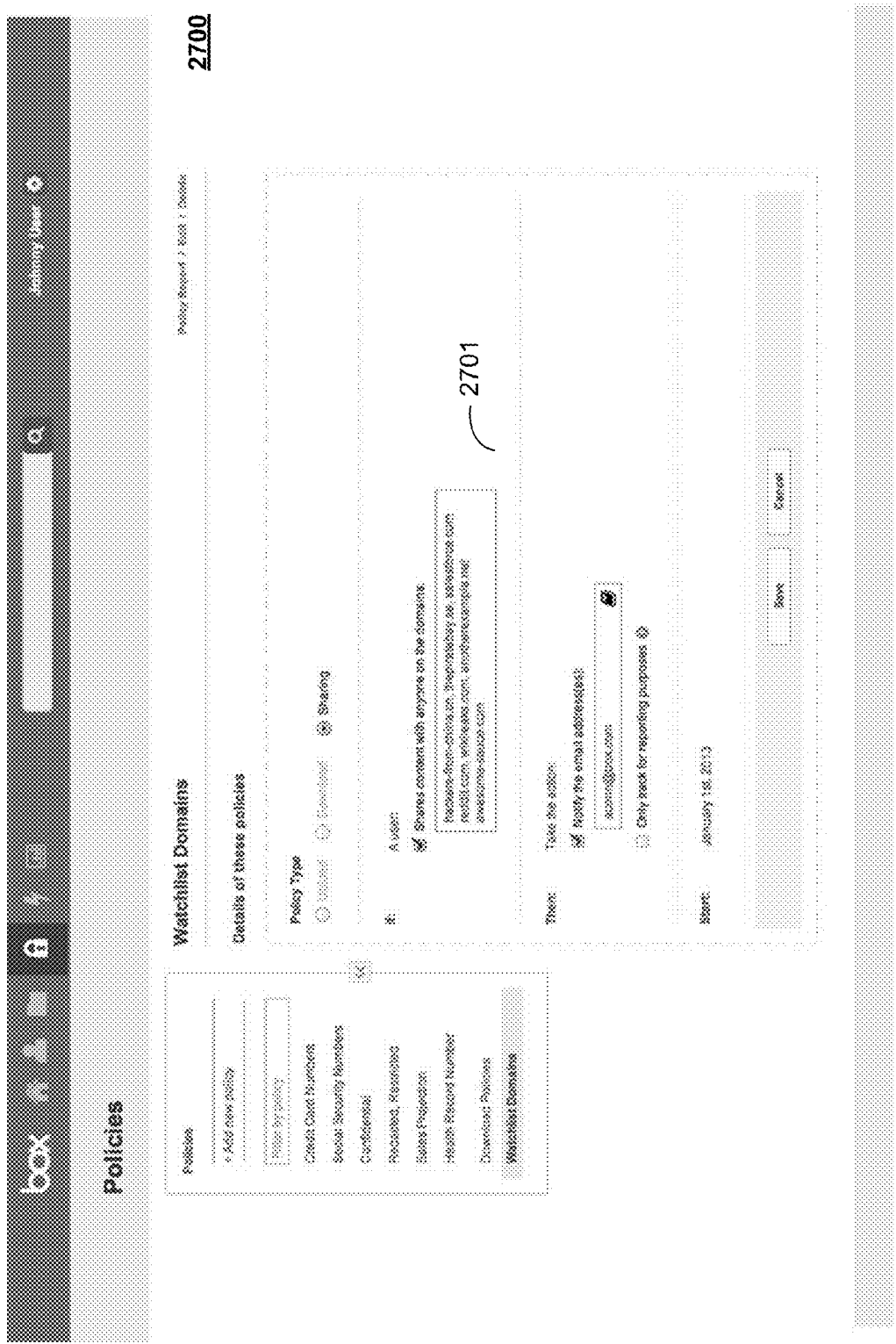
FIG. 27 is an example screenshot of a Policy interface, particularly an interface for editing a watchlist domain aspect of a sharing policy instantiation.

FIG. 27 is an example screenshot of a Policy interface 2700, particularly an interface for editing a watchlist domain aspect of a sharing policy instantiation. The interface may include an IF-Then-Conditional block 2701 depicting details of the corresponding policy.

Figure 28:
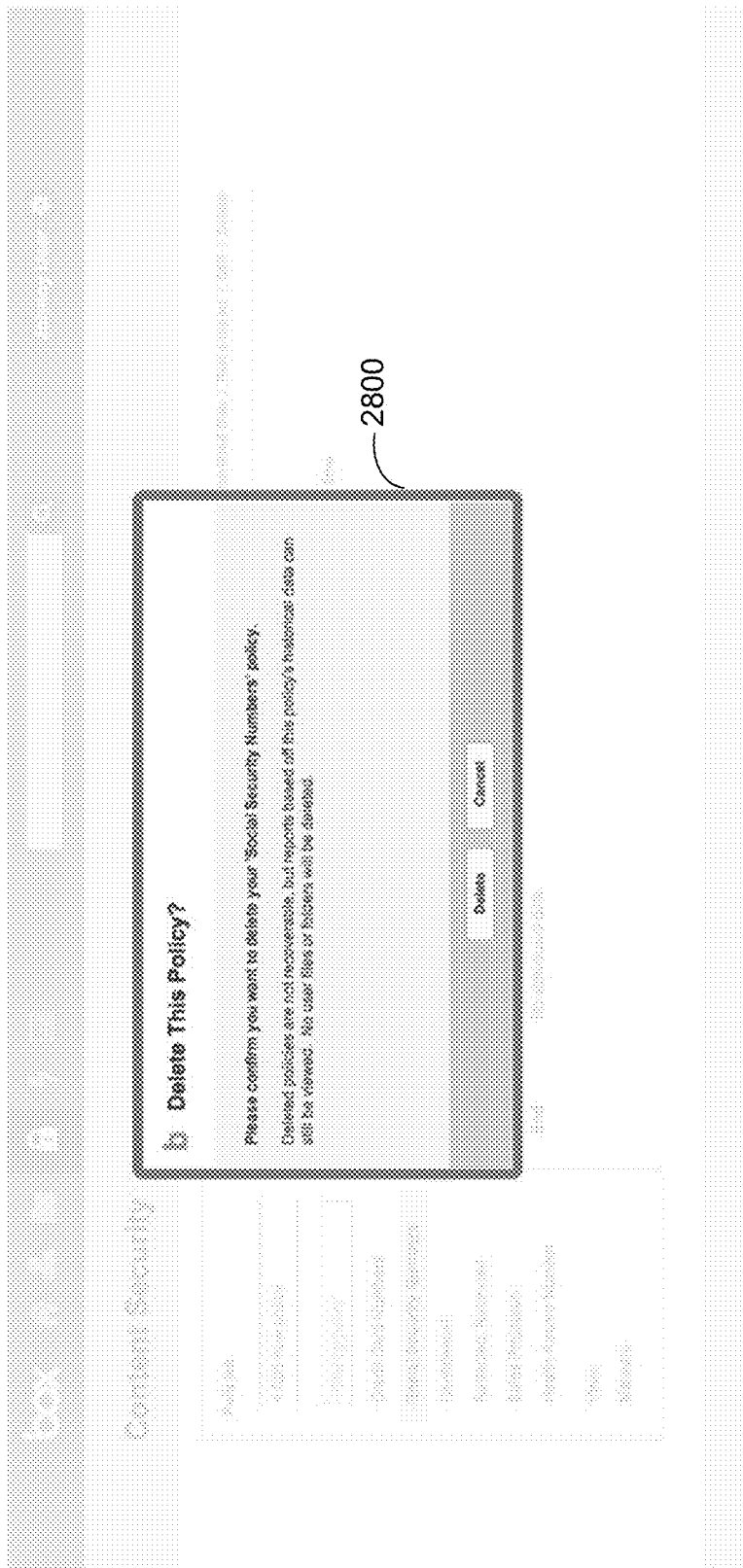
FIG. 28 is an example screenshot of a Policy interface, particularly an interface for deleting a policy instantiation.

FIG. 28 is an example screenshot of a Policy interface 2800, particularly an interface for deleting a policy instantiation.

Figure 29:
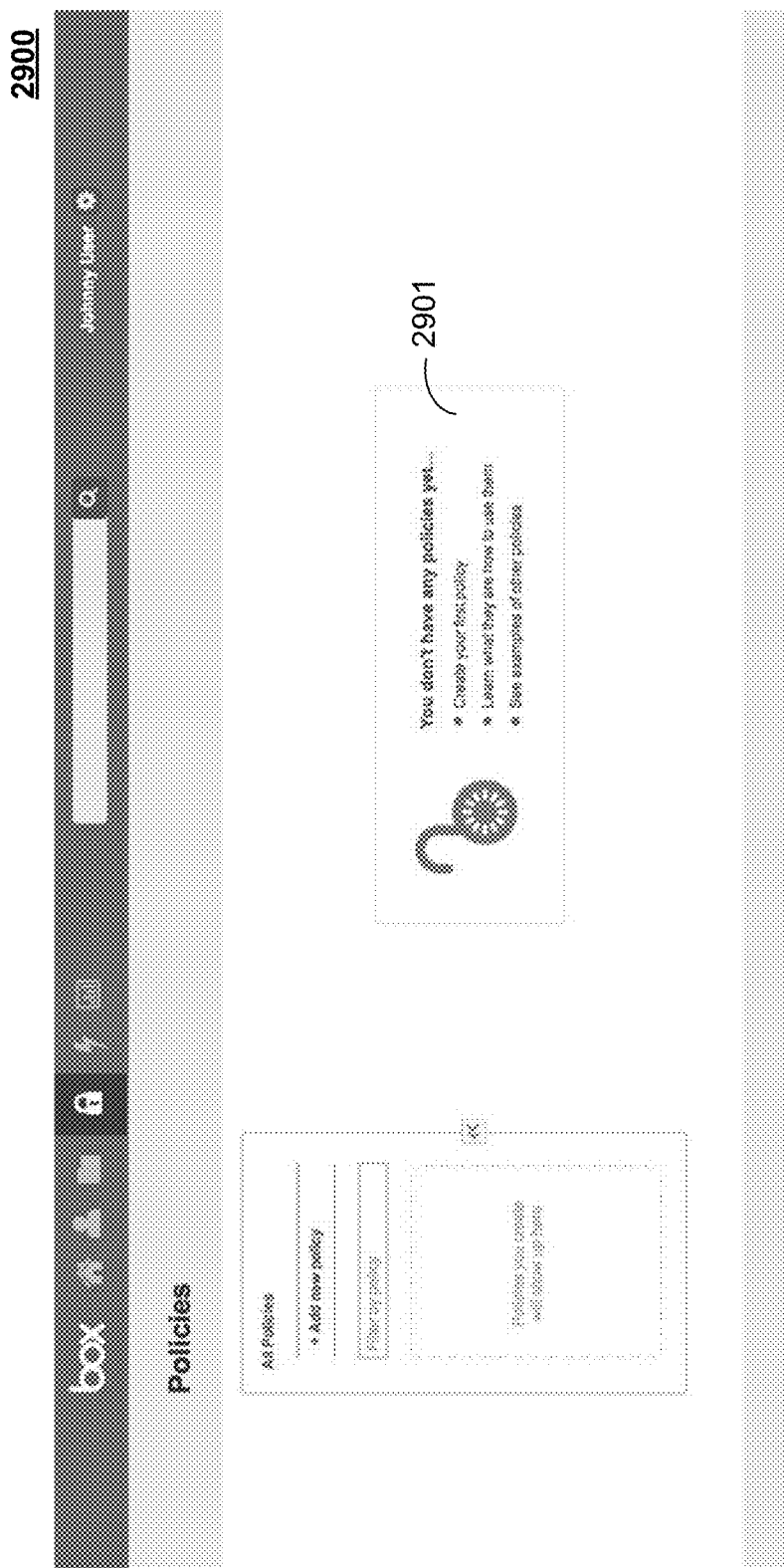
FIG. 29 is an example screenshot of a Policy interface, particularly an interface depicting empty policy instantiations.

FIG. 29 is an example screenshot of a Policy interface 2900, particularly an interface depicting empty policy instantiations. Suggested actions 2901 may be presented to the administrator, possibly selected based on past preferences and actions of the administrator.

Figure 30:
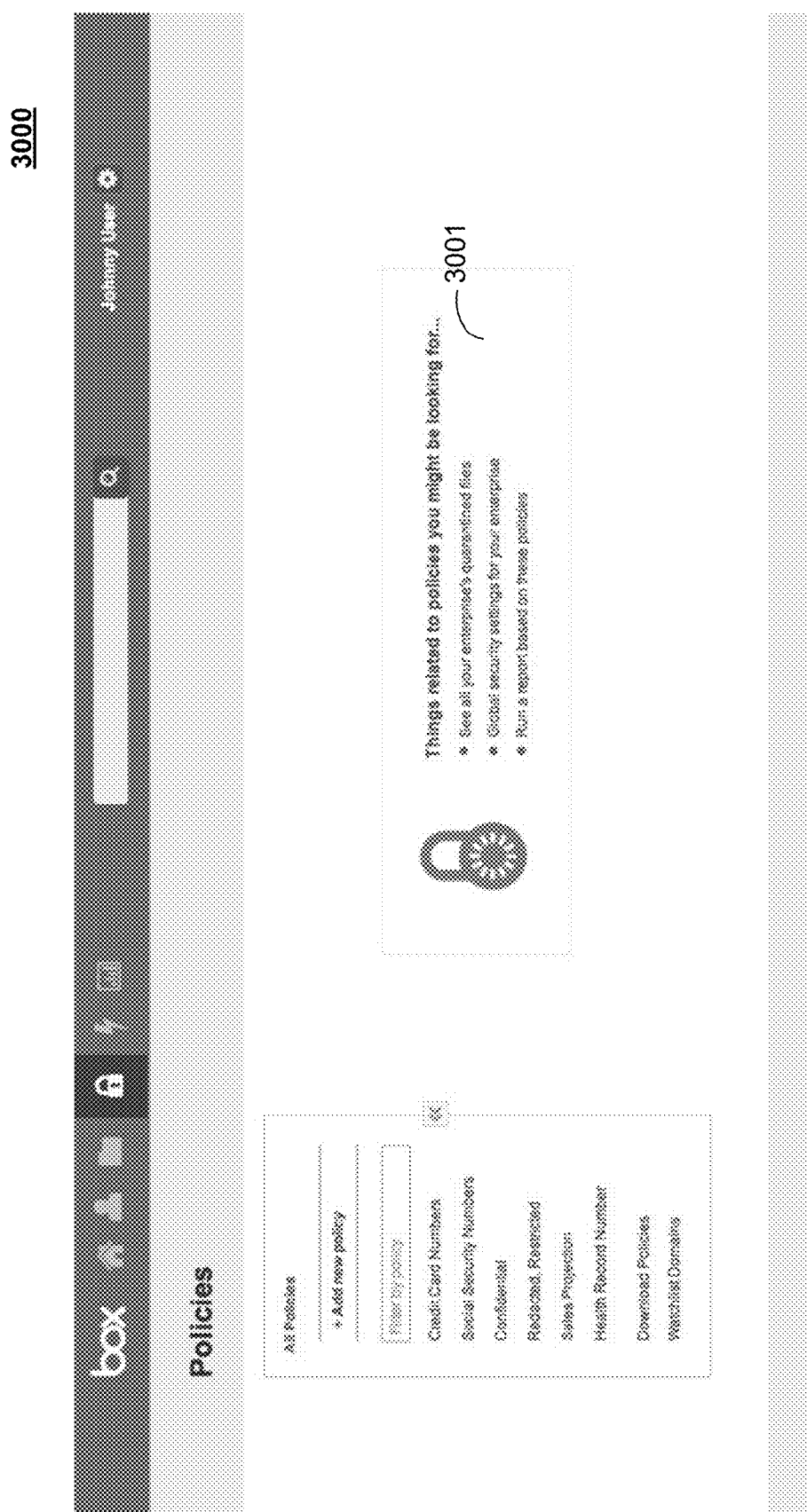
FIG. 30 is an example screenshot of a Policy interface, particularly an interface depicting empty policy instantiations.

FIG. 30 is an example screenshot of a Policy interface 3000, particularly an interface depicting empty policy instantiations. Suggested actions 3001 may be presented to the administrator, possibly selected based on past preferences and actions of the administrator.

Figure 31:
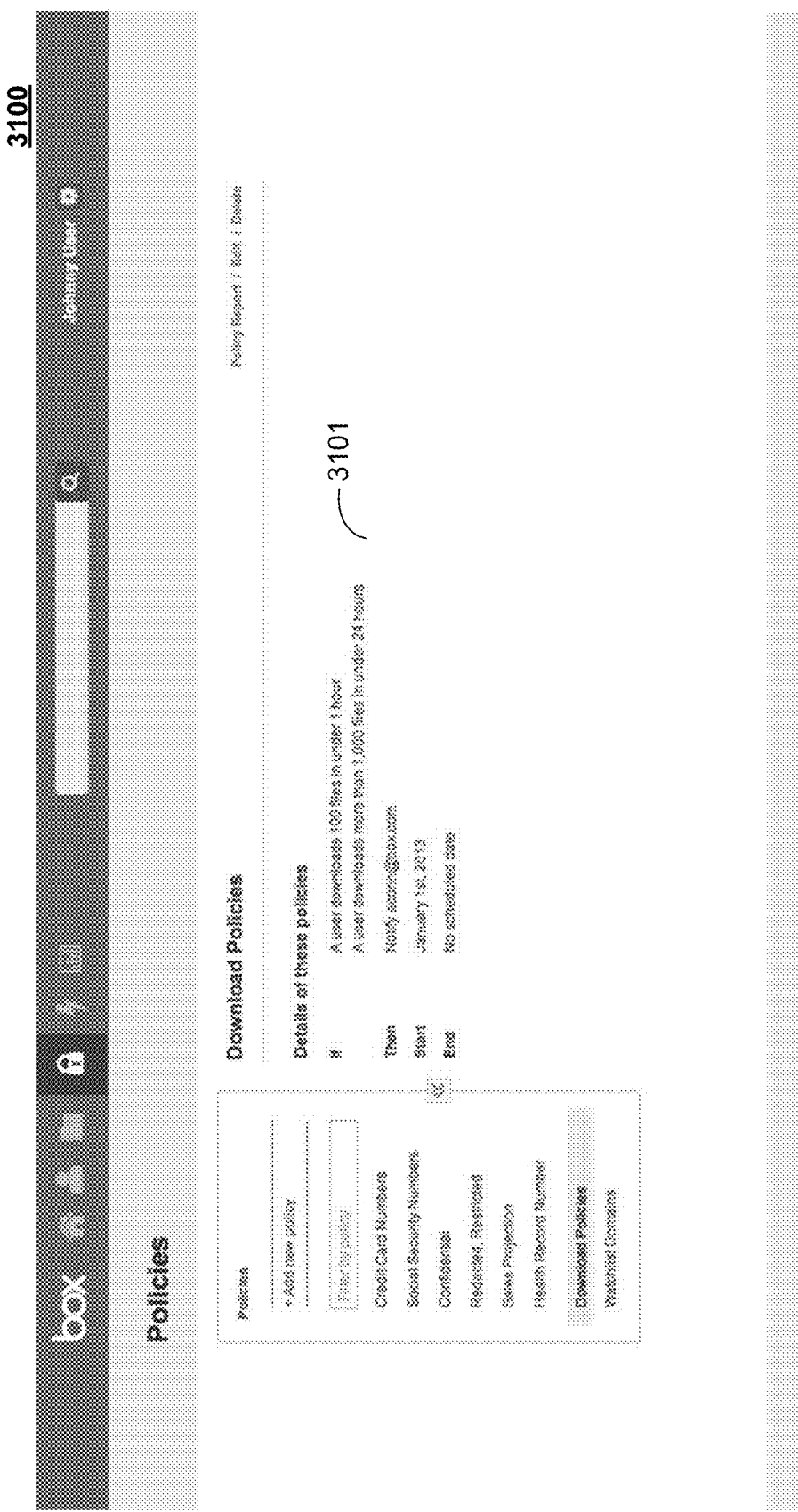
FIG. 31 is an example screenshot of a Policy interface, particularly an interface depicting details of various policy instantiations.

FIG. 31 is an example screenshot of a Policy interface 3100, particularly an interface depicting details of various policy instantiations. The details 3101 may be depicted in a separate block.

Figure 32:
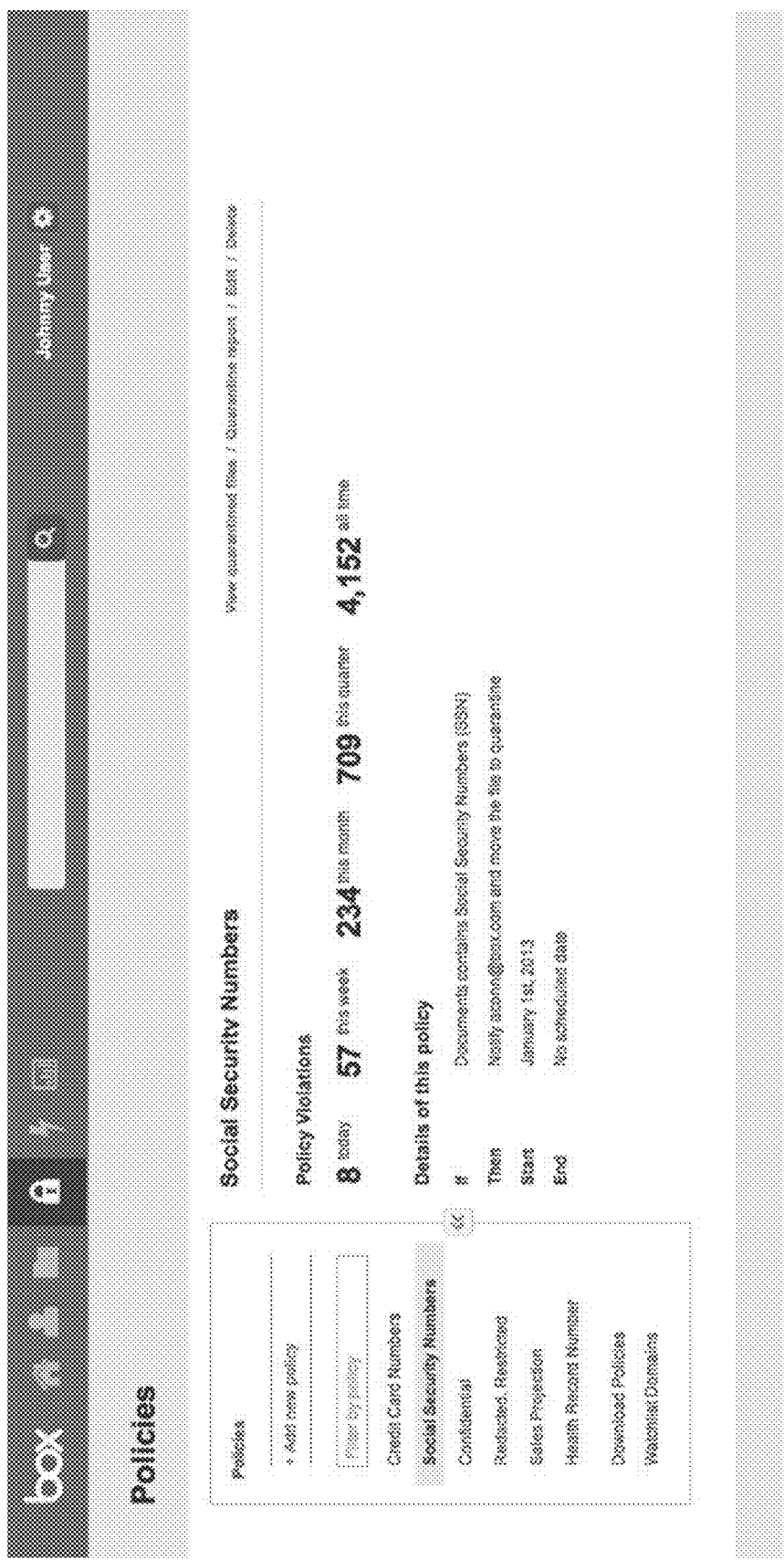
FIG. 32 is an example screenshot of a Policy interface, particularly an interface depicting various statistics regarding social security number violations.

FIG. 32 is an example screenshot of a Policy interface, particularly an interface depicting various statistics regarding social security number violations.

Figure 33:
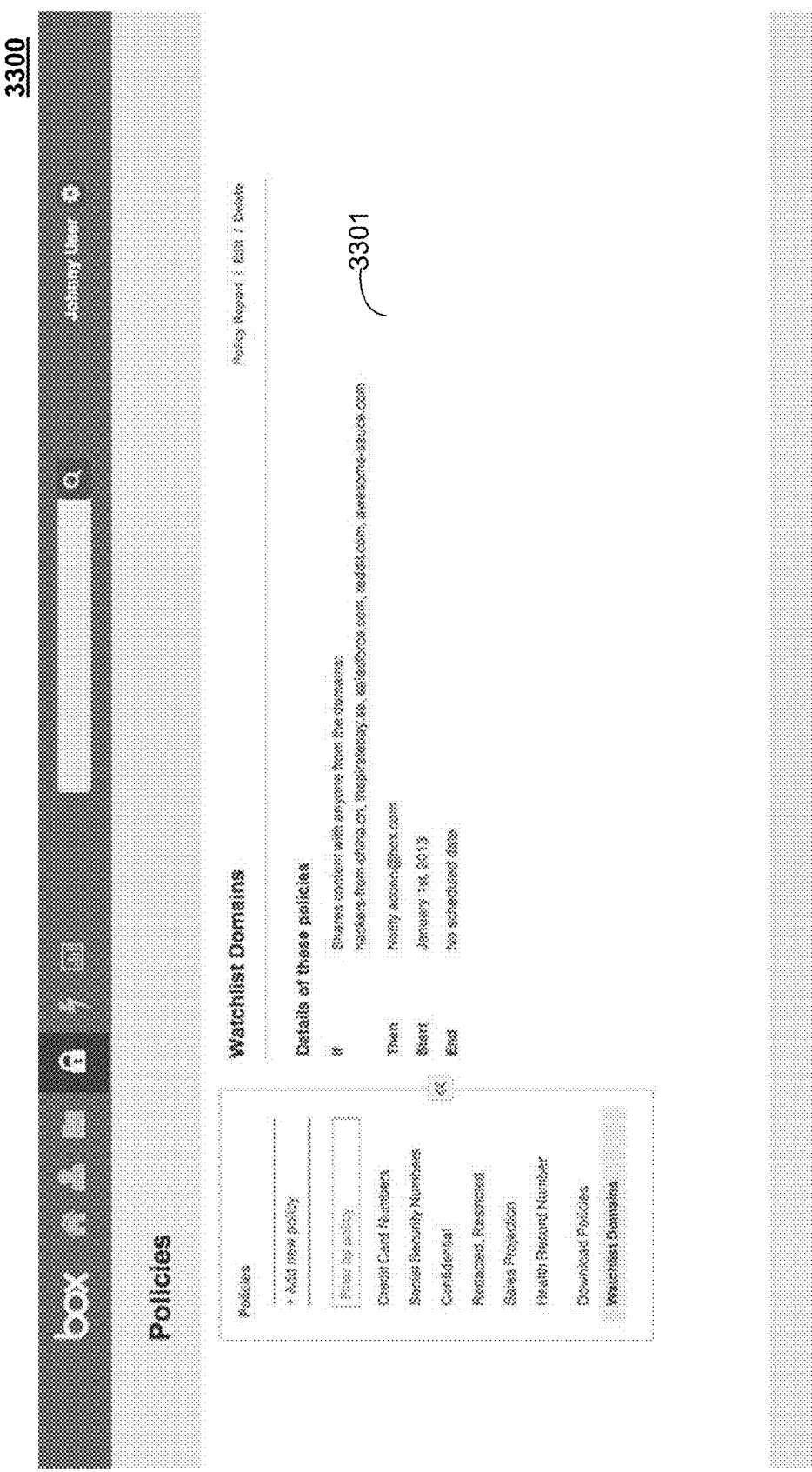
FIG. 33 is an example screenshot of a Policy interface, particularly an interface depicting details regarding various watchlist domain policy instantiations.

FIG. 33 is an example screenshot of a Policy interface 3300, particularly an interface depicting details 3301 regarding various watchlist domain policy instantiations.

Administrative Interface

Figure 34:
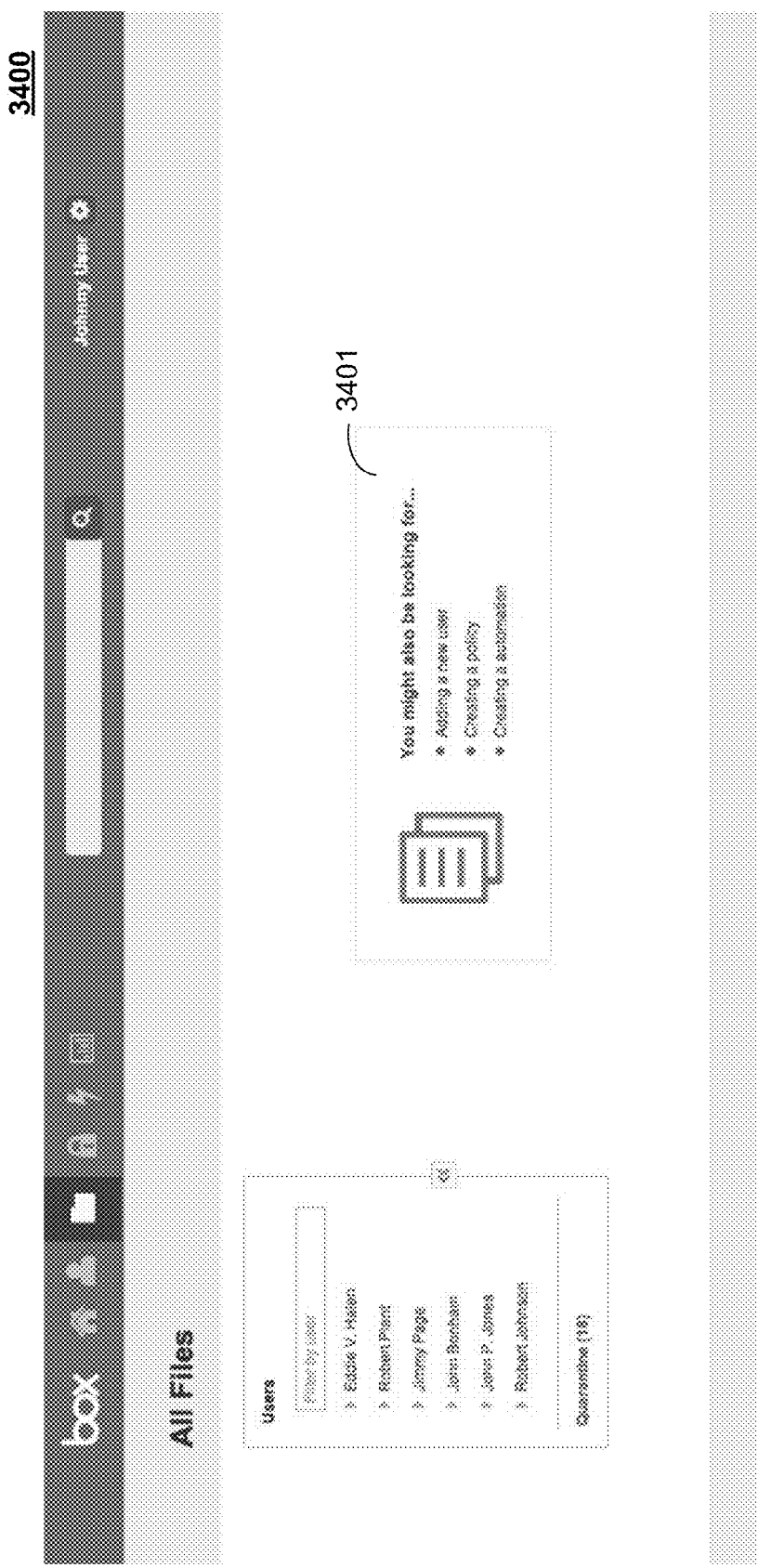
FIG. 34 is an example screenshot of an initial interface for managing a system that directs a user.

FIG. 34 is an example screenshot of an initial interface 3400 for managing a system that directs a user, e.g. an administrator. The interface 3400 may depict various options 3401 for the administrator.

Figure 35:
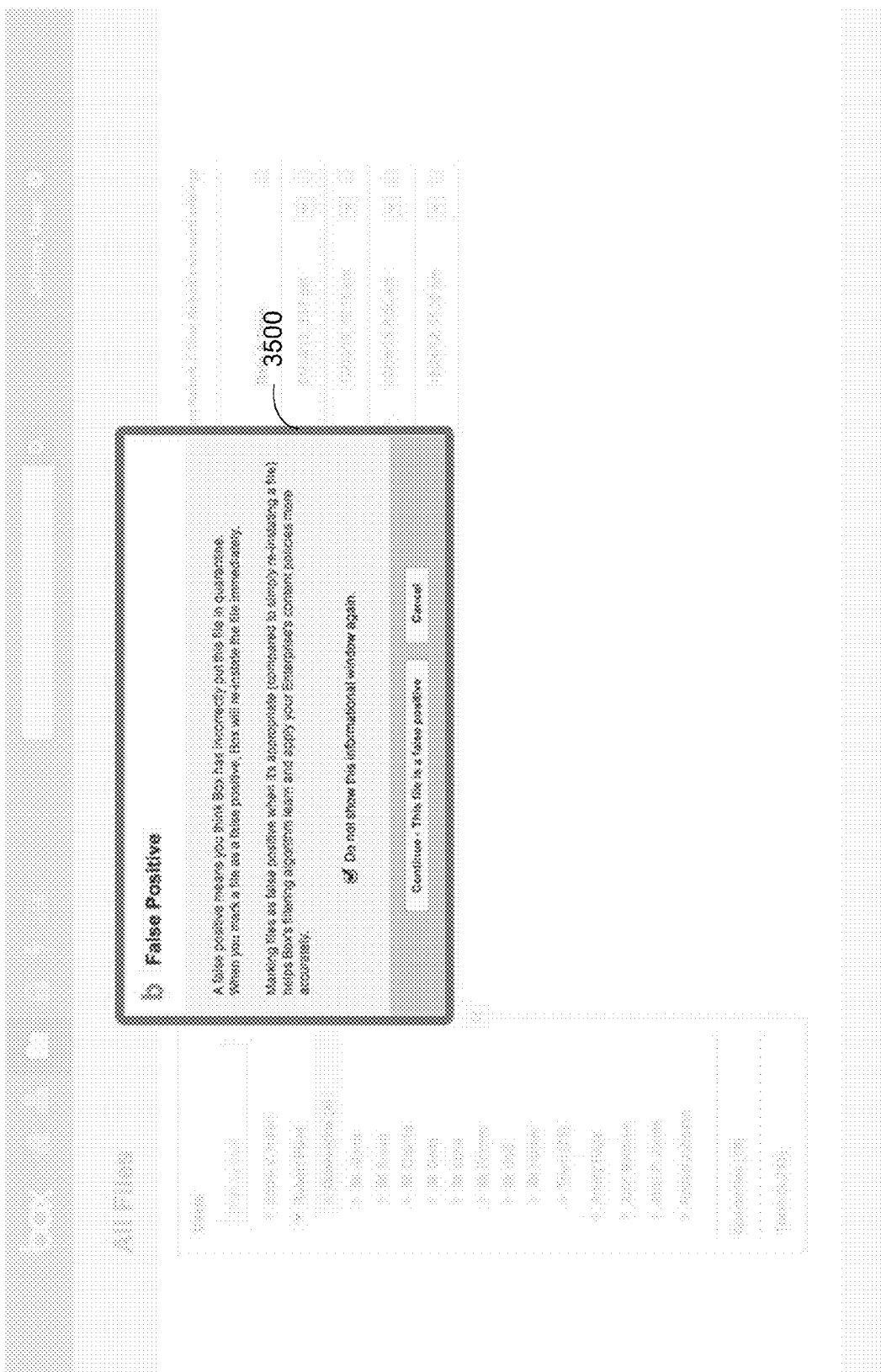
FIG. 35 is an example screenshot of an initial interface for managing a system that explains a false positive.

FIG. 35 is an example screenshot of an initial interface 3500 for managing a system that explains a false positive.

Figure 36:
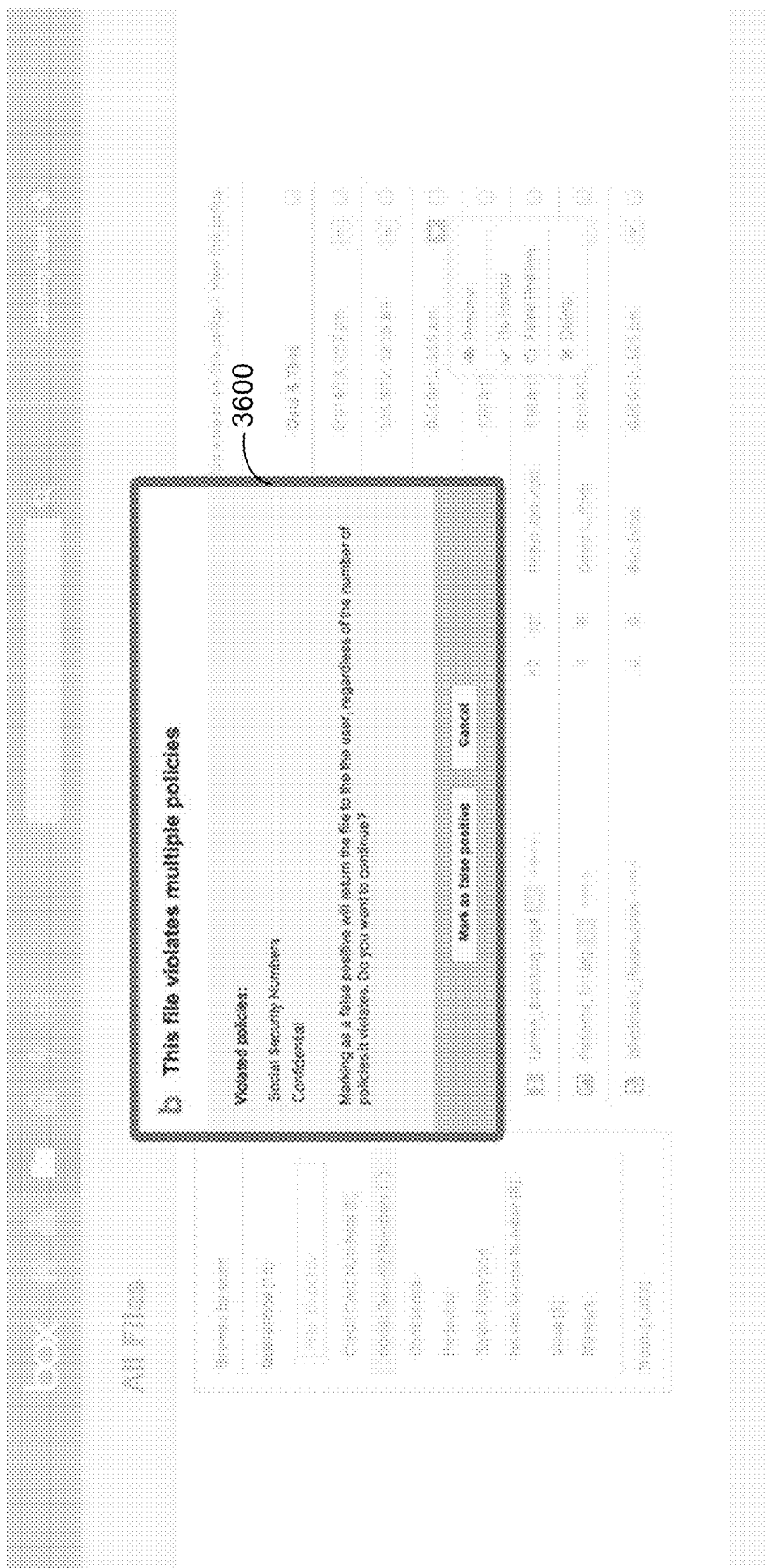
FIG. 36 is an example screenshot of an administrative interface for managing a system that explains a file policy violation and false positive marking.

FIG. 36 is an example screenshot of an administrative interface 3600 for managing a system that explains a file policy violation and false positive marking.

Figure 37:
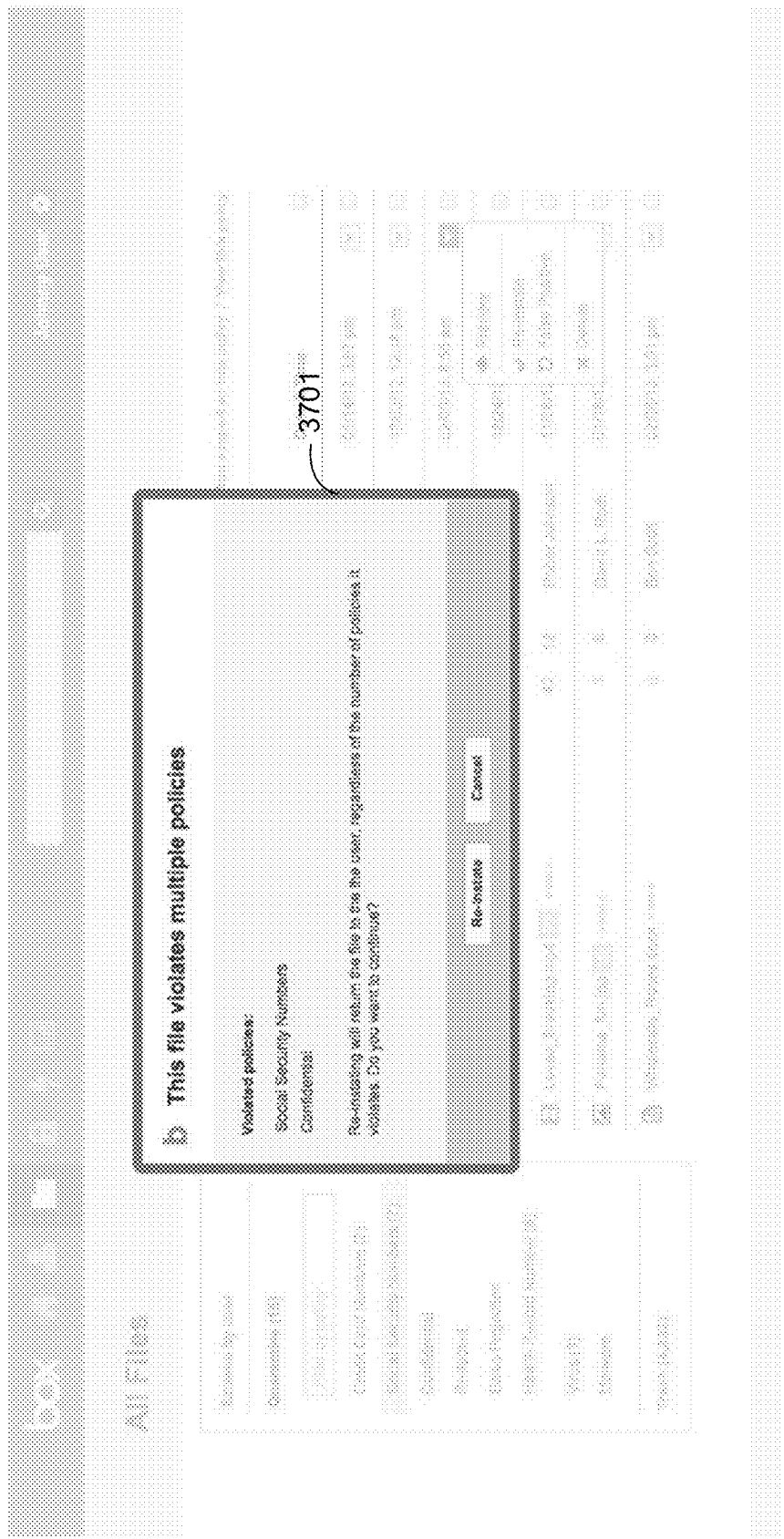
FIG. 37 is an example screenshot of an administrative interface for managing a system that explains a file policy violation and reinstantiation.

FIG. 37 is an example screenshot of an administrative interface 3700 for managing a system that explains a file policy violation and reinstantiation.

Quarantined File Interface

In some embodiments, when a file violates an upload policy set up in the policy center, the file version may automatically be moved to a quarantine folder. The quarantine folder may only accessible by the administrator once in quarantine.

In some embodiments, the administrator can view all versions of files that have been quarantined and perform the following actions on them: a. Preview; b. Delete; c. Restore.

The administrator may be able to mark the quarantine as a false positive. The rules may use the marking to prevent future false positives. When a file version has been quarantined by the rules, that version may be replaced with a dummy version.

Figure 38:
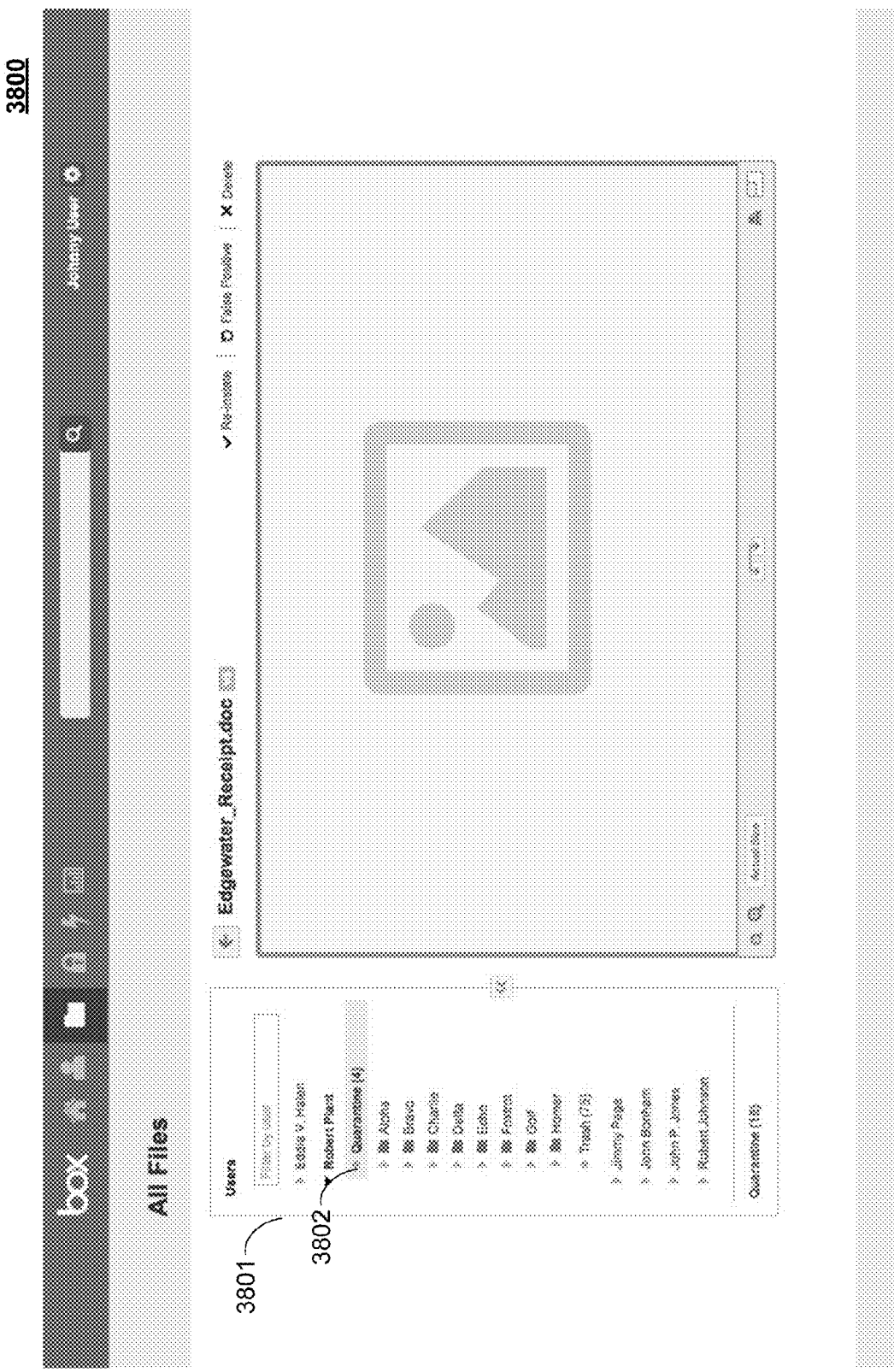
FIG. 38 is an example screenshot of a quarantined file review administrative interface.

FIG. 38 is an example screenshot of a quarantined file review administrative interface 3800. In some embodiments, an administrator may manage the file versions that have been quarantined by visiting the quarantine folder 3802 of an individual user or the entire enterprise in GCM. An administrator may view all policies that have been violated across their enterprise by clicking on the global Quarantine folder 3802 in the left hand navigation 3801 and selecting a policy to view the file versions that have been quarantined based on that policy. An administrator may navigate between policies at a global level by using the left hand navigation 3801 and clicking on a specific policy violation to view all file versions that have been quarantined as a result of that policy across their entire enterprise.

In some embodiments, an administrator can view the policies that have been violated for a specific user by clicking on the user in the left hand navigation and clicking on their quarantine folder. In some embodiments, an administrator can take the following actions on a file version that has been quarantined: Preview; Re-instate send back to the original location; Designate the file violation as a False positive for the rules system and send back to original location; permanently delete the file version from the cloud-based platform/service (e.g., cloud-based collaboration platform). An administrator may take actions on multiple file versions by selecting multiple checkboxes and then performing the desired action in some embodiments.

In some embodiments, the system may support Internationalization, different SSN equivalents from different jurisdictions; National insurance numbers; HIPPA data; etc.

In some embodiments, the system implements backwards scanning. If the system re-scans a file version and a same policy violation is found as was found previously, but that file had already been restored once by the admin, the system may leave the new version as removed. If however the new version violates a new policy, the system may mark the new version as quarantined but for a different violation. Some embodiments support regular expressions for upload policy terms.

Figure 39:
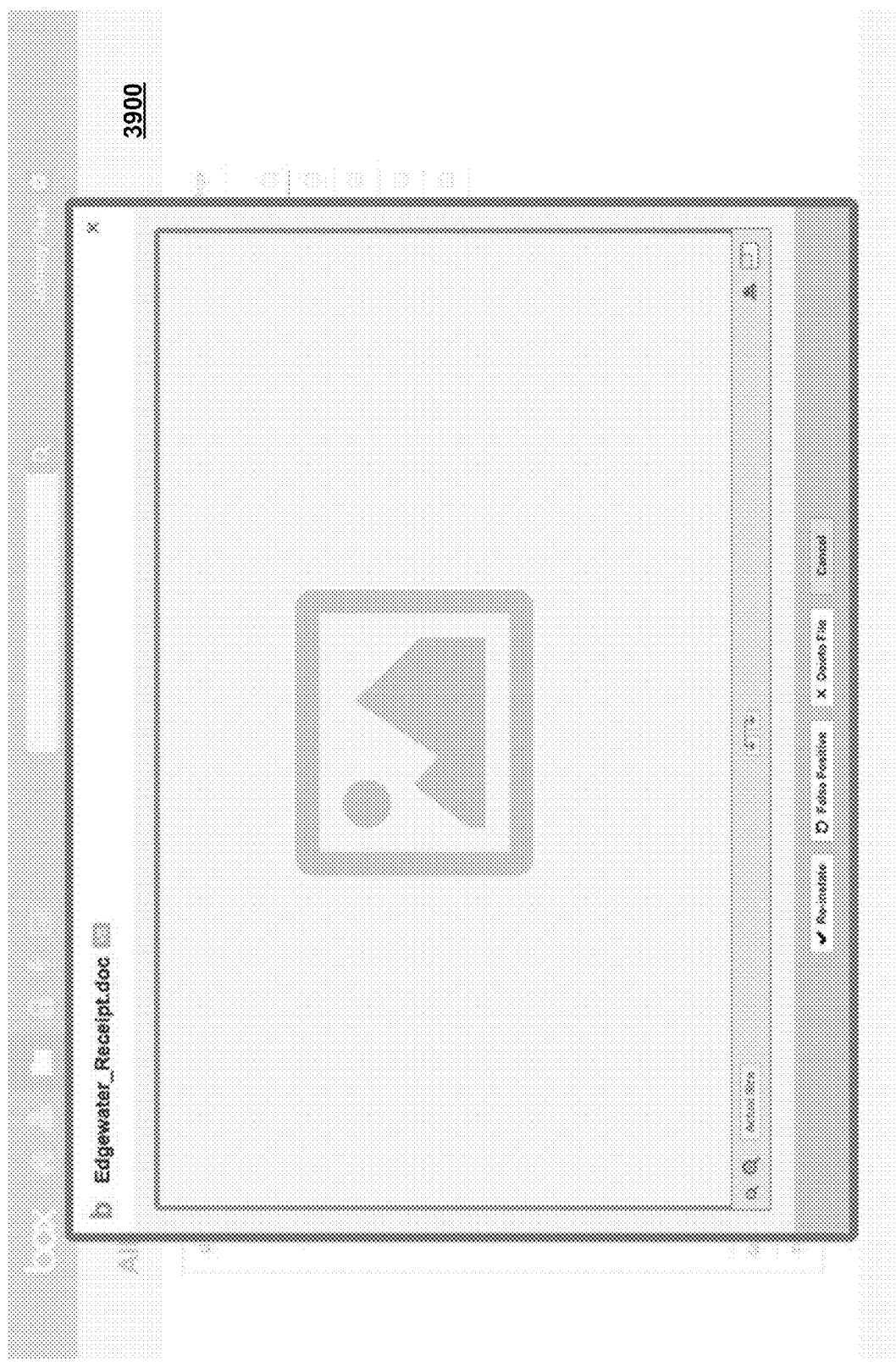
FIG. 39 is an example screenshot of a quarantined file review administrative interface.

FIG. 39 is an example screenshot of a quarantined file review administrative interface 3900.

Figure 40:
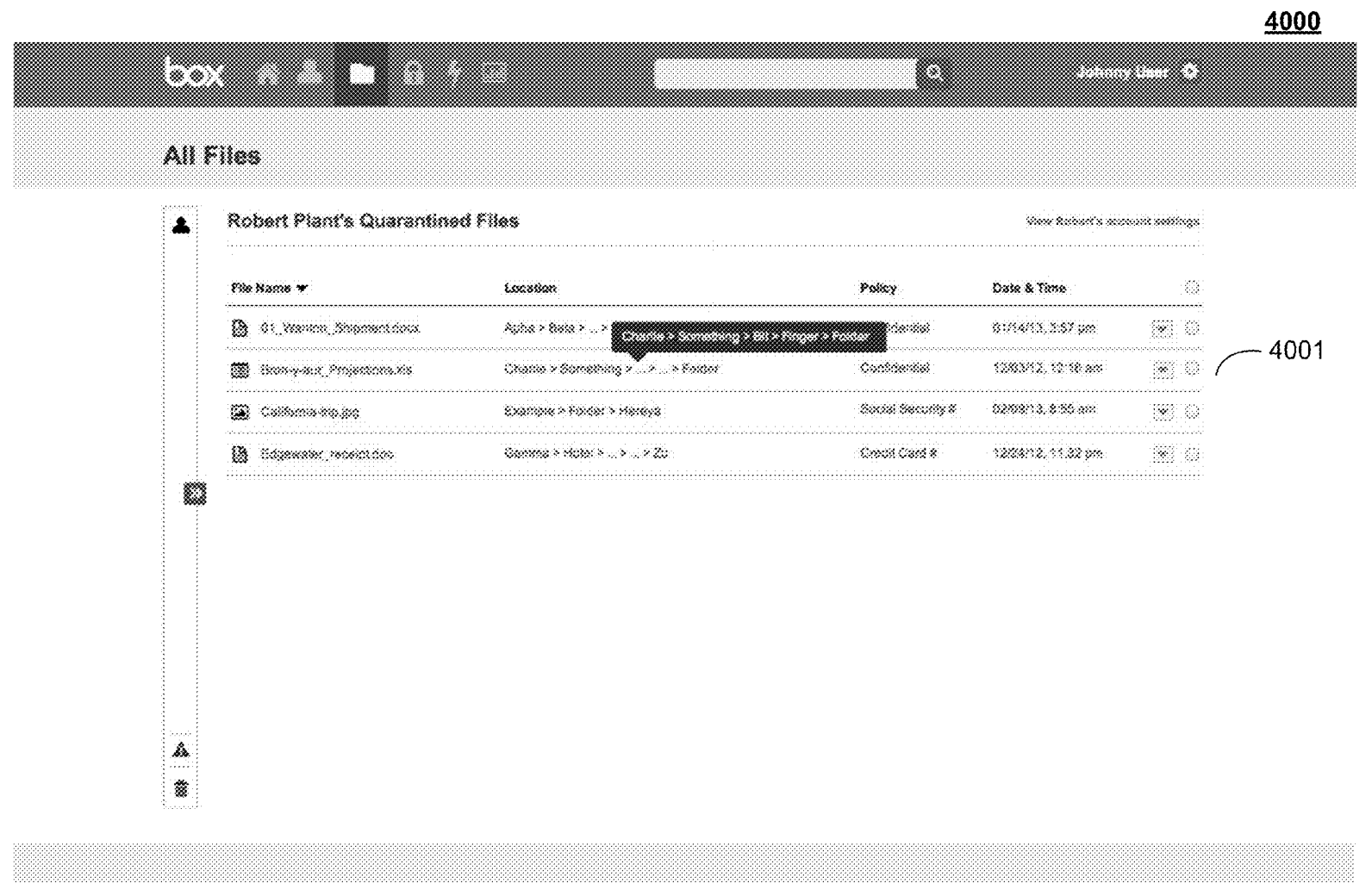

FIG. 40 is an example screenshot of a user quarantined file review list administrative interface 4000. The interface 4000 may include a list 4001 of file names and their properties.

Figure 41:
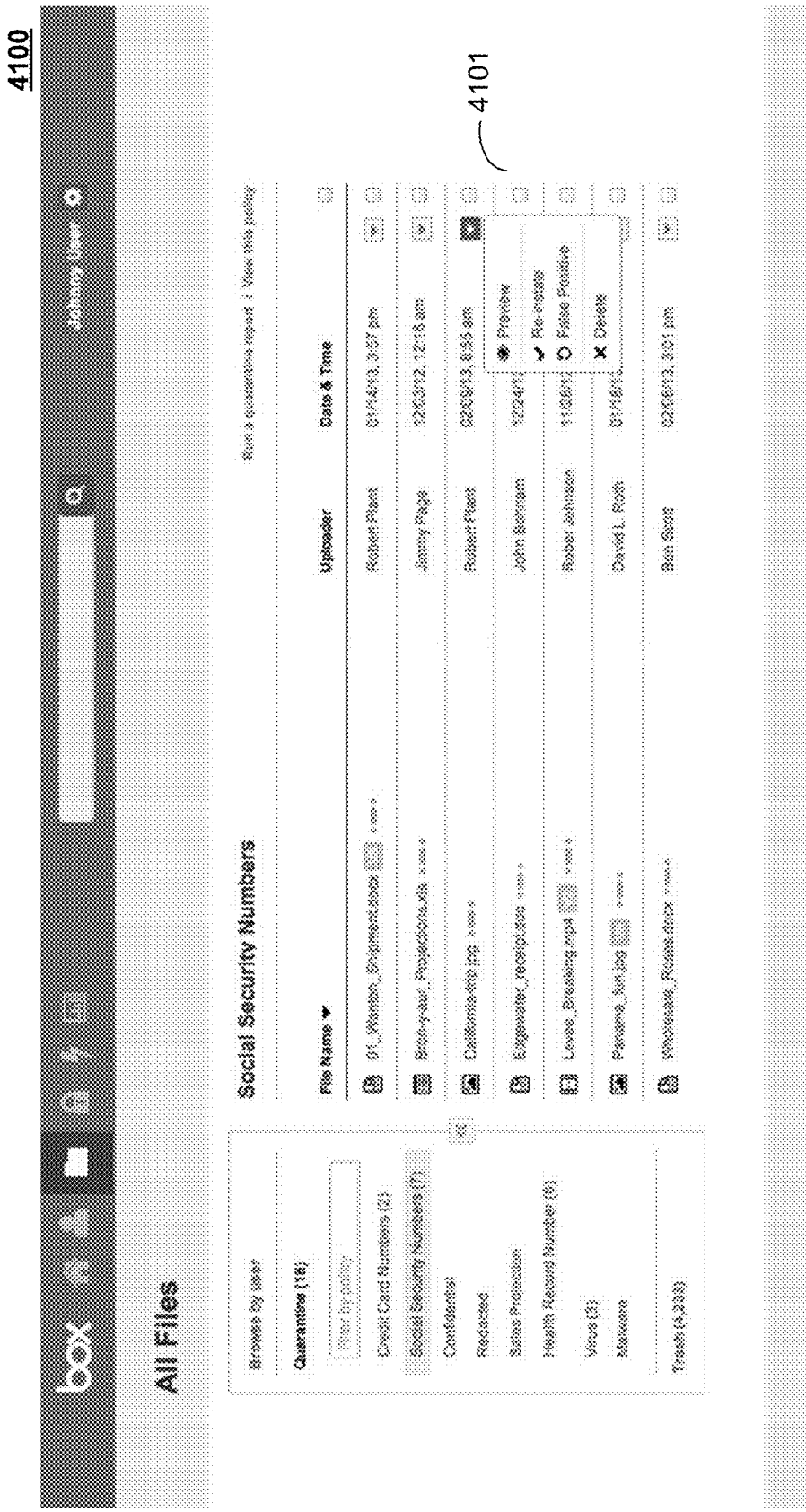
FIG. 41 is an example screenshot of a social security number review list administrative interface.

FIG. 41 is an example screenshot of a social security number review list administrative interface 4100. The interface 4100 may include a list 4101 of file names and their properties.

Figure 42:
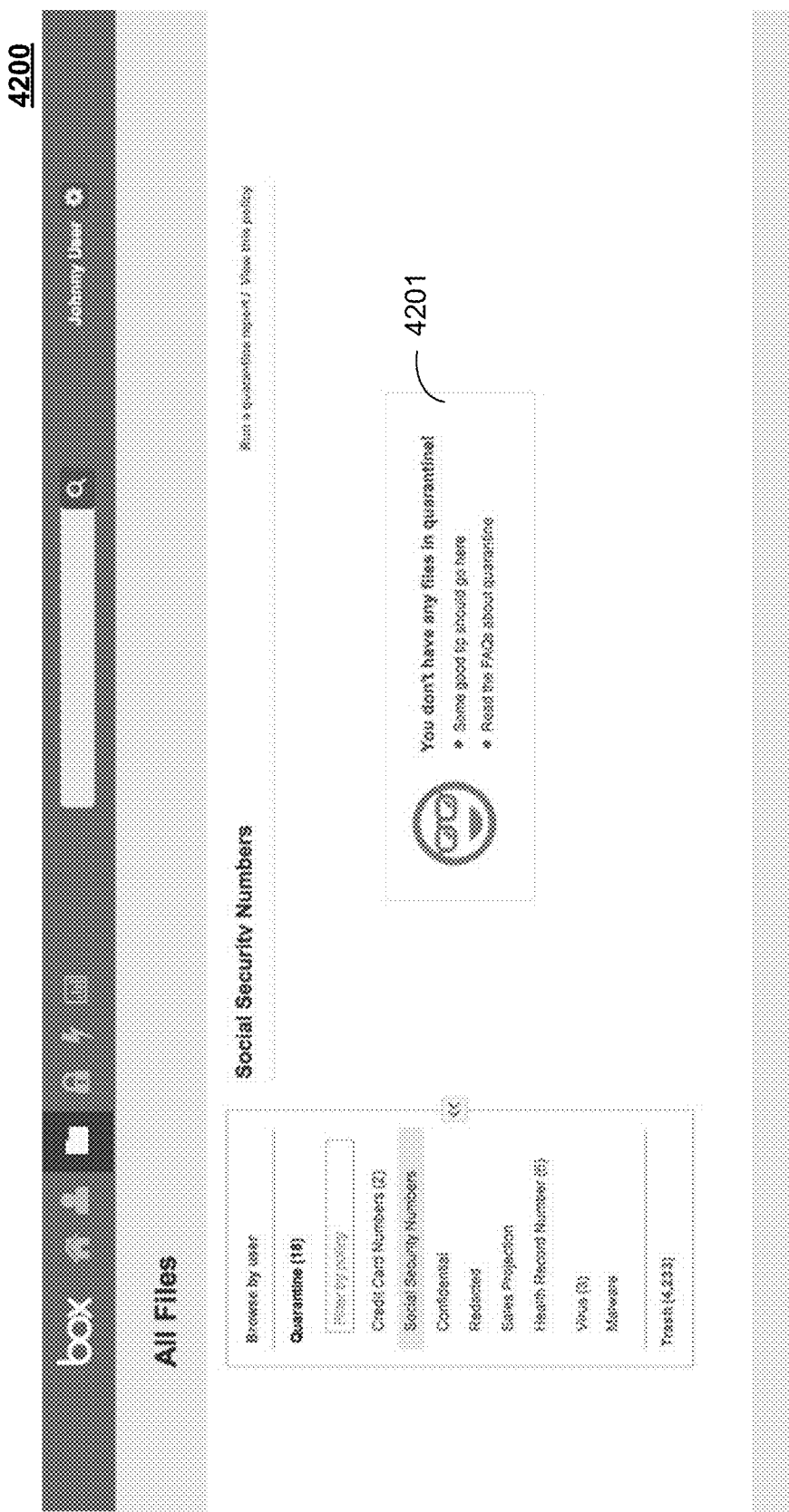
FIG. 42 is an example screenshot of a social security number review list administrative interface indicating no files in quarantine.

FIG. 42 is an example screenshot of a social security number review list administrative interface 4200 indicating no files in quarantine with a recommended list of available options 4201.

Figure 43:
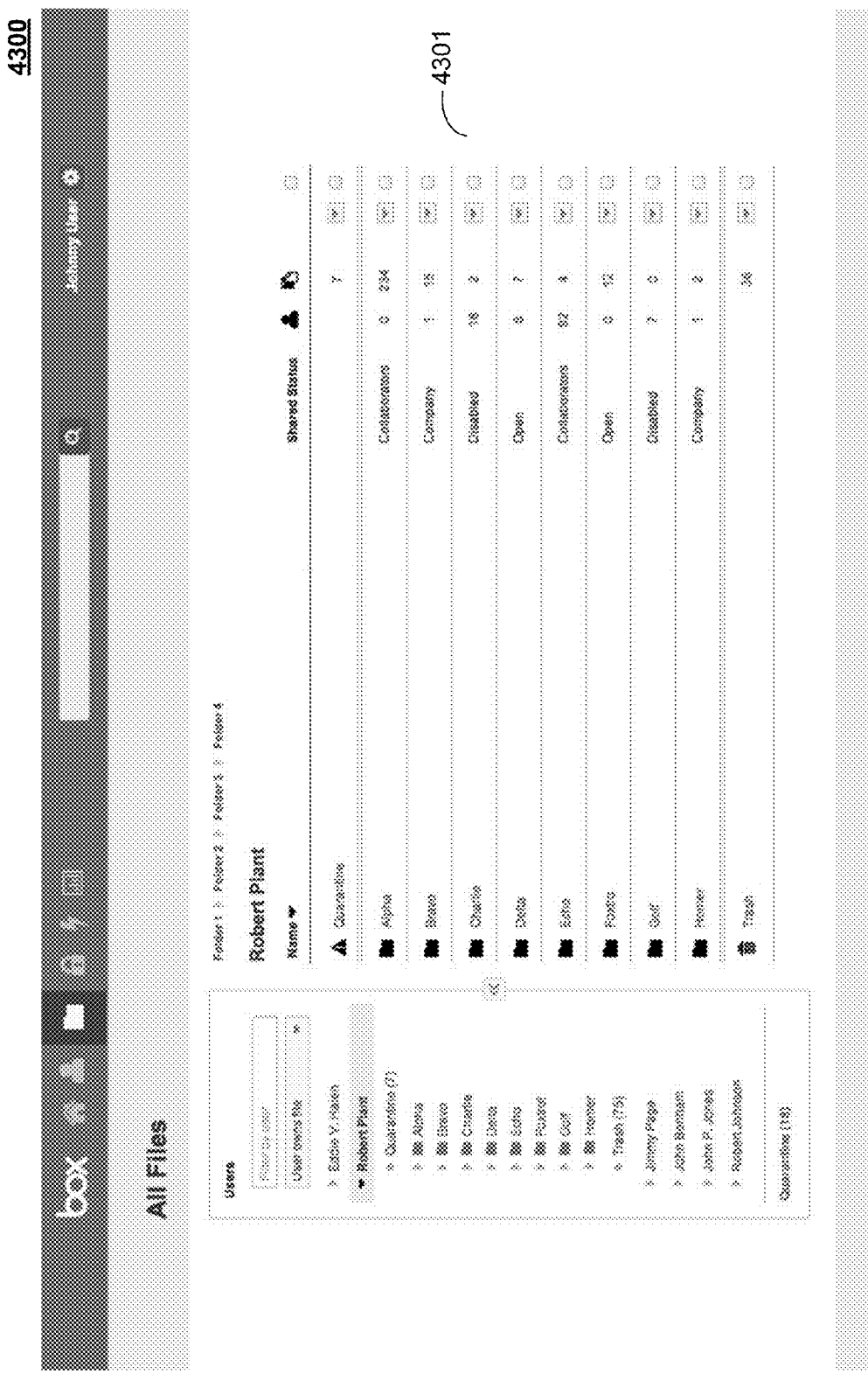
FIG. 43 is an example screenshot of a user "Robert Plant" quarantined file review list administrative interface.

FIG. 43 is an example screenshot of a user "Robert Plant" quarantined file review list administrative interface 4300. A list of the user's folders 4301 may be depicted indicating various features and the relation to quarantined files and policies.

Figure 44:
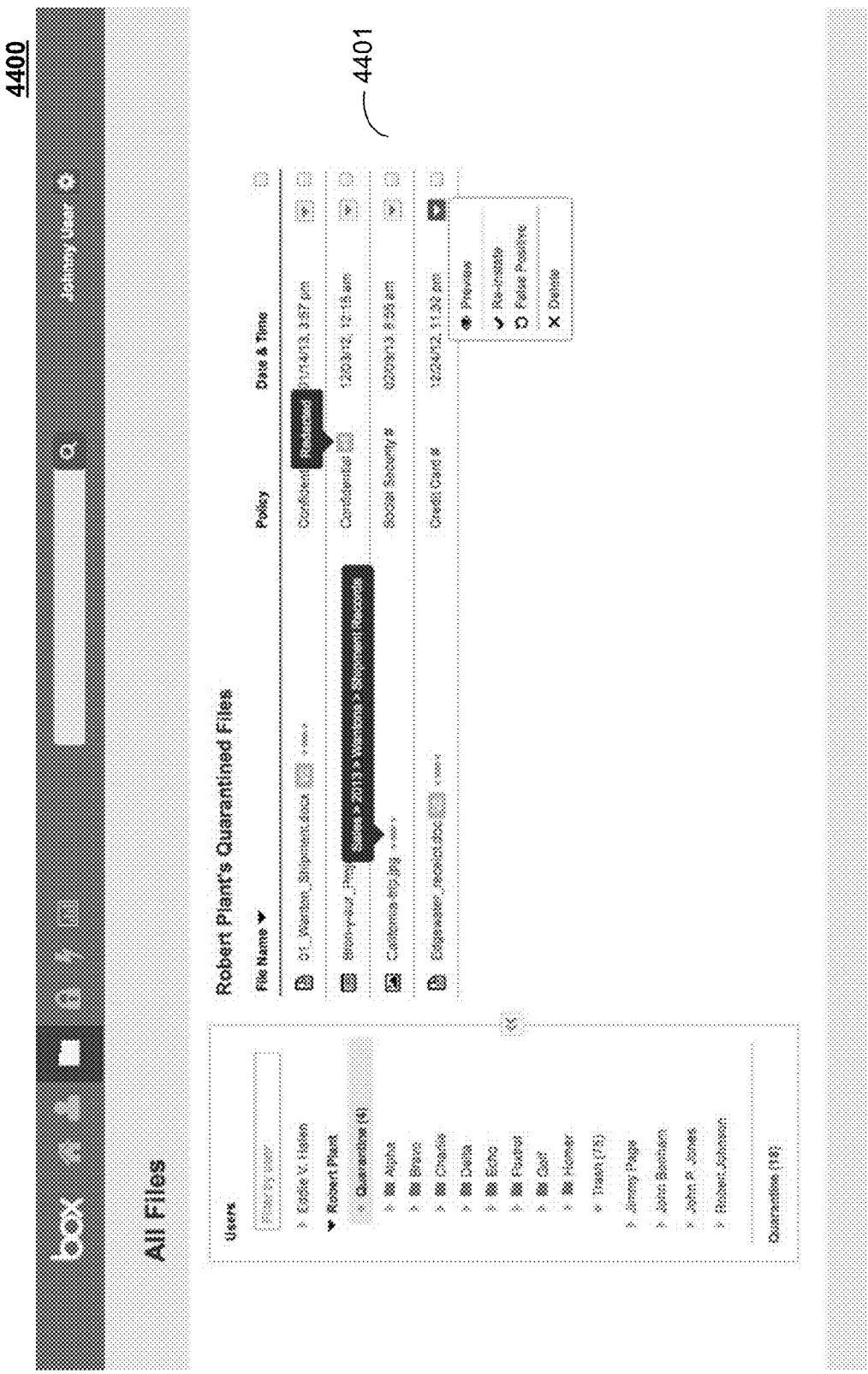
FIG. 44 is an example screenshot of a user "Robert Plant" quarantined file review list administrative interface.

FIG. 44 is an example screenshot of a user "Robert Plant" quarantined file review list administrative interface 4400. The list may include a plurality of files 4401 indicting the applicable policies and times of triggering.

Reports Review Interface

In some embodiments, the information collected by the system across many quarantine events may be logged and available to an administrator via a reports tab within an administrative interface. For example, actions taken via automation may be reflected, such as when an administrator requests Usage Logs. The logs may be requested based on a date range. Administrators may then be able to pull a report for all activity having to do with automation during the specified time period. The report may include information concerning: Date/Time; Date/time the action took place; User; User who took the action; Action; Created new (automation); Edited (automation); Deleted (automation); Item/name; Blank; Contained in folder; Blank; Details, etc.

The details column may list the automation name that was entered into the 'Automation Name' field that the corresponding action was taken on. The report may also include actions taken around policies. In some embodiments, when an administrator visits Reports>Usage Logs>Action Types and selects "Policy" and a date range, they may be able to pull a report for all activity having to do with policy during the specified time period that includes the following pieces of information: Date/time; Date/time the action took place; User; User who took the action; Action; Created new (policy); Edited (policy); Deleted (policy); Item/name; Blank; Contained in Folder; Blank; Details. In some embodiments, the details column may list the policy name that was entered into the 'Policy Name' field that the corresponding action was taken on.

In some embodiments, when an administrator visits Reports > Usage Logs > Action Types and selects "Quarantine" and a date range, the administrator may be able to pull a report for all activity having to do with quarantine during the specified time period that includes the following pieces of information: Date/time; Date/time the action took place; User who took the action; Details regarding the Action itself; Whether the file was Previewed; Whether the file was Deleted; Whether the file was Restored; Whether the file was Moved and where to; Item/name; Name of the file version that an action was taken on; The name of the folder in which the file is Contained; whether the file is in Quarantine (if it was sent to quarantine based on policy violation).

The administrator may also view the [Folder name] (e.g., if it was restored back to the original folder location it was uploaded to). The administrator may also view if the action was "item moved to quarantine", then the details may state which policy was triggered. In some embodiments, if the policy that was triggered was via a 3rd party DLP metadata provider, the interface may list the corresponding string sent in the API call by the 3rd party DLP metadata provider for policy violation. If no policy violation is sent via the API for a 3rd party DLP provider, the details may state "3rd party DLP vendor" or the vendors name if that is known. If the action was "previewed" or "deleted", then the details may state the policy that was triggered when the item got moved to quarantine. If the action was "restored," then the details may state the policy that was triggered when the item got moved to quarantine AND would state if it was marked as a "false positive". Abnormal activity actions may also be presented to the administrator.

API EVENTS that may be called by the backend may include: Download policy has been violated (threshold hit); Sharing policy has been violated (collaboration invites sent to watchlist domain); Upload policy has been violated (SSN, CC, or custom word has been detected); File is uploaded to [designated folder]; Task has been completed on a file within [designated folder].

ACTIONS for the rules system to perform may include in some embodiments: Send email notification to [designated email addresses]; Move file to quarantine area; Assign a task to [list of users]; Move file to [designated folder].

Success Criteria may be specified. Some examples of criteria may include: 20% of enterprise admins create at least 1 security-related rule in the 1st quarter of admin deployment—potentially to high; 15% of admins create at least 1 automation in the 1st quarter of deployment.

Figure 45:
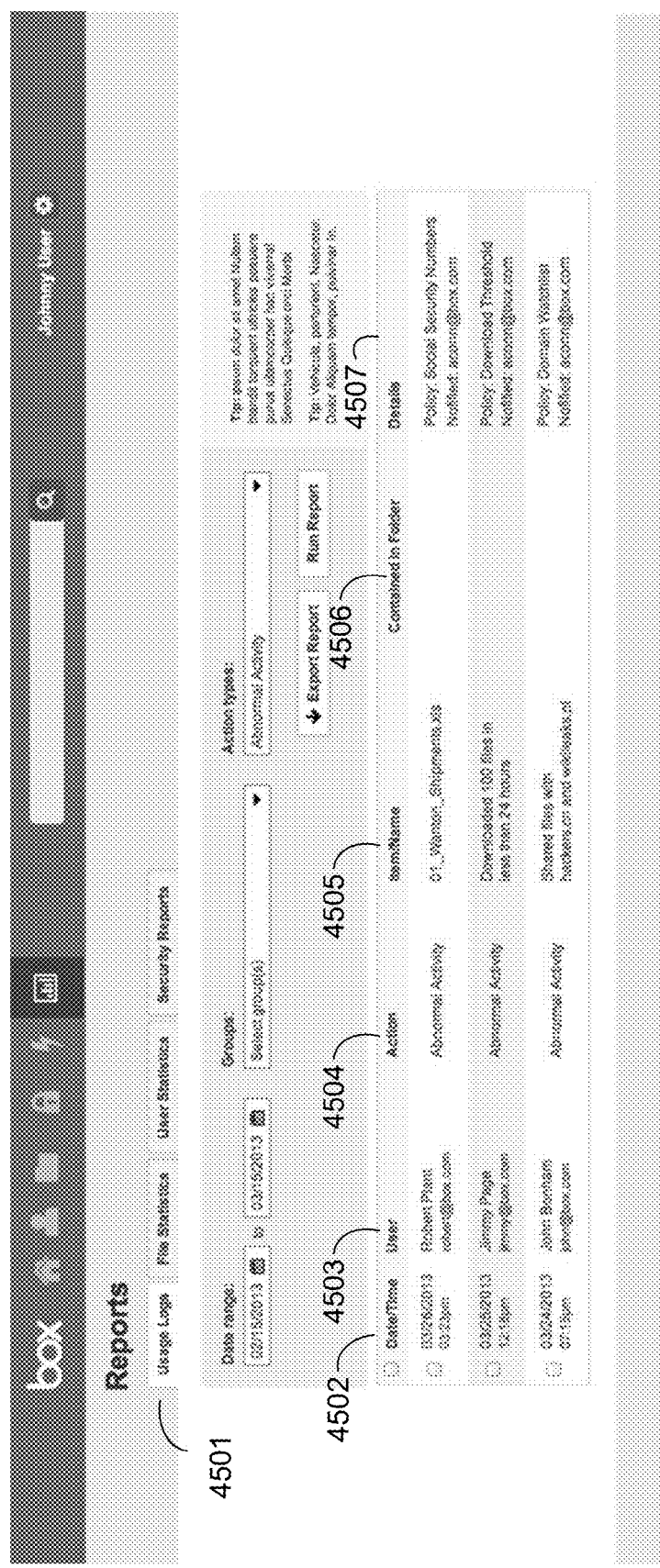
FIG. 45 is an example screenshot of a reports review list administrative interface for abnormal activity action types.

FIG. 45 is an example screenshot of a reports review list administrative interface 4500 for abnormal activity action types. The interface includes a usages tab 4501 indicating various usage logs.

For example, in some embodiments when an administrator visits Reports> Usage Logs > Action Types and selects "Abnormal Activity" and a date range, the administrator may be able to pull a report for all abnormal activity that was flagged during the specified time period. The report may include the following pieces of information: Date/time 4502 the abnormal activity occurred; the User 4503 who performed the abnormal activity; Information 4504 about the abnormal activity; Item/name 4505. If the abnormal activity was a sharing violation to an email on the domain watchlist, the file that was shared may be listed.

The report may also depict the Contained in Folder 4506, e.g. the folder in which the file is contained. If the abnormal activity was a sharing violation to an email on the domain watchlist, the folder that the file that was shared was contained in may be listed. If a whole folder was shared, then the Item/Name and Contained in Folder would both list the name of the folder that was shared.

The Details 4507 may list the abnormal activity policy that was violated: Download [# files] in [time period]; Shared with [domain on watchlist]; if shared with multiple domains, there may be separate entries for each abnormal activity violation.

Figure 46:
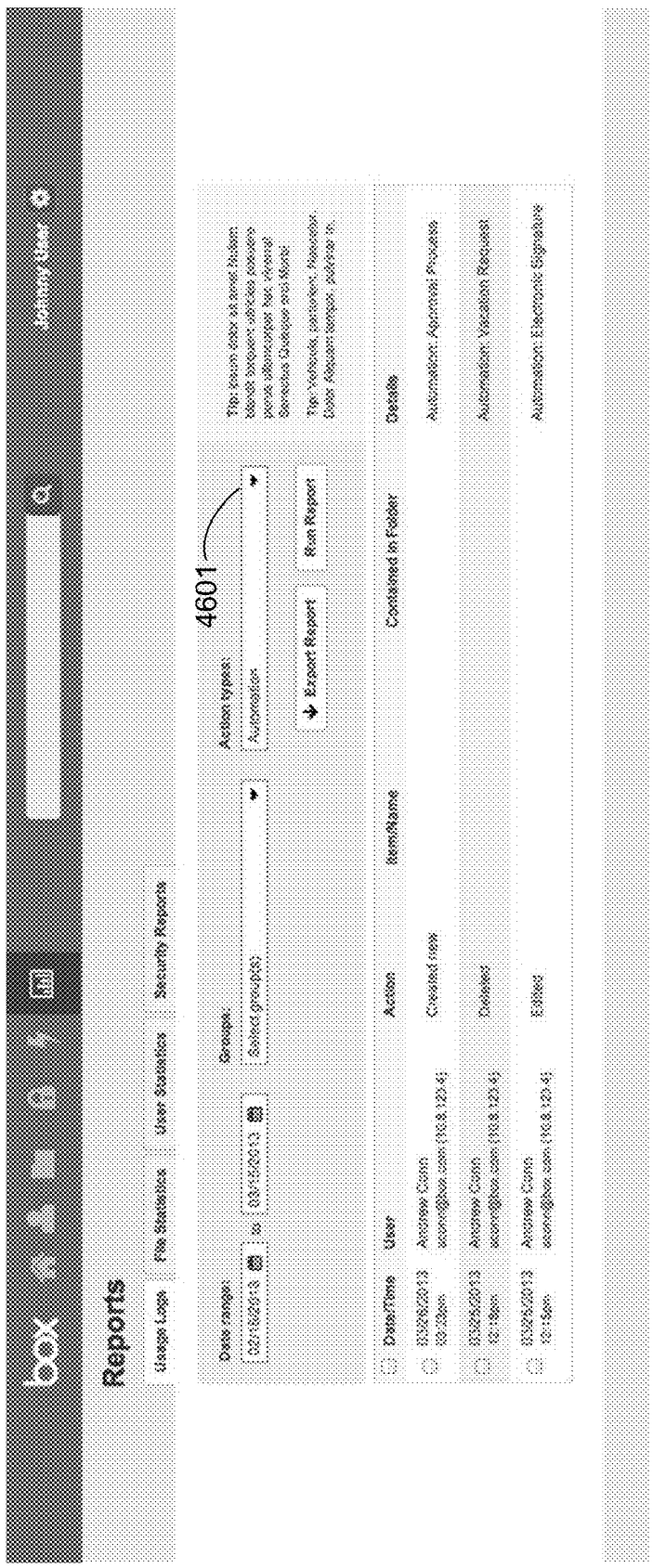
FIG. 46 is an example screenshot of a reports review list administrative interface for automation activity action types.

FIG. 46 is an example screenshot of a reports review list administrative interface 4600 for automation activity action types. In this example, Automation Actions have been selected via the drop-down 4601.

Figure 47:
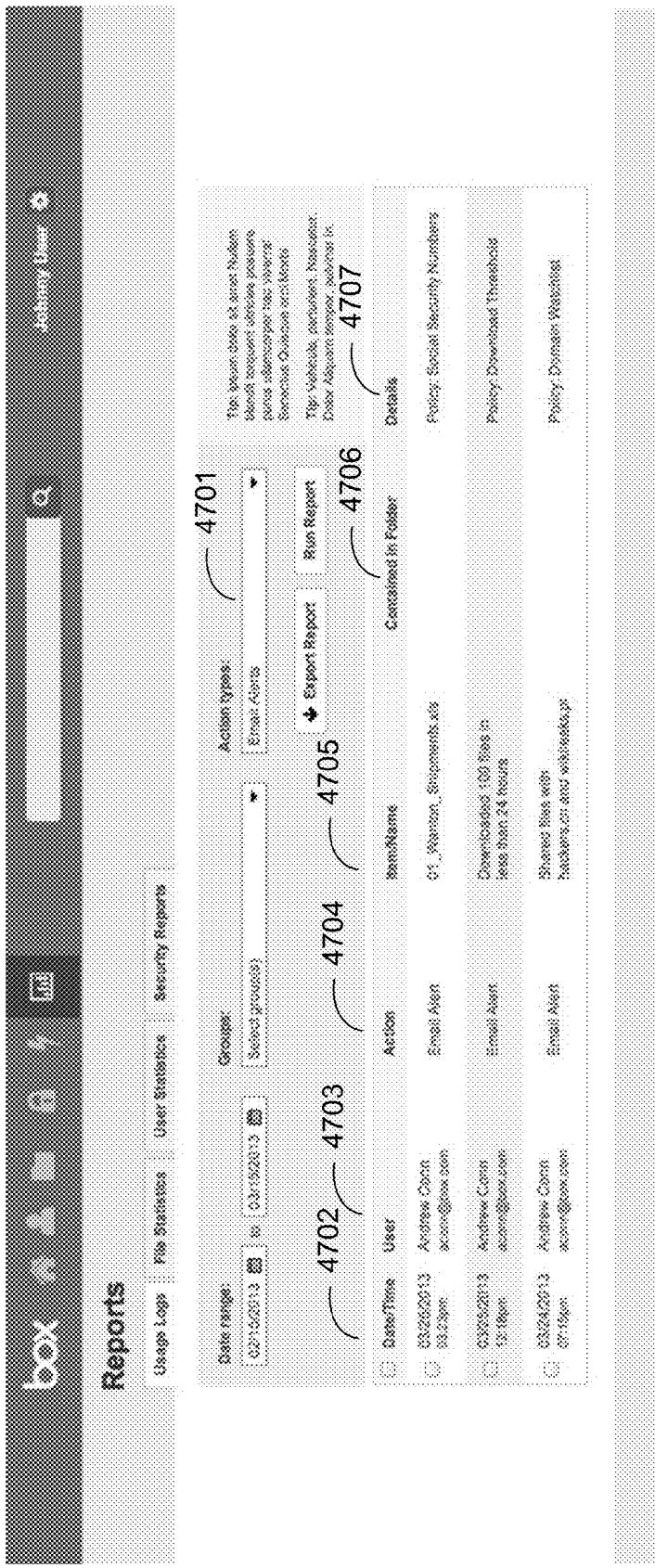
FIG. 47 is an example screenshot of a reports review list administrative interface for email alert action types.

FIG. 47 is an example screenshot of a reports review list administrative interface 4700 for email alert action types. In this example, Email Alert Action types have been selected via the drop down 4701.

The system may provide for an abnormal activity email alert in some embodiments. When an administrator visits Reports > Usage Logs > Action Types and selects "Email Alerts" and a date range, in some embodiments the administrator may be able to pull a report for all email alerts that were sent during the specified time period. In some embodiments, the only email alerts that will be sent will be for abnormal activity. In some embodiments, administrators may be able to specify that they want to be sent email alerts for most events. The reporting on email alerts may include the following pieces of information: Date/time 4702 the email alert was sent; the User 4703 who violated the policy to trigger the email alert; the Email alert Action 4704; and Item/name 4705. If the abnormal activity was a sharing violation to an email on the domain watchlist, the file that was shared would be listed The email alert may also depict the Contained in Folder 4706. If the abnormal activity was a sharing violation to an email on the domain watchlist, the folder that the file that was shared was contained in may be listed. If a whole folder was shared, then the Item/Name and Contained in Folder may both list the name of the folder that was shared.

A Details 4707 output may also be presented. The details may list the abnormal activity policy that was violated to trigger the email alert. For example, the details may include: Download [# files] in [time period]; Shared with [domain on watchlist]; if shared with multiple domains, there would be separate entries for each email sent.

Figure 48:
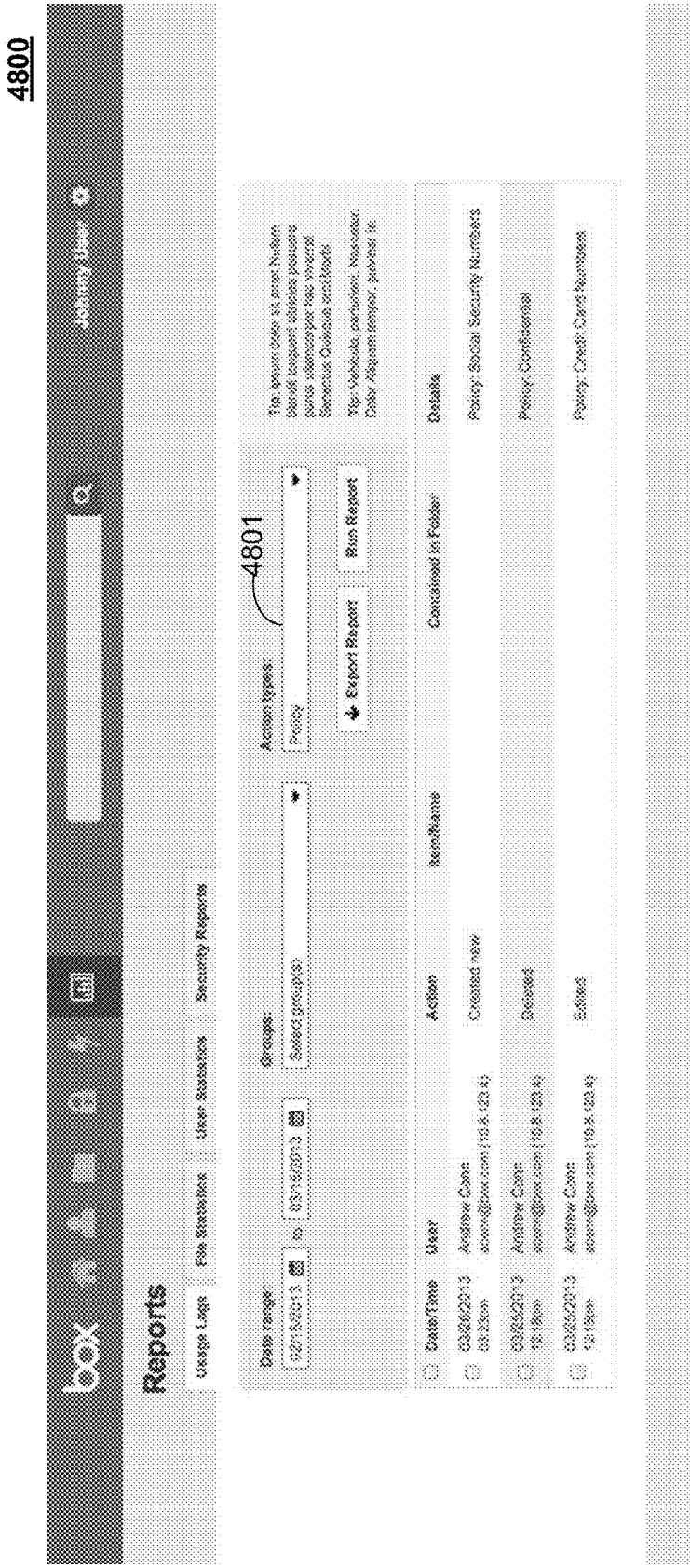
FIG. 48 is an example screenshot of a reports review list administrative interface for policy action types.

FIG. 48 is an example screenshot of a reports review list administrative interface 4800 for policy action types. In this example, Policy Action types have been selected via the drop down 4801.

Figure 49:
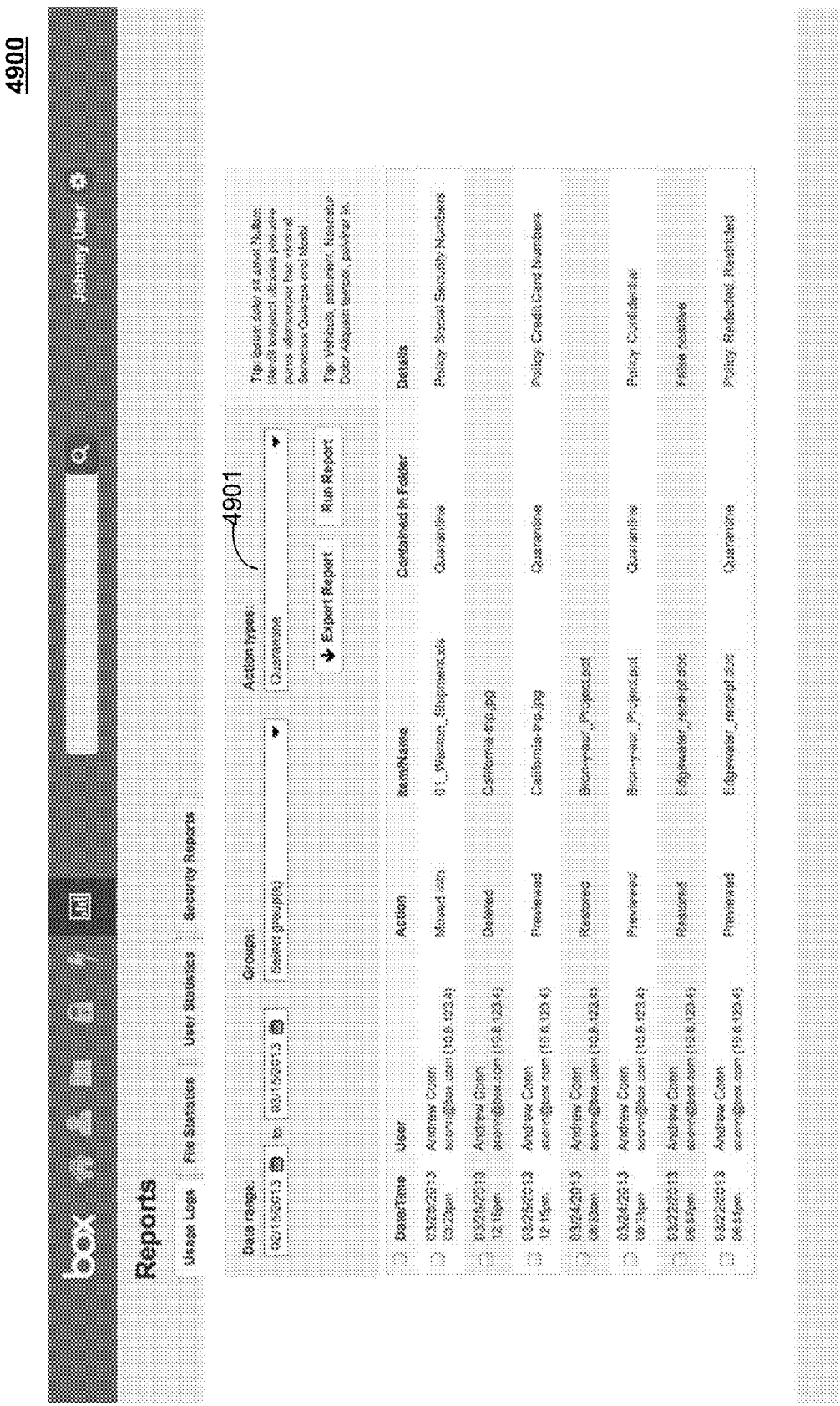
FIG. 49 is an example screenshot of a reports review list administrative interface for quarantine action types.

FIG. 49 is an example screenshot of a reports review list administrative interface 4900 for quarantine action types. In this example, Quarantine Action types have been selected via the drop down 4901.

Figure 50:
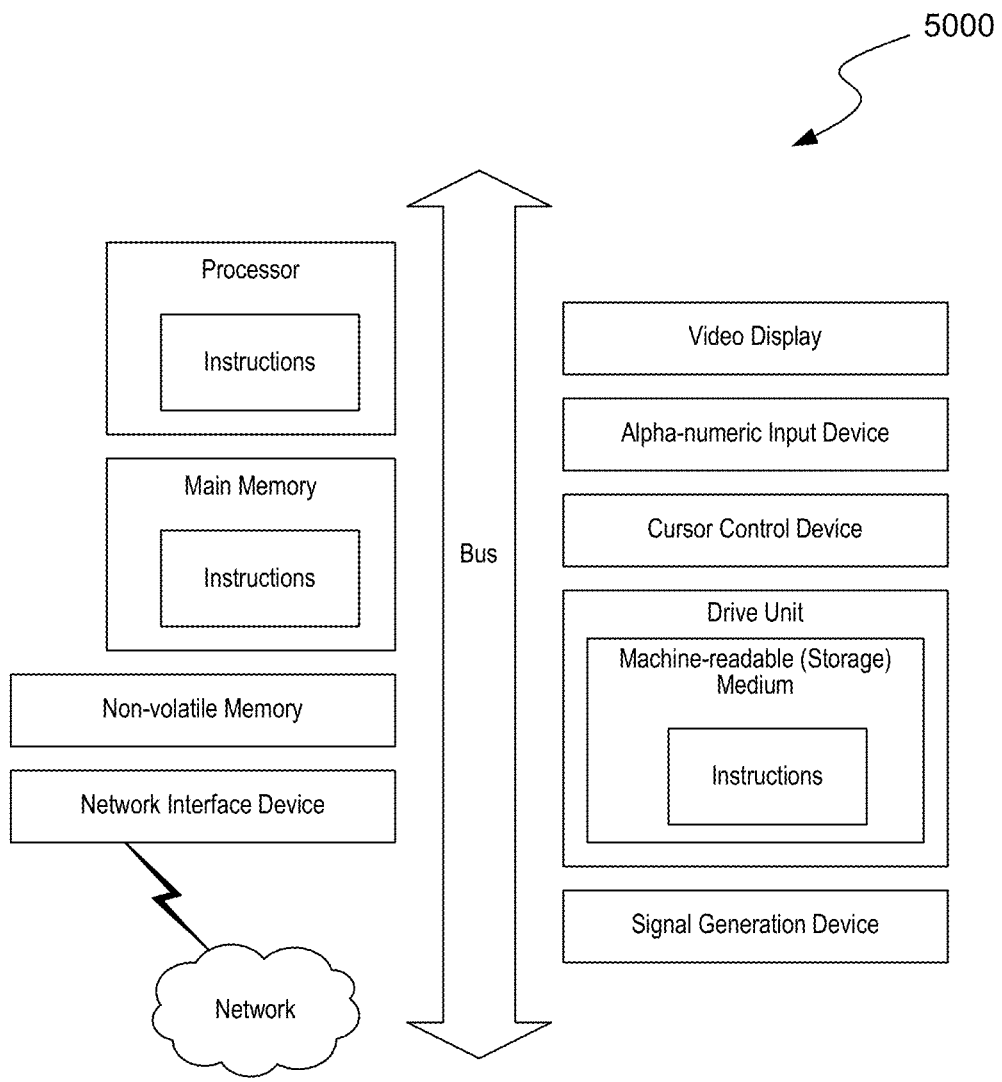
FIG. 50 shows a diagrammatic representation of a machine in the example form of a system within which a set of instructions for causing the machine to perform any one or more of the methodologies discussed herein may be executed.

System FIG. 50 shows a diagrammatic representation of a machine 5000 in the example form of a system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 5000 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. he firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Remarks

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method comprising:
   receiving, by one or more processors of a cloud-based collaboration platform, a request to upload a file to the cloud-based collaboration platform,
      wherein the request is initiated by one of multiple collaborators of the cloud-based collaboration platform;
   responsive to receiving the request, placing, by the one or more processors, the file in a limited administrative access state,
      wherein the limited administrative access state suppresses notifications to the multiple collaborators regarding the upload of the file and restricts access to the file to system administrators;
   identifying, by the one or more processors, a client associated with the file;
   determining, by the one or more processors, a data loss prevention policy corresponding to the client,
      wherein the data loss prevention policy includes various data loss prevention rules;
   comparing, by the one or more processors, contents of the file with the data loss prevention rules;
   determining that at least one of the data loss prevention rules is triggered based on a portion of the contents in the file;
   performing a responsive action associated with the at least one of the data loss prevention rules,
      wherein the data loss prevention rules are set of rules preconfigured by the client;
   providing the one of the multiple collaborators with an opportunity to modify the portion of the contents in the files causing the at least one of the data loss prevention rules to be triggered; and
   responsive to the modification of the portion of the contents in the file, remove the file from the limited administrative access state.

2. The method of claim 1, wherein the at least one of the data loss prevention rules comprises a character-based search for a particular information type.

3. The method of claim 2, wherein the information type comprises one of a social security number, a tax identification number, a medical services identification number, or a user-specified textual string.

4. The method of claim 3, wherein the textual string comprises a product-specific name.

5. The method of claim 1, wherein the responsive action comprises an action associated with various of the data loss prevention rules.

6. The method of claim 1, wherein the responsive action comprises notifying an administrator of an upload of the file.

7. The method of claim 1, wherein the limited administrative access state prevents one or more of the multiple collaborators from modifying, deleting, or sharing the file.

8. The method of claim 1, further comprising modifying a service level agreement in response to the determination that at least one of the data loss prevention rules is triggered.

9. A system which hosts a cloud-based collaboration service having data loss prevention capabilities, the system, comprising:
one or more processors;
a storage medium having instructions stored thereon, which when executed by the one or more processors, cause the system to:
responsive to receiving a request initiated by a collaborator of multiple collaborators to upload a file to a cloud-based collaboration platform,
place the file in a limited administrative access state,
wherein the limited administrative access state suppresses notifications to the multiple collaborators regarding the upload of the file and restricts access to the file to system administrators;
identify an enterprise client associated with the file;
determine a data loss prevention policy corresponding to the enterprise client,
wherein the data loss prevention policy includes various data loss prevention rules;
compare contents of the file with the set of data loss prevention rules;
determine that one of the set rules is triggered based on a portion of the contents in the file;
perform a responsive action associated with the rules,
wherein the data loss prevention rules are a set of rules preconfigured by the enterprise client;
provide the one of multiple collaborators with an opportunity to modify the portion of the contents in the file causing the at least one of the data loss prevention rules to be triggered; and
responsive to the modification of the portion of the contents in the file, remove the file from the limited administrative access state.

10. The system of claim 9, wherein the at least one of the set of rules comprises a character-based search for a particular information type.

11. The system of claim 10, wherein the information type comprises one of a social security number, a tax identification number, and a medical services identification number.

12. The system of claim 10, wherein the information type comprises a user-specified textual string.

13. The system of claim 12, wherein the textual string comprises a product-specific name.

14. The system of claim 9, wherein the responsive action comprises one of a responsive actions associated with the set of rules.

15. The system of claim 9, wherein the responsive action comprises notifying an administrator of the upload of the file.

16. The system of claim 9, wherein the responsive action comprises preventing one or more of the multiple collaborators from modifying, deleting, or sharing the file for upload.

17. The system of claim 9, wherein the instructions, when executed by the one or more processors, further causes the system to:
modify a service level agreement associated with the enterprise client in response to the determination that one of the set of rules is violated or triggered.

18. A non-transitory computer readable storage medium having instructions stored thereon, which when executed by one or more processors, cause the one or more processors to:
responsive to receiving a request initiated by a collaborator of multiple collaborators to upload a file to a cloud-based collaboration platform, place the file in a limited administrative access state,
wherein the limited administrative access state suppresses notifications to the multiple collaborators regarding the upload of the file and restricts access to the file to system administrators;
identify an enterprise client associated with the file;
determine a data loss prevention policy corresponding to the enterprise client,
wherein the data loss prevention policy includes various data loss prevention rules;
compare contents of the file with the set of data loss prevention rules;
determine that one of the set rules is triggered based on a portion of the contents in the file;
perform a responsive action associated with the rules,
wherein the data loss prevention rules are a set of rules preconfigured by the enterprise client;
provide the one of multiple collaborators with an opportunity to modify the portion of the contents in the file causing the at least one of the data loss prevention rules to be triggered; and
responsive to the modification of the portion of the contents in the file, remove the file from the limited administrative access state.

19. The non-transitory computer readable medium of claim 18, wherein the at least one of the set of rules comprises a character-based search for a particular information type.

20. The non-transitory computer readable medium of claim 19, wherein the information type comprises one of a social security number, a tax identification number, and a medical services identification number.

21. The non-transitory computer readable medium of claim 19, wherein the information type comprises a user-specified textual string.

22. The non-transitory computer readable medium of claim 21, wherein the textual string comprises a product-specific name.

23. The non-transitory computer readable medium of claim 18, wherein the responsive action comprises one of a responsive actions associated with the set of rules.

24. The non-transitory computer readable medium of claim 18, wherein the responsive action comprises notifying an administrator of the upload of the file.

25. The non-transitory computer readable medium of claim 18, wherein the responsive action comprises preventing one or more of the multiple collaborators from modifying, deleting, or sharing the file for upload.

26. The non-transitory computer readable medium of claim 18, wherein the instructions, when executed by the one or more processors, further causes the system to:
modify a service level agreement associated with the enterprise client in response to the determination that one of the set of rules is violated or triggered.

* * * * *